United States Patent
Lee et al.

(10) Patent No.: US 12,176,987 B2
(45) Date of Patent: Dec. 24, 2024

(54) METHOD FOR TRANSMITTING UPLINK FEEDBACK INFORMATION RELATED TO BEAM OF USER EQUIPMENT IN WIRELESS COMMUNICATION SYSTEM, AND USER EQUIPMENT AND BASE STATION FOR SUPPORTING SAME

(71) Applicant: LG Electronics Inc., Seoul (KR)

(72) Inventors: Kilbom Lee, Seoul (KR); Jiwon Kang, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 353 days.

(21) Appl. No.: 17/430,832

(22) PCT Filed: Jan. 28, 2020

(86) PCT No.: PCT/KR2020/001243
§ 371 (c)(1),
(2) Date: Aug. 13, 2021

(87) PCT Pub. No.: WO2020/166848
PCT Pub. Date: Aug. 20, 2020

(65) Prior Publication Data
US 2022/0166485 A1    May 26, 2022

(30) Foreign Application Priority Data
Feb. 15, 2019    (KR) ........................ 10-2019-0017584

(51) Int. Cl.
*H04B 7/06*    (2006.01)
*H04L 1/16*    (2023.01)
(Continued)

(52) U.S. Cl.
CPC ......... *H04B 7/0695* (2013.01); *H04L 1/1614* (2013.01); *H04W 24/10* (2013.01); *H04W 76/19* (2018.02)

(58) Field of Classification Search
CPC ...... H04B 17/18; H04B 7/022; H04B 7/0695; H04W 24/10; H04W 76/19; H04W 72/23;
(Continued)

(56) References Cited

U.S. PATENT DOCUMENTS 9,042,315 B2    5/2015    Lin et al.
2012/0281548 A1    11/2012    Lin et al.
(Continued)

FOREIGN PATENT DOCUMENTS

WO    WO2016/018121    2/2016
WO    WO2017/024516    2/2017
(Continued)

OTHER PUBLICATIONS

Office Action in Chinese Appln. No.202080014372.3, mailed on May 4, 2023, 13 pages (with English translation).

(Continued)

*Primary Examiner* — Awet Haile
(74) *Attorney, Agent, or Firm* — Fish & Richardson P.C.

(57) ABSTRACT

The present disclosure discloses a method for transmitting, by means of a user equipment, uplink feedback information related to at least one cell among a plurality of cells configured to the user equipment in a wireless communication system comprising the user equipment and a base station comprising a plurality of cells, and a user equipment and a base station for supporting same. According to an embodiment applicable to the present disclosure, a user equipment may report, to a base station, only uplink feedback information related to some of a plurality of cells in which BF has occurred, and correspondingly, the base (Continued)

station may recognize that uplink feedback information related to a beam which is received from the user equipment includes only uplink feedback information related to some of the plurality of cells in which the BF has occurred.

11 Claims, 37 Drawing Sheets

(51) Int. Cl.
    *H04L 1/1607*    (2023.01)
    *H04W 24/10*    (2009.01)
    *H04W 76/19*    (2018.01)

(58) Field of Classification Search
    CPC ... H04W 16/28; H04W 72/02; H04W 72/046; H04L 1/1614
    See application file for complete search history.

(56) References Cited

U.S. PATENT DOCUMENTS

| | | |
|---|---|---|
| 2013/0176866 A1 | 7/2013 | Yang et al. |
| 2018/0219604 A1 | 8/2018 | Lu et al. |
| 2018/0302889 A1 | 10/2018 | Guo et al. |
| 2019/0037423 A1 | 1/2019 | Yu et al. |
| 2021/0258062 A1* | 8/2021 | Koskela ............ H04W 74/0833 |
| 2022/0039077 A1* | 2/2022 | Koskela ................ H04W 72/23 |
| 2022/0086941 A1* | 3/2022 | Huang ................. H04B 7/0695 |
| 2022/0103226 A1* | 3/2022 | Huang .................. H04L 5/0051 |
| 2022/0116094 A1* | 4/2022 | Wang ..................... H04L 5/001 |

FOREIGN PATENT DOCUMENTS

| | | |
|---|---|---|
| WO | WO 2018/203704 | 11/2018 |
| WO | WO2018204255 | 11/2018 |
| WO | WO 2020/063126 | 4/2020 |

OTHER PUBLICATIONS

Convida Wireless, "On Beam Failure Recovery for SCell," R1-1901206, Presented at 3GPP TSG-RAN WG1 Ad-Hoc Meeting 1901, Taipei, Taiwan, Jan. 21-25, 2019, 4 pages.

Extended European Search Report in European Appln. No. 20755060.9, dated Feb. 15, 2022, 11 pages.

Huawei & HiSilicon, "Beam failure recovery for SCell," R1-1810106, Presented at 3GPP TSG RAN WG1 Meeting #94bis, Chengdu, China, Oct. 8-12, 2018, 6 pages.

LG Electronics Inc., "Discussion on beam failure recovery for SCell," R2-1913137, Presented at 3GPP TSG-RAN WG2 Meeting #107bis, Chongqing, China, Oct. 14-Oct. 18, 2019, 2 pages.

InterDigital Inc., "BFR on SCell," R2-1806821, 3GPP TSG-RAN WG2, RAN2#102, Busan, Republic of Korea, May 21-25, 2018, 4 pages.

International Search Report and Written Opinion in International Appln. No. PCT/KR2020/001243, dated May 21, 2020, 17 pages (with English translation).

Office Action in European Appln. No. 20755060.9, mailed on Feb. 28, 2024, 6 pages.

* cited by examiner

FIG. 13

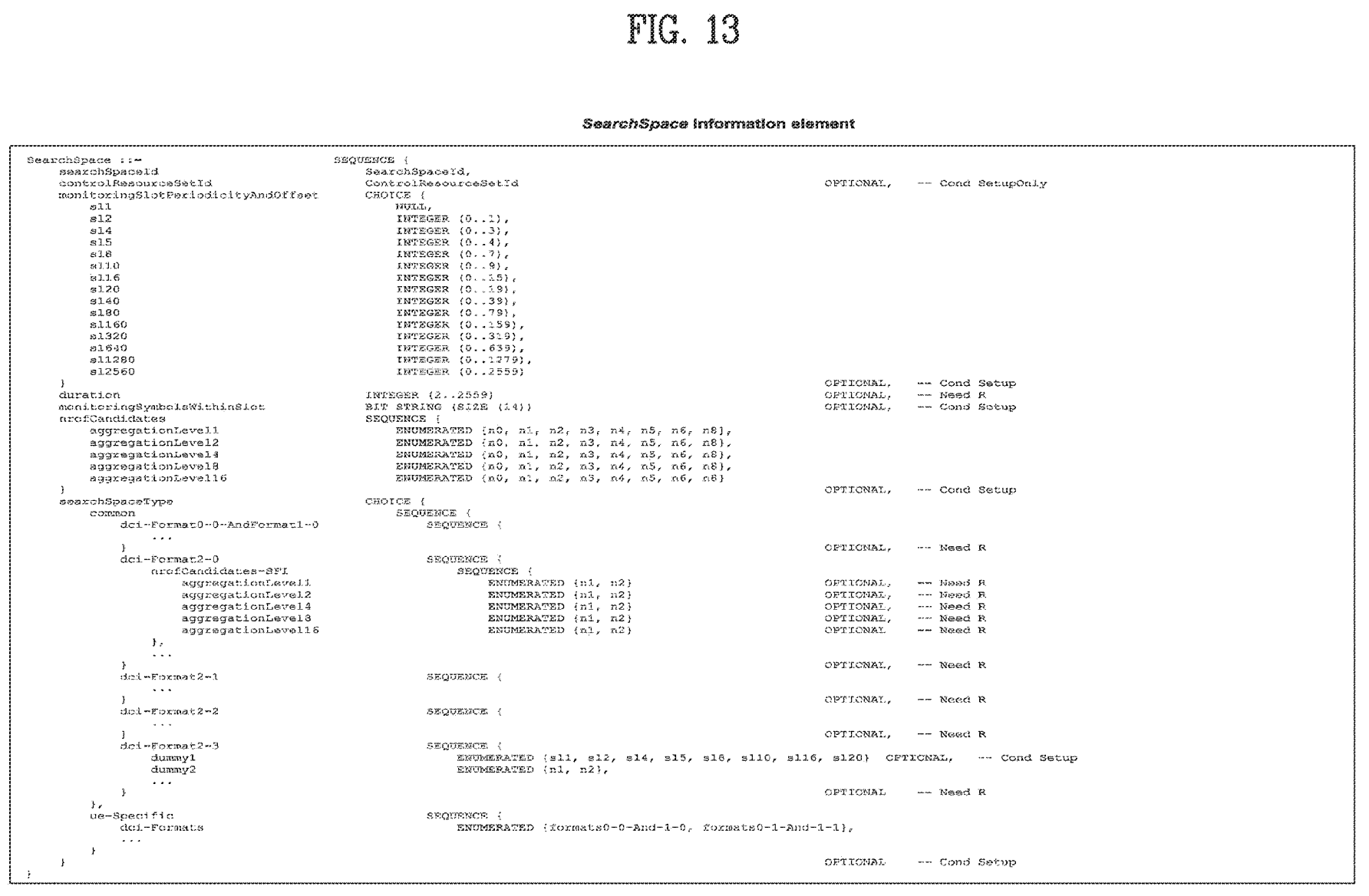

SearchSpace information element

```
SearchSpace ::=              SEQUENCE {
    searchSpaceId                SearchSpaceId,
    controlResourceSetId         ControlResourceSetId                                          OPTIONAL,   -- Cond SetupOnly
    monitoringSlotPeriodicityAndOffset  CHOICE {
        sl1                          NULL,
        sl2                          INTEGER (0..1),
        sl4                          INTEGER (0..3),
        sl5                          INTEGER (0..4),
        sl8                          INTEGER (0..7),
        sl10                         INTEGER (0..9),
        sl16                         INTEGER (0..15),
        sl20                         INTEGER (0..19),
        sl40                         INTEGER (0..39),
        sl80                         INTEGER (0..79),
        sl160                        INTEGER (0..159),
        sl320                        INTEGER (0..319),
        sl640                        INTEGER (0..639),
        sl1280                       INTEGER (0..1279),
        sl2560                       INTEGER (0..2559)
    }                                                                                          OPTIONAL,
    duration                     INTEGER (2..2559)                                             OPTIONAL,   -- Need R
    monitoringSymbolsWithinSlot  BIT STRING (SIZE (14))                                        OPTIONAL,   -- Cond Setup
    nrofCandidates               SEQUENCE {
        aggregationLevel1            ENUMERATED {n0, n1, n2, n3, n4, n5, n6, n8},
        aggregationLevel2            ENUMERATED {n0, n1, n2, n3, n4, n5, n6, n8},
        aggregationLevel4            ENUMERATED {n0, n1, n2, n3, n4, n5, n6, n8},
        aggregationLevel8            ENUMERATED {n0, n1, n2, n3, n4, n5, n6, n8},
        aggregationLevel16           ENUMERATED {n0, n1, n2, n3, n4, n5, n6, n8}
    }                                                                                          OPTIONAL,   -- Cond Setup
    searchSpaceType              CHOICE {
        common                       SEQUENCE {
            dci-Format0-0-AndFormat1-0   SEQUENCE {
                ...
            }                                                                                  OPTIONAL,   -- Need R
            dci-Format2-0                SEQUENCE {
                nrofCandidates-SFI           SEQUENCE {
                    aggregationLevel1            ENUMERATED {n1, n2},
                    aggregationLevel2            ENUMERATED {n1, n2},
                    aggregationLevel4            ENUMERATED {n1, n2},
                    aggregationLevel8            ENUMERATED {n1, n2},
                    aggregationLevel16           ENUMERATED {n1, n2}
                },
                ...
            }                                                                                  OPTIONAL,   -- Need R
            dci-Format2-1                SEQUENCE {
                ...
            }                                                                                  OPTIONAL,   -- Need R
            dci-Format2-2                SEQUENCE {
                ...
            }                                                                                  OPTIONAL,   -- Need R
            dci-Format2-3                SEQUENCE {
                dummy1                       ENUMERATED {sl1, sl2, sl4, sl5, sl8, sl10, sl16, sl20}  OPTIONAL,  -- Cond Setup
                dummy2                       ENUMERATED {n1, n2},
                ...
            }                                                                                  OPTIONAL,   -- Need R
        },
        ue-Specific                  SEQUENCE {
            dci-Formats                  ENUMERATED {formats0-0-And-1-0, formats0-1-And-1-1},
            ...
        }                                                                                      OPTIONAL,   -- Cond Setup
    }
}
```

FIG. 14

CSI-ReportConfig information element

```
CSI-ReportConfig ::=                SEQUENCE {
    reportConfigId                      CSI-ReportConfigId,
    carrier                             ServCellIndex                                           OPTIONAL,   -- Need S
    resourcesForChannelMeasurement      CSI-ResourceConfigId,
    csi-IM-ResourcesForInterference     CSI-ResourceConfigId                                    OPTIONAL,   -- Need R
    nzp-CSI-RS-ResourcesForInterference CSI-ResourceConfigId                                    OPTIONAL,   -- Need R
    reportConfigType                    CHOICE {
        periodic                            SEQUENCE {
            reportSlotConfig                    CSI-ReportPeriodicityAndOffset,
            pucch-CSI-ResourceList              SEQUENCE (SIZE (1..maxNrofBWPs)) OF PUCCH-CSI-Resource
        },
        semiPersistentOnPUCCH               SEQUENCE {
            reportSlotConfig                    CSI-ReportPeriodicityAndOffset,
            pucch-CSI-ResourceList              SEQUENCE (SIZE (1..maxNrofBWPs)) OF PUCCH-CSI-Resource
        },
        semiPersistentOnPUSCH               SEQUENCE {
            reportSlotConfig                    ENUMERATED {sl5, sl10, sl20, sl40, sl80, sl160, sl320},
            reportSlotOffsetList                SEQUENCE (SIZE (1..maxNrofUL-Allocations)) OF INTEGER(0..32),
            p0alpha                             P0-PUSCH-AlphaSetId
        },
        aperiodic                           SEQUENCE {
            reportSlotOffsetList                SEQUENCE (SIZE (1..maxNrofUL-Allocations)) OF INTEGER(0..32)
        }
    },
    reportQuantity                      CHOICE {
        none                                NULL,
        cri-RI-PMI-CQI                      NULL,
        cri-RI-i1                           NULL,
        cri-RI-i1-CQI                       SEQUENCE {
            pdsch-BundleSizeForCSI              ENUMERATED {n2, n4}                             OPTIONAL    -- Need S
        },
        cri-RI-CQI                          NULL,
        cri-RSRP                            NULL,
        ssb-Index-RSRP                      NULL,
        cri-RI-LI-PMI-CQI                   NULL
    },
}
```

CARCI: CSI-AssociatedReportConfigInfo

METHOD FOR TRANSMITTING UPLINK FEEDBACK INFORMATION RELATED TO BEAM OF USER EQUIPMENT IN WIRELESS COMMUNICATION SYSTEM, AND USER EQUIPMENT AND BASE STATION FOR SUPPORTING SAME

CROSS-REFERENCE TO RELATED APPLICATIONS

This application is a National Stage application under 35 U.S.C. § 371 of International Application No. PCT/KR2020/001243, filed on Jan. 28, 2020, which claims the benefit of Korean Patent Application No. 10-2019-0017584, filed on Feb. 15, 2019. The disclosures of the prior applications are incorporated by reference in their entirety.

TECHNICAL FIELD

The following description relates to a wireless communication system, and more particularly, to a method for transmitting, by a terminal, uplink feedback information related to at least one cell among a plurality of cells (e.g., PCell, PSCell, SCell, etc.) configured for the terminal in a wireless communication system including a base station and a terminal and including the plurality of cells, and a terminal and a base station supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As more communication devices have demanded higher communication capacity, enhanced mobile broadband (eMBB) communication technology relative to legacy radio access technology (RAT) has been introduced. In addition, a communication system considering services/UEs sensitive to reliability and latency as well as massive machine type communication (MTC) for providing various services anytime and anywhere by connecting a plurality of devices and objects to each other has been introduced. Thus, the new generation RAT considering eMBB communication, massive MTC, ultra-reliable and low-latency communication (URLLC), etc. has been introduced.

DISCLOSURE

Technical Problem

The present disclosure provides a method for transmitting beam related uplink feedback information by a terminal in a wireless communication system, and a terminal and a base station supporting the same.

The technical objects that can be achieved through the present disclosure are not limited to what has been particularly described hereinabove and other technical objects not described herein will be more clearly understood by persons skilled in the art from the following detailed description.

Technical Solution

The present disclosure discloses a method for transmitting beam related uplink feedback information by a terminal in a wireless communication system, and a terminal and a base station supporting the same.

As an example of the present disclosure, a method for transmitting beam related uplink feedback information by a terminal configured with a plurality of cells in a wireless communication system may include detecting occurrence of a beam failure (BF) in N cells among M cells configured for the terminal, wherein M is a natural number greater than or equal to 2, and N is a natural number less than or equal to M, and based on detection of the BF for the N cells, transmitting, to a base station, the beam related uplink feedback information including (i) identification information about the N cells, (ii) number information related to K, K being a natural number less than or equal to N, and (iii) beam information related to K cells among the N cells, wherein the identification information and the number information may be encoded separately from the beam information.

In the present disclosure, the identification information may include bitmap information related to the N cells, wherein the beam information may include new beam information related to each of the K cells.

Herein, the new beam information related to each of the K cells may include identification information about a new beam related to each of the K cells or about a reference signal related to the new beam, and quality information about the new beam related to each of the K cells or about the reference signal related to the new beam.

Herein, the new beam related to each of the K cells may include a beam preferred by the terminal or having the best quality among candidate beams configured in relation to each of the K cells.

The quality information about the new beam related to each of the K cells or about the reference signal related to the new beam may include reference signal received power (RSRP) information about the new beam related to each of the K cells.

In the present disclosure, the bitmap information may have a bit size corresponding to M.

Herein, the bitmap information may include (i) N pieces of first bit information with a first value and (ii) remaining second bit information with a second value. In addition, each of the first bit information and the second bit information in the bitmap information may be located based on index order information about a corresponding cell.

In this case, the K cells among the N cells may include K cells corresponding to K pieces of first bit information determined among the N pieces of first bit information based on a most significant bit (MSB) or least significant bit (LSB) in the bitmap.

In the present disclosure, the method may further include transmitting, to the base station, a first signal for requesting an uplink resource based on detection of the occurrence of the BF in the N cells among the M cells, and in response to the first signal, receiving, from the base station, a second signal for allocating the uplink resource for the beam related uplink feedback information, and the K cells among the N cells may be determined based on a size of the uplink resource.

In the present disclosure, the beam related uplink feedback information may be transmitted through a physical uplink control channel (PUCCH) or a physical uplink shared channel (PUSCH).

In the present disclosure, the detecting of the occurrence of the BF by the terminal in the N cells may include detecting the occurrence of the BF in each of the N cells based on qualities of all control resource set (CORESET) beams related to each of the N cells or all beams configured for beam failure detection (BFD) being less than or equal to a predetermined threshold.

In the present disclosure, a value of K may be determined based on configuration information received from the base station.

As another example of the present disclosure, a terminal for transmitting beam related uplink feedback information in a wireless communication system with a plurality of cells configured for the terminal may include at least one transmitter, at least one receiver, at least one processor, and at least one memory operatively coupled to the at least one processor and configured to store instructions causing, when executed, the at least one processor to perform a specific operation, wherein the specific operation may include detecting occurrence of a beam failure (BF) in N cells among M cells configured for the terminal, wherein M is a natural number greater than or equal to 2, and N is a natural number less than or equal to M, and based on detection of the BF for the N cells, transmitting, to a base station, the beam related uplink feedback information including (i) identification information about the N cells, (ii) number information related to K, K being a natural number less than or equal to N, and (iii) beam information related to K cells among the N cells, wherein the identification information and the number information may be encoded separately from the beam information.

In the present disclosure, the terminal may communicate with at least one of a mobile terminal, a network, or an autonomous driving vehicle other than a vehicle containing the terminal.

As another example of the present disclosure, a base station including a plurality of cells and configured to receive beam related uplink feedback information in a wireless communication system may include at least one transmitter, at least one receiver, at least one processor, and at least one memory operatively coupled to the at least one processor and configured to store instructions causing, when executed, the at least one processor to perform a specific operation, wherein the specific operation may include based on detection of occurrence of a beam failure (BF) in N cells among M cells configured for a terminal, receiving, from the terminal, the beam related uplink feedback information including (i) identification information about the N cells, (ii) number information related to K, K being a natural number less than or equal to N, and (iii) beam information related to K cells among the N cells, and based on the beam related uplink feedback information, recognizing that (i) the BF occurs in the N cells among the M cells, and that (ii) the beam related uplink feedback information includes the beam information related to the K cells among the N cells, wherein the identification information and the number information may be encoded separately from the beam information, wherein M is a natural number greater than or equal to 2, and N is a natural number less than or equal to M.

In the present disclosure, based on K being less than N, the specific operation further may include transmitting, to the terminal, a first signal for requesting beam information related to remaining N-K cells, and receiving, from the terminal, beam related additional uplink feedback information including the beam information related to the remaining N-K cells.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

Advantageous Effects

As is apparent from the above description, the embodiments of the present disclosure have the following effects.

According to the present disclosure, when a beam failure (BF) occurs in a plurality of cells at the same time, a terminal may transmit, to a base station, uplink feedback information related to one or more cells among the plurality of cells. As a specific example, based on an uplink resource allocated for transmission of the beam related uplink feedback information being insufficient to transmit uplink feedback information related to all the plurality of cells, the terminal may transmit, to the base station, uplink feedback information related to some cells among the plurality of cells. Corresponding to this, the base station may recognize that the beam related uplink feedback information received from the terminal includes uplink feedback information related to the some cells among the plurality of cells, and may make a request to the terminal for transmission of (additional) uplink feedback information related to the remaining cells (if necessary).

Thereby, unnecessary resource allocation between the base station and the terminal may be minimized, and signaling overhead may be greatly reduced.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 13 is a diagram illustrating a configuration of a higher layer parameter SearchSpace IE applicable to the present disclosure.

FIG. 14 is a diagram illustrating a configuration of a higher layer parameter CSI-ReportConfig IE applicable to the present disclosure.

MODE FOR THE DISCLOSURE

Figure 1:
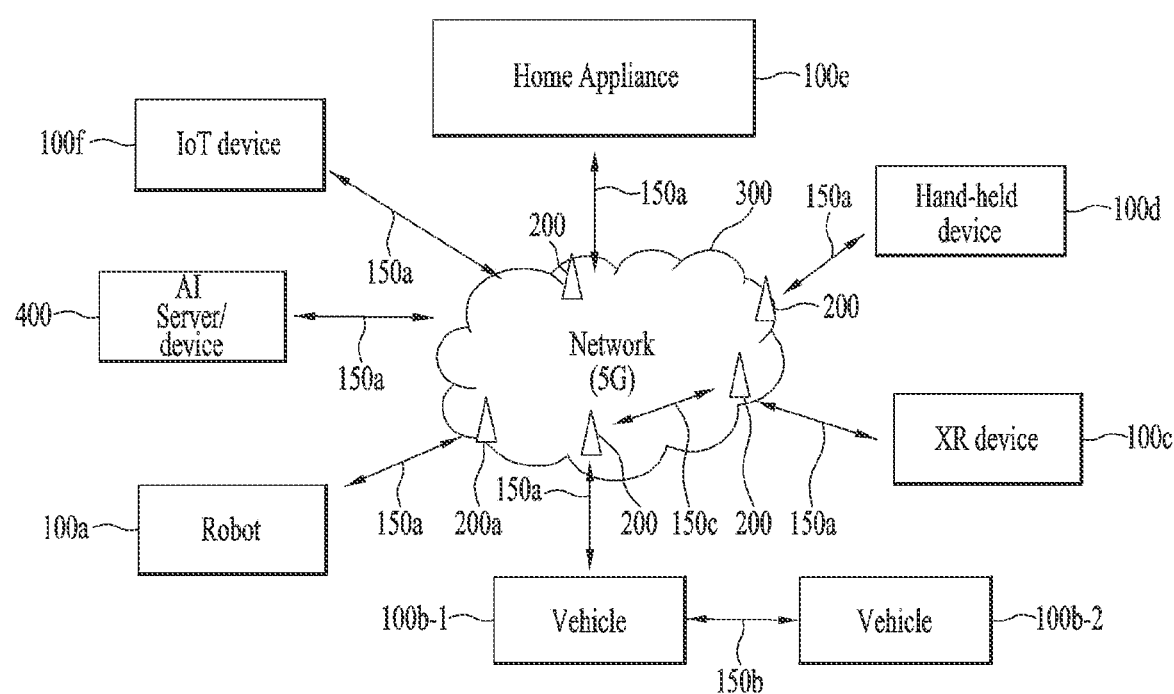
FIG. 1 illustrates a communication system applied to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the", etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term UE may be replaced with a UE, a Mobile Station (MS), a Subscriber Station (SS), a Mobile Subscriber Station (MSS), a mobile UE, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR system is explained, which are examples of wireless access systems.

Technology described below may be applied to various wireless access systems such as code division multiple access (CDMA), frequency division multiple access (FDMA), time division multiple access (TDMA), orthogonal frequency division multiple access (OFDMA), and single carrier frequency division multiple access (SC-FDMA).

To clarify technical features of the present disclosure, embodiments of the present disclosure are described focusing upon a 3GPP NR system. However, the embodiments proposed in the present disclosure may be equally applied to other wireless systems (e.g., 3GPP LTE, IEEE 802.16, and IEEE 802.11).

1 Example of a Communication System to which the Present Disclosure is Applied The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 1 illustrates a communication system 1 applied to the present disclosure.

Referring to FIG. 1, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

2 Example of Wireless Devices to which the Present Disclosure Applies

Figure 2:
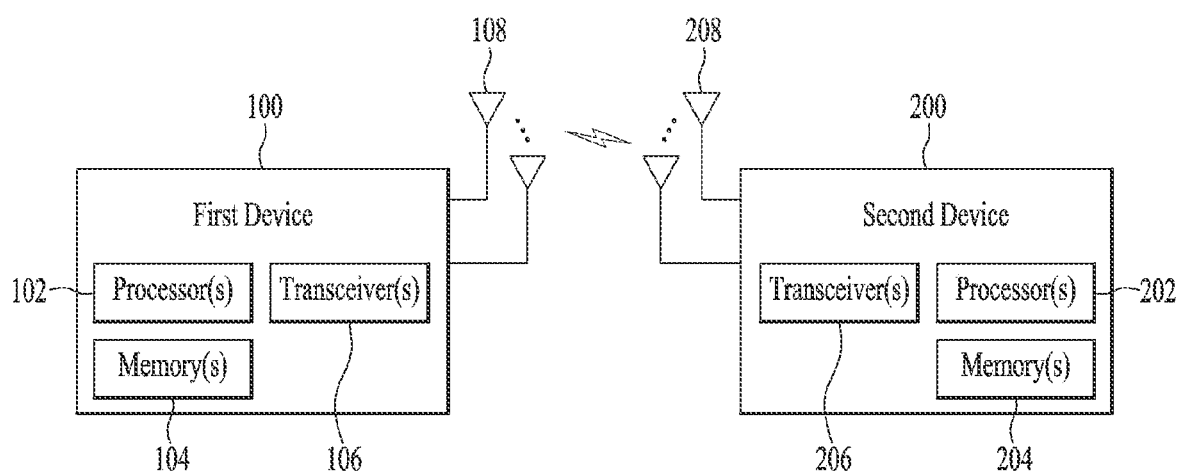
FIG. 2 illustrates a wireless device applicable to the present disclosure.

FIG. 2 illustrates wireless devices applicable to the present disclosure.

Referring to FIG. 2, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

3 Usage Example of Wireless Devices to which the Present Disclosure Applies

Figure 3:
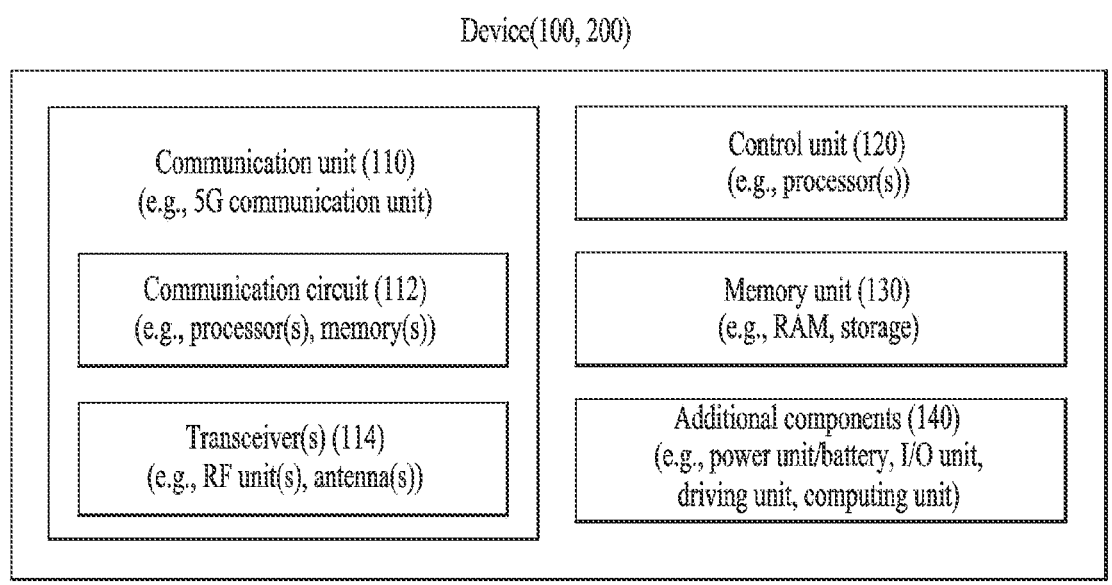
FIG. 3 illustrates another example of a wireless device applied to the present disclosure.

FIG. 3 illustrates another example of a wireless device applied to the present disclosure. The wireless device may be implemented in various forms according to a use case/service (refer to FIG. 1).

Referring to FIG. 3, wireless devices 100 and 200 may correspond to the wireless devices 100 and 200 of FIG. 2 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcasting terminal, a hologram device, a public safety device, an MTC device, a medical device, a FinTech device (or a finance device), a security device, a climate/environment device, the AI server/device (400 of FIG. 1), the BSs (200 of FIG. 1), a network node, or the like. The wireless device may be mobile or fixed according to a use case/service.

In FIG. 3, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Hereinafter, an example of implementing FIG. 3 will be described in detail with reference to the drawings.

3.1. Example of Mobile Devices to which the Present Disclosure Applies

Figure 4:
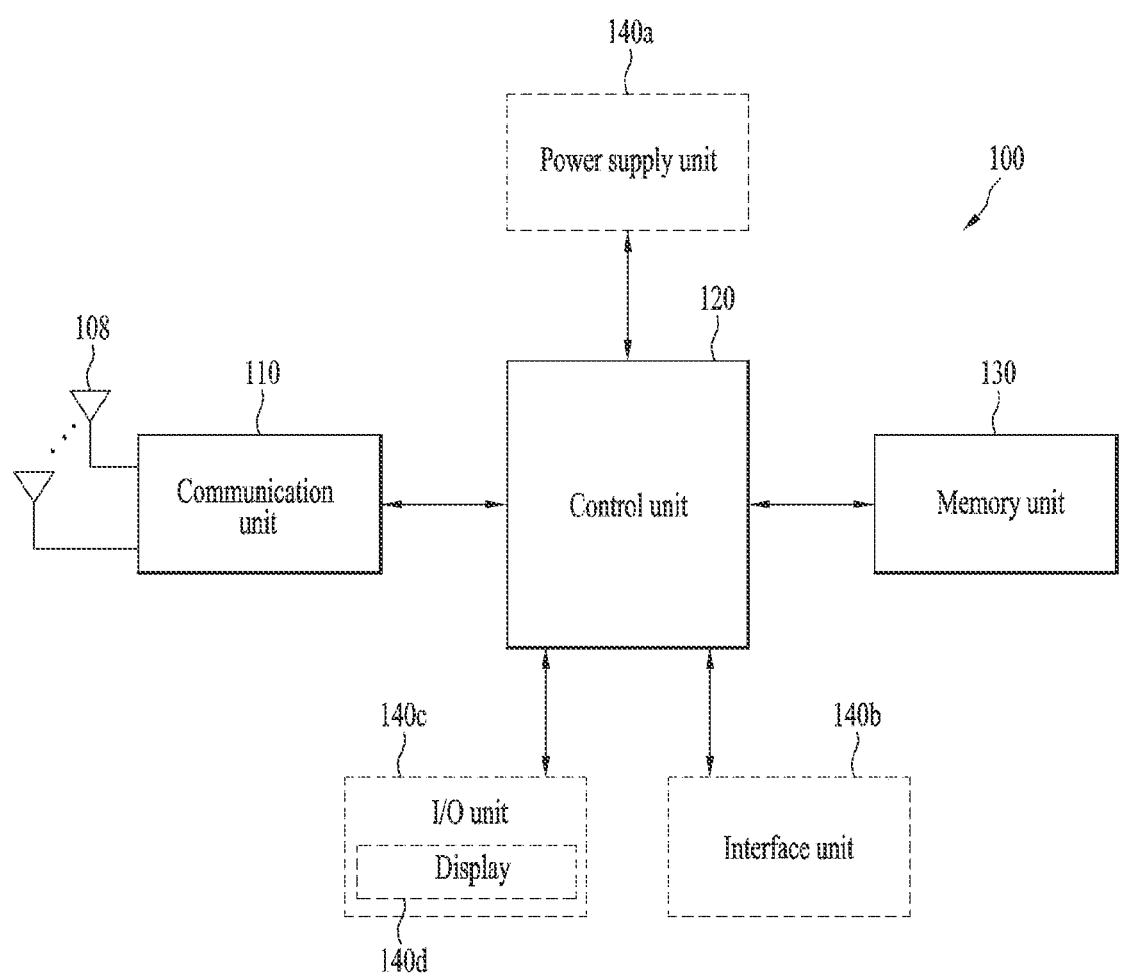
FIG. 4 illustrates a portable device applied to the present disclosure.

FIG. 4 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 4, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 1, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 5:
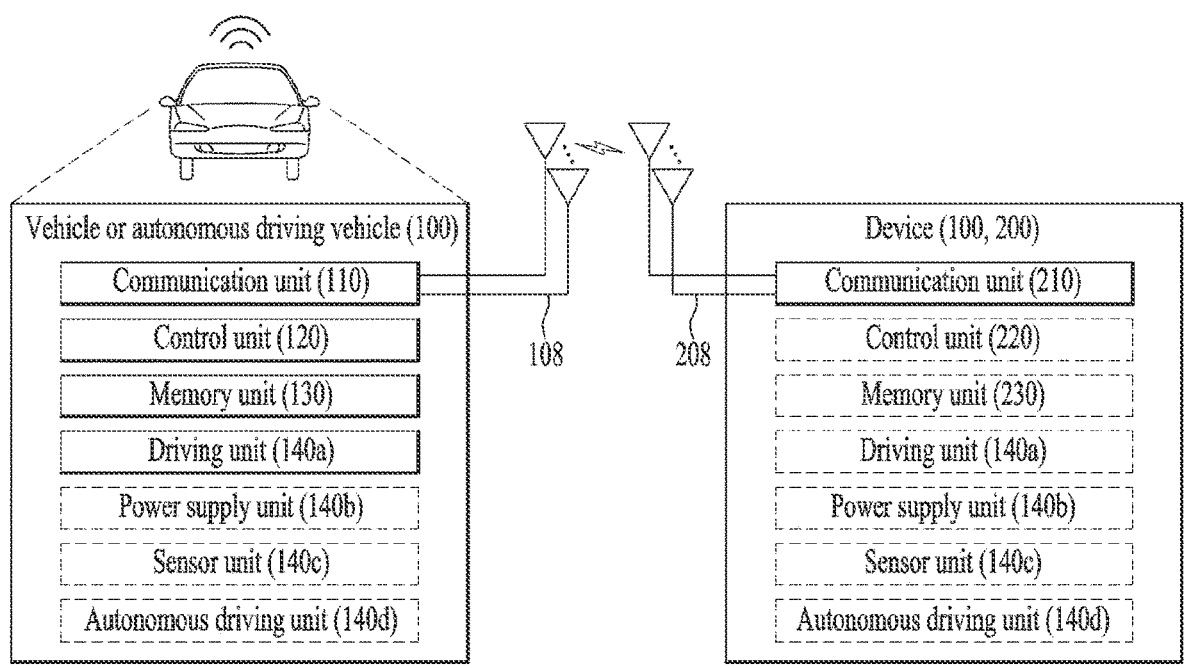
FIG. 5 illustrates a vehicle or an autonomous vehicle applied to the present disclosure.

3.2. Examples of Vehicles or Autonomous Vehicles to which the Present Disclosure Applies FIG. 5 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 5, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 4 respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

4. NR System

4.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

Figure 6:
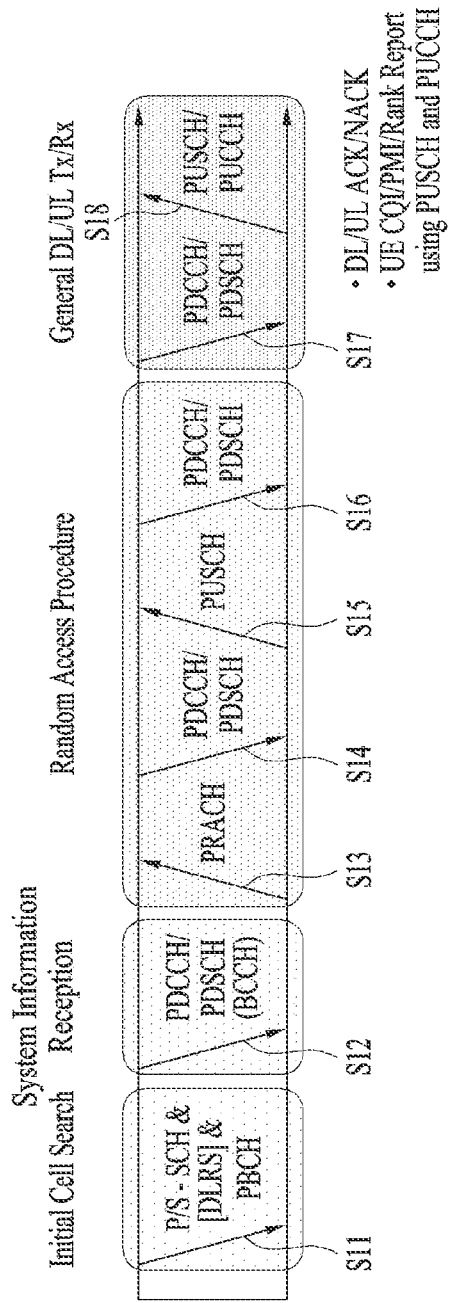
FIG. 6 is a diagram illustrating physical channels and a general signal transmission method using the physical channels.

FIG. 6 illustrates physical channels and a general signal transmission method using the physical channels, which may be used in embodiments of the present disclosure.

A UE performs initial cell search such as synchronization establishment with a BS in step S11 when the UE is powered on or enters a new cell. To this end, the UE may receive a primary synchronization channel (P-SCH) and a secondary synchronization channel (S-SCH) from the BS, establish synchronization with the BS, and acquire information such as a cell identity (ID).

Thereafter, the UE may receive a physical broadcast channel (PBCH) from the BS to acquire broadcast information in the cell.

Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the BS. To this end, the UE may transmit a preamble through a physical random access channel (PRACH) (S13) and receive a random access response (RAR) to the preamble through the PDCCH and the PDSCH corresponding to the PDCCH (S14). The UE may transmit a physical uplink shared channel (PUSCH). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH signal and/or a PDSCH signal (S17) and transmit a PUSCH signal and/or a physical uplink control channel (PUCCH) signal (S18) as a general UL/DL signal transmission procedure.

Control information that the UE transmits to the BS is referred to as uplink control information (UCI). The UCI includes a hybrid automatic repeat and request (HARQ) acknowledgement (ACK)/negative ACK (NACK) signal, a scheduling request (SR), a channel quality indicator (CQI), a precoding matrix index (PMI), a rank indicator (RI), or beam indication (BI) information.

In an NR system, the UCI is generally periodically transmitted on the PUCCH. However, according to an embodiment (if control information and traffic data should be transmitted simultaneously), the control information and traffic data may be transmitted on the PUSCH. In addition, the UCI may be transmitted aperiodically on the PUSCH, upon receipt of a request/command from a network.

4.2. Radio Frame Structure

Figure 7:
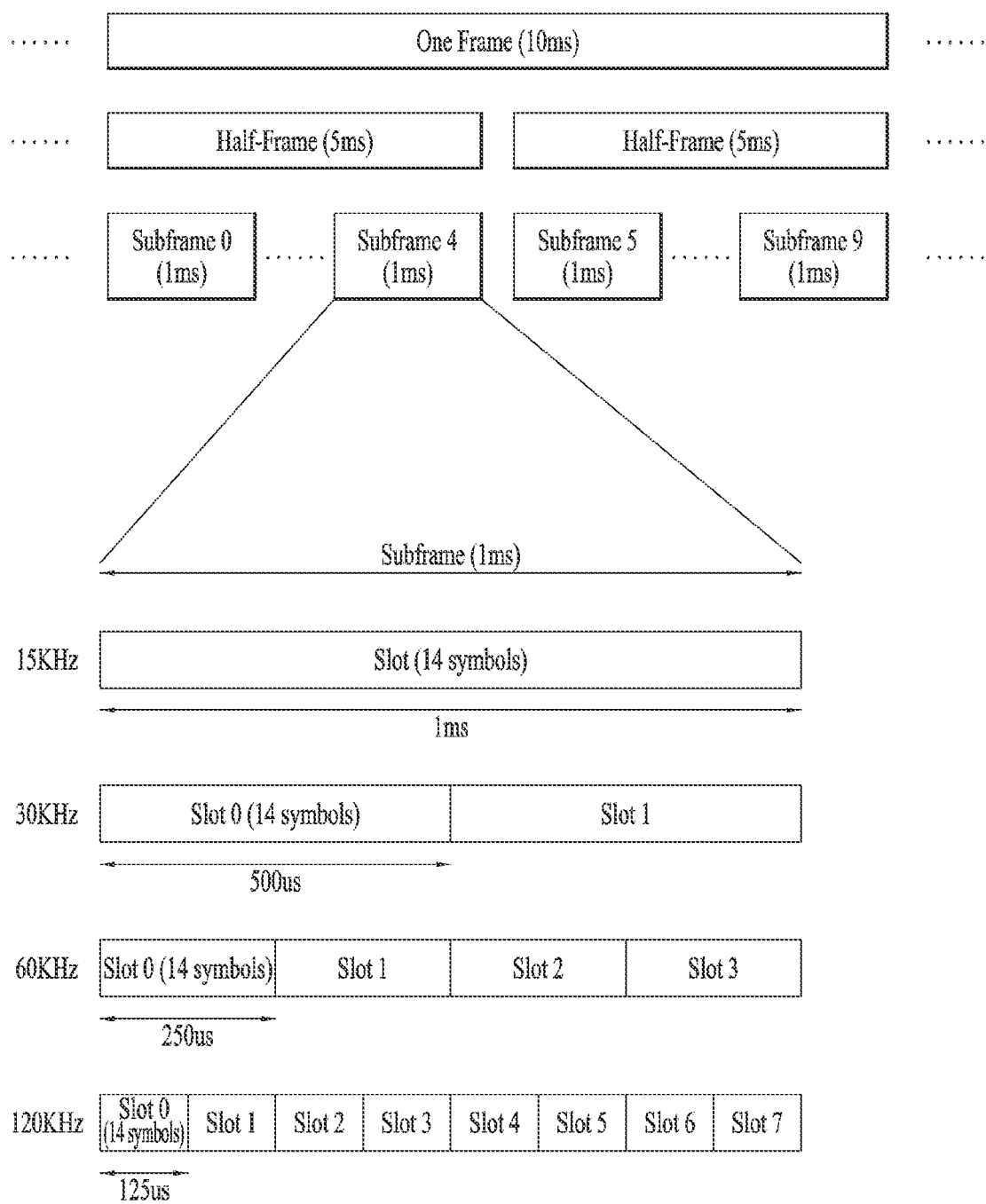
FIG. 7 is a diagram illustrating a radio frame structure in an NR system to which embodiments of the present disclosure are applicable.

FIG. 7 is a diagram illustrating a radio frame structure in an NR system to which embodiments of the present disclosure are applicable.

In the NR system, UL and DL transmissions are based on a frame as illustrated in FIG. 7. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N_{symb}^{slot}$ represents the number of symbols in a slot, $N_{slot}^{frame,\mu}$ represents the number of slots in a frame, and $N_{slot}^{subframe,\mu}$ represents the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

NR supports multiple numerologies (or subcarrier spacings (SCSs)) to support various 5G services. For example, when the SCS is 15 kHz, a wide area is supported in traditional cellular bands. When the SCS is 30 kHz/60 kHz, a dense-urban area, lower latency, and a wider carrier bandwidth are supported. When the SCS is 60 kHz or higher, a bandwidth greater than 24.25 GHz is supported to overcome phase noise.

The NR frequency band is defined as the frequency range of two types FR1 and FR2. FR1 and FR2 may be configured as shown in the table below. Further, FR2 may mean a millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 8:
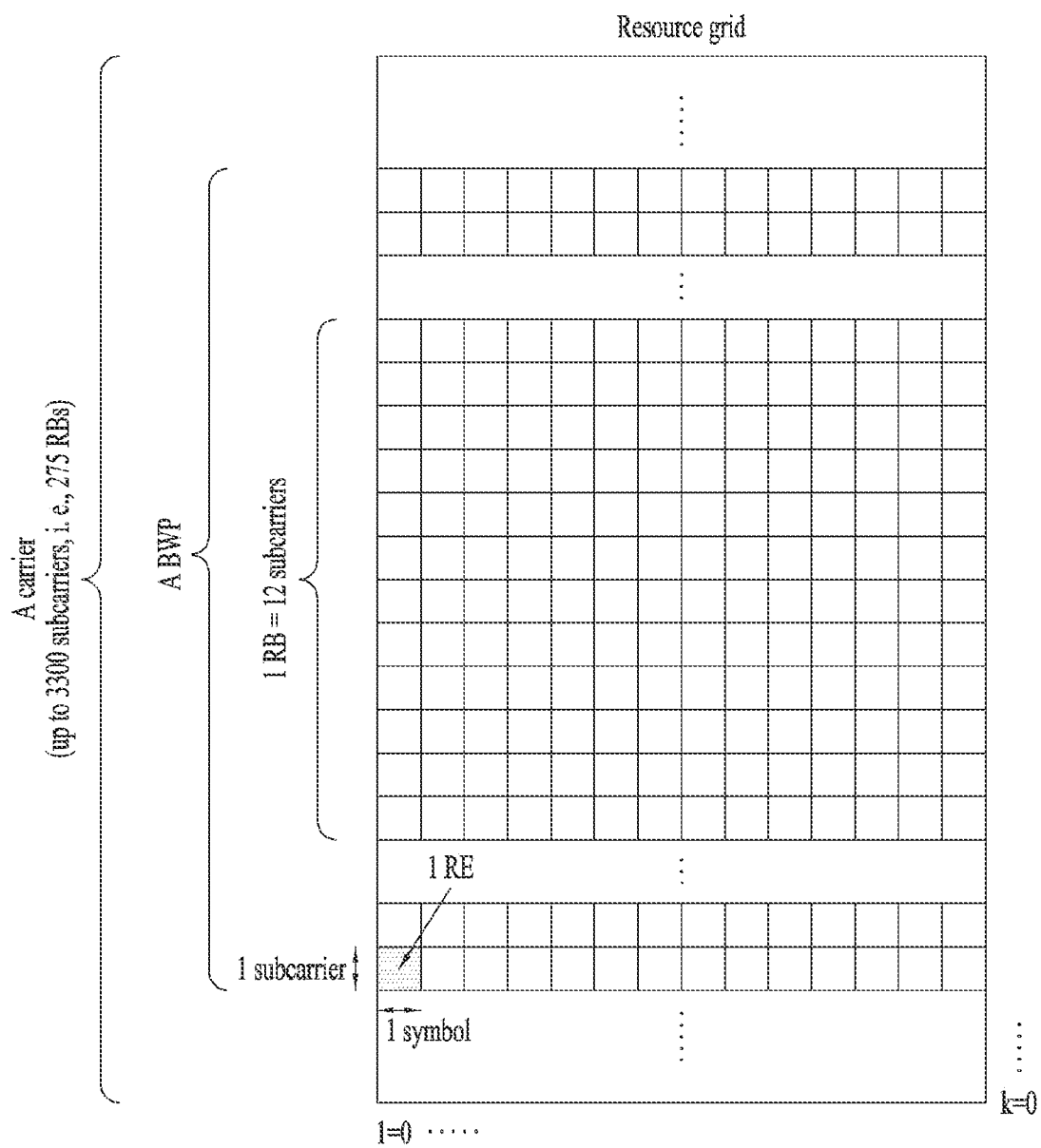
FIG. 8 is a diagram illustrating a slot structure in an NR system to which embodiments of the present disclosure are applicable.

FIG. 8 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an active BWP, and only one BWP may be activated for one UE. In a resource grid, each element is referred to as an RE, to which one complex symbol may be mapped.

Figure 9:
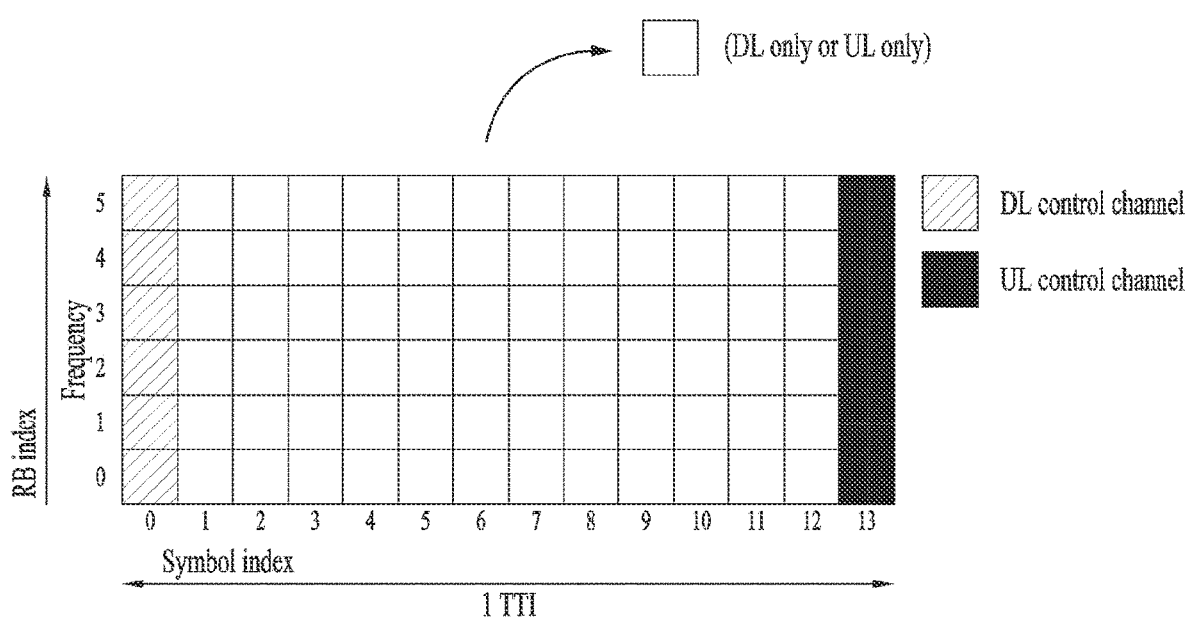
FIG. 9 is a diagram illustrating a self-contained slot structure in an NR system to which embodiments of the present disclosure are applicable.

FIG. 9 is a diagram illustrating a self-contained slot structures in an NR system to which embodiments of the present disclosure are applicable.

In FIG. 9, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a base station and a UE may sequentially perform DL transmission and UL transmission in one slot. That is, the base station and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the base station and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 9.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-aryl quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

Figure 10:
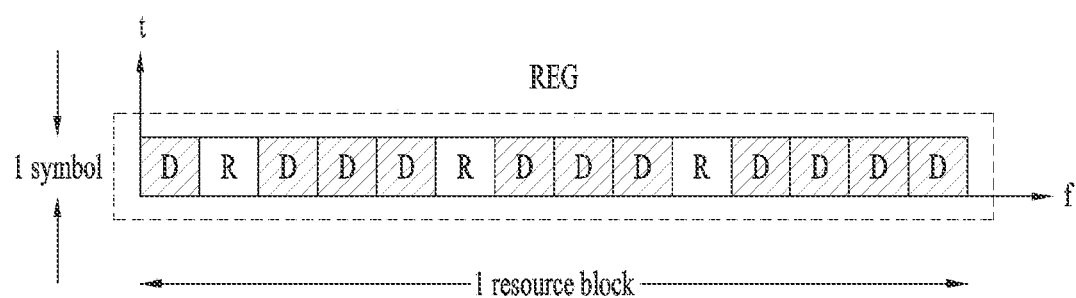
FIG. 10 is a diagram illustrating the structure of one REG in an NR system to which embodiments of the present disclosure are applicable.

FIG. 10 is a diagram illustrating the structure of one REG in an NR system to which embodiments of the present disclosure are applicable.

In FIG. 10, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSC in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 3 lists exemplary PUCCH formats.

TABLE 4

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤9 | HARQ, [SR] | Sequence modulation |
| 2 | 1-2 | >2 | HARQ, CSI, [SR] | CP-OFDM |
| 3 | 4-14 | >9 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the base station by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

4.3. Synchronization Signal Block (SSB) or SS/PBCH Block

In the NR system to which the present disclosure is applicable, a primary synchronization signal (PSS), a secondary synchronization signal (SSS), and/or a physical broadcast signal (PBCH) may be transmitted in one SS block or SS PBCH block (hereinafter, referred to as an SSB or SS/PBCH block). Multiplexing other signals may not be precluded within the SSB.

The SS/PBCH block may be transmitted in a band other than the center of a system band. Particularly, when the BS supports broadband operation, the BS may transmit multiple SS/PBCH blocks.

Figure 11:
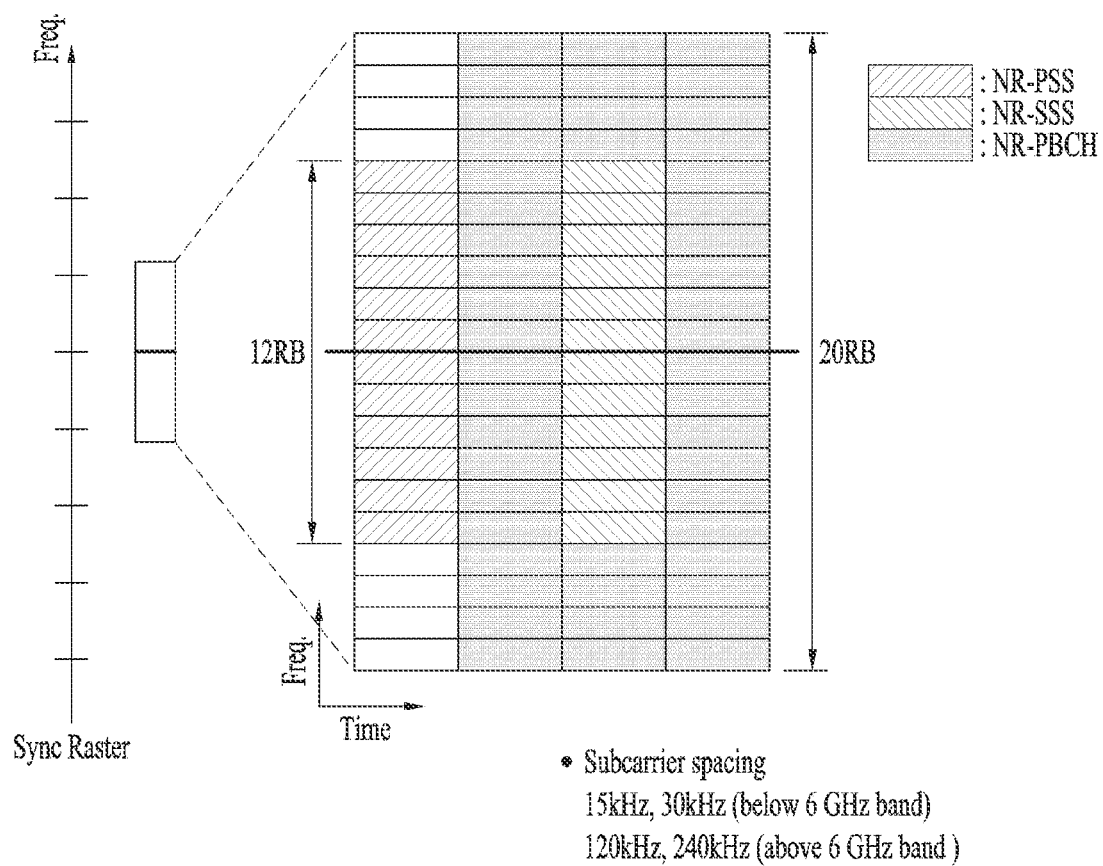
FIG. 11 is a schematic diagram illustrating a synchronization signal/physical broadcast channel (SS/PBCH) block applicable to the present disclosure.

FIG. 11 is a schematic diagram illustrating an SS/PBCH block applicable to the present disclosure.

As illustrated in FIG. 11, the SS/PBCH block applicable to the present disclosure may include 20 RBs in four consecutive OFDM symbols. In addition, the SS/PBCH block may be composed of a PSS, an SSS and a PBCH, and the UE may perform cell search, system information acquisition, beam alignment for initial access, DL measurement, and the like based on the SS/PBCH block.

Each of the PSS and the SSS is configured with 1 OFDM symbol and 127 subcarriers, and the PBCH is configured with 3 OFDM symbols and 576 subcarriers. Polar coding and quadrature phase shift keying (QPSK) are applied to the PBCH. The PBCH PBCH includes data REs and demodulation reference signal (DMRS) REs in each OFDM symbol. Three DMRS REs are present in each RB, and three data REs are present between DMRS REs. In this case, the positions of the DMRS REs may be determined based on the cell ID (for example, mapped subcarrier indexes may be determined based on the value of $N^{cell}_{ID}$ mod 4).

Further, the SS/PBCH block may be transmitted even in a frequency band other than the center frequency of a frequency band used by the network.

For this purpose, a synchronization raster being candidate frequency positions at which the UE should detect the SS/PBCH block is defined in the NR system to which the present disclosure is applicable. The synchronization raster may be distinguished from a channel raster.

In the absence of explicit signaling of the position of the SS/PBCH block, the synchronization raster may indicate available frequency positions for the SS/PBCH block, at which the UE may acquire system information.

The synchronization raster may be determined based on a global synchronization channel number (GSCN). The GSCN may be transmitted by RRC signaling (e.g., an MIB, a system information block (SIB), remaining minimum system information (RMSI), other system information (OSI), or the like).

The synchronization raster is defined to be longer along the frequency axis than the channel raster and characterized by a smaller number of blind detections than the channel raster, in consideration of the complexity of initial synchronization and a detection speed.

Figure 12:
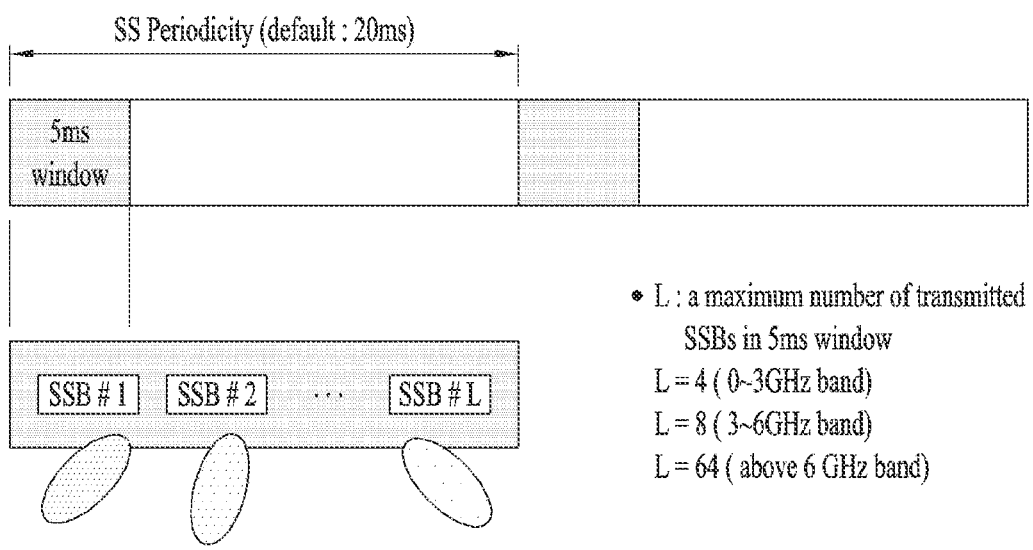
FIG. 12 is a schematic diagram illustrating an SS/PBCH block transmission configuration applicable to the present disclosure.

FIG. 12 is a schematic diagram illustrating an SS/PBCH block transmission structure applicable to the present disclosure.

In the NR system to which the present disclosure is applicable, the BS may transmit an SS/PBCH block up to 64 times for 5 ms. The multiple SS/PBCH blocks may be transmitted on different beams, and the UE may detect the SS/PBCH block on the assumption that the SS/PBCH block is transmitted on a specific one beam every 20 ms.

As the frequency band is higher, the BS may set a larger maximum number of beams available for SS/PBCH block transmission within 5 ms. For example, the BS may transmit the SS/PBCH block by using up to 4 different beams at or below 3 GHz, up to 8 different beams at 3 to 6 GHz, and up to 64 different beams at or above 6 GHz, for 5 ms.

4.4. Synchronization Procedure

The UE may acquire synchronization by receiving the above-described SS/PBCH block from the BS. The synchronization procedure largely includes cell ID detection and timing detection. The cell ID detection may include PSS-based cell ID detection and SSS-based cell ID detection (e.g., detecting one physical layer cell ID out of a total of 1008 physical layer cell IDs). The timing detection may include PBCH DMRS-based timing detection and PBCH contents-based (e.g., MIB-based) timing detection.

To this end, the UE may assume that reception occasions of the PBCH, PSS, and SSS are provided in consecutive symbols (namely, the UE may assume that the PBCH, PSS, and SSS constitute an SS/PBCH block as described above). Next, the UE may assume that the SSS, PBCH DM-RS, and PBCH data have the same energy per resource element (EPRE). In this case, the UE may assume that the ratio of PSS EPRE to SSS EPRE of the SS/PBCH block in the corresponding cell is 0 dB or 3 dB. Alternatively, when dedicated higher layer parameters are not provided to the UE, a UE monitoring a PDCCH for DCI format 1_0 having a cyclic redundancy check (CRC) scrambled by a system information-random network temporary identifier (SI-RNTI), a paging-random network temporary identifier (P-RNTI), or a random access-random network temporary identifier (RA-RNTI) may assume that the ratio of PDCCH DMRS EPRE to SSS EPRE is within a range of −8 dB to 8 dB.

First, the UE may acquire timing synchronization and the physical cell ID of a detected cell by detecting a PSS and an SSS. More specifically, the UE may acquire the symbol timing of the SS block and detect a cell ID within a cell ID group, by PSS detection. Subsequently, the UE detects the cell ID group by SSS detection.

Further, the UE may detect the time index (e.g., slot boundary) of the SS block by the DMRS of the PBCH. The UE may then acquire half-frame boundary information and system frame number (SFN) information from an MIB included in the PBCH.

The PBCH may indicate that a related (or corresponding) RMSI PDCCH/PDSCH is transmitted in the same band as or a different band from that of the SS/PBCH block. Accordingly, the UE may then receive RMSI in a frequency band indicated by the PBCH or a frequency band carrying the PBCH, after decoding of the PBCH.

In the SS/PBCH block in the half frame, the first symbol indexes for candidate SS/PBCH blocks may be determined according to the subcarrier spacing of the SS/PBCH blocks as follows. In this case, index #0 corresponds to the first symbol of the first slot in the half frame.

Case A (15 kHz subcarrier spacing): The first symbols for the candidate SS/PBCH blocks may include symbols {2, 8}+14*n. For a frequency band below 3 GHz, n is 0 or 1. For a frequency band greater than 3 GHz and less than or equal to 6 GHz, n is 0, 1, 2, or 3.

Case B (30 kHz subcarrier spacing): The first symbols of the candidate SS/PBCH blocks may include symbols {4, 8, 16, 32}+28*n. For a frequency band less than or equal to 3 GHz, n is 0. For a frequency band greater than 3 GHz and less than or equal to 6 GHz, n is 0 or 1.

Case C (30 kHz subcarrier spacing): The first symbols of the candidate SS/PBCH blocks may include symbols {2, 8}+14*n. For a frequency band less than or equal to 3 GHz, n is 0 or 1. For a frequency band greater than 3 GHz and less than or equal to 6 GHz, n is 0, 1, 2, or 3.

Case D (120 kHz subcarrier spacing): The first symbols of candidate SS/PBCH blocks may include symbols {4, 8, 16, 20}+28*n. For a frequency band greater than 6 GHz, n is 0, 1, 2, 3, 5, 6, 7, 8, 19, 11, 12, 13, 15, 16, 17 or 18.

Case E (240 kHz subcarrier spacing): The first symbols of the candidate SS/PBCH blocks may include symbols {8, 12, 16, 20, 32, 36, 40, 44}+56*n. For a frequency band greater than 6 GHz, n is 0, 1, 2, 3, 5, 6, 7 or 8.

In relation to the above-described operation, the UE may acquire system information.

The MIB contains information/parameters for monitoring a PDCCH for scheduling a PDSCH carrying system information block1 (SIB1), and is transmitted to the UE by the BS through the PBCH in the SS/PBCH block.

The UE may check whether there is a control resource set (CORESET) for the Type0-PDCCH common search space based on the MIB. The Type0-PDCCH common search space is a kind of PDCCH search space, and is used to transmit a PDCCH for scheduling an SI message.

When the Type0-PDCCH common search space is present, the UE may determine (i) a plurality of contiguous resource blocks constituting the CORESET and one or more consecutive symbols and (ii) a PDCCH occasion (e.g., a time domain position for PDCCH reception), based on the information (e.g., pdcch-ConfigSIB1) in the MIB.

When the Type0-PDCCH common search space is not present, pdcch-ConfigSIB1 provides information about a frequency position at which SSB/SIB1 is present and a frequency range in which SSB/SIB1 is not present.

SIB1 contains information related to availability and scheduling (e.g., transmission period, SI-window size) of the remaining SIBs (hereinafter, SIBx, where x is an integer greater than or equal to 2). For example, SIB1 may indicate whether SIBx is periodically broadcast or is provided in an on-demand manner (or at the request from the UE). When SIBx is provided in the on-demand manner, SIB1 may contain information necessary for the UE to make an SI request. SIB1 is transmitted on the PDSCH, and the PDCCH for scheduling SIB1 is transmitted through the Type0-PDCCH common search space. SIB1 is transmitted on a PDSCH indicated by the PDCCH.

4.5. Synchronization Raster

Synchronization raster represents a frequency position of the SSB that may be used by the UE for system information acquisition when there is no explicit signaling for the SSB position. A global synchronization raster is defined for all frequencies. The frequency position of the SSB is defined by $SS_{REF}$ and a corresponding global synchronization channel number (GSCN). The parameters defining $SS_{REF}$ and GSCN for all frequency ranges are shows below.

TABLE 5

| Frequency range | SS Block frequency position $SS_{REF}$ | GSCN | Range of GSCN |
|---|---|---|---|
| 0-3000 MHz | N * 1200 kHz + M * 50 kHz, N = 1:2499, M ∈ {1, 3, 5} (Note 1) | 3N + (M − 3)/2 | 2-7498 |
| 3000-24250 MHz | 3000 MHz + N * 1.44 MHz N = 0:14756 | 7499 + N | 7499-22255 |

NOTE 1:
The default value for operating bands with SOS spaced channel raster is M = 3.

Mapping between a synchronization raster and the resource block of the corresponding SSB may be performed based on the table below. The mapping may depend on the total number of resource blocks allocated in a channel, and may be applied to both UL and DL.

TABLE 6

| Resource element index k | 0 |
|---|---|
| Physical resource block number $n_{PRB}$ of the SS block | $n_{PRB}$ = 10 |

4.6. DCI Format

In the NR system to which the present disclosure is applicable, the following DCI formats may be supported. First, the NR system may support DCI format 0_0 and DCI format 0_1 as a DCI format for PUSCH scheduling and support DCI format 1_0 and DCI format 1_1 as a DCI format for PDSCH scheduling. In addition, as DCI formats usable for other purposes, the NR system may additionally support DCI format 2_0, DCI format 2_1, DCI format 2_2, and DCI format 2_3.

Herein, DCI format 0_0 is used to schedule a transmission block (TB)-based (or TB-level) PUSCH. DCI format 0_1 may be used to schedule a TB-based (or TB-level) PUSCH or code block group (CBG)-based (or CBG-level) PUSCH (in the case in which CBG-based signal transmission and reception is configured).

In addition, DCI format 1_0 may be used to schedule TB-based (or TB-level) PDSCH. DCI format 1_1 may be used to schedule TB-based (or TB-level) PDSCH or CBG-based (or CBG-level) PDSCH (in the case in which CBG-based signal transmission and reception is configured).

In addition, DCI format 2_0 may be used to notify UEs of a slot format. DCI format 2_1 may be used to notify UEs of PRB(s) and OFDM symbol(s) in which a specific UE assumes that no transmission is intended therefor. DCI format 22 may be used to transmit transmission power control (TPC) commands for a PUCCH and a PUSCH. DCI format 2_3 may be used to transmit a group of TPC commands for SRS transmission by one or more UEs.

More specifically, DCI format 1_1 may include an MCS/NDI (New Data Indicator)/RV (Redundancy Version) field for transport block (TB) 1, and may further include an MCS/NDI/RV field for TB 2 only when a higher layer parameter maxNrofCodeWordsScheduledByDCI in the higher layer parameter PDSCH-Config is configured with n2 (i.e., 2).

In particular, when the higher layer parameter maxNrofCodeWordsScheduledByDCI is configured with n2 (i.e., 2), whether the TB is enabled/disabled may substantially be determined by a combination of the MCS field and the RV field. More specifically, when the MCS field has a value of 26 and the RV field has a value of 1 for a specific TB, the specific TB may be disabled.

Detailed features of the DCI formats may be supported by 3GPP TS 38.212. That is, obvious steps or parts which are not explained by DCI format-related features may be explained with reference to the above document. In addition, all terms disclosed in the present document may be explained by the above standard document.

4.7. Control Resource Set (CORESET)

One CORESET includes $N^{CORESET}_{RB}$ RBs in the frequency domain and $N^{CORESET}_{symb}$ symbols (having a value of 1, 2, or 3) in the time domain.

One control channel element (CCE) includes 6 resource element groups (REGs) and one REG is equal to one RB in one OFDM symbol. REGs in the CORESET are numbered in a time-first manner. Specifically, the REGs are numbered starting with '0' for the first OFDM symbol and the lowest-numbered RB in the CORESET.

A plurality of CORESETs may be configured for one UE. Each CORESET is related only to one CCE-to-REG mapping.

CCE-to-REG mapping for one CORESET may be interleaved or non-interleaved.

Configuration information for the CORESET may be configured by a higher layer parameter ControlResourceSet IE.

In the present disclosure, the higher layer parameter ControlResourceSet IE may be configured as shown in the table below.

TABLE 7

ControlResourceSet information element

-- ASN1START
-- TAG-CONTROLRESOURCESET-START
ControlResourceSet ::= SEQUENCE {
controlResourceSetId ControlResourceSetId,
frequencyDomainResources BIT STRING (SIZE (45)),
duration INTEGER (1..maxCoReSetDuration),
cce-PEG-MappingType CHOICE {
interleaved SEQUENCE {
reg-BundleSize ENUMERATED (n2, n3, n6),
interleaverSize ENUMERATED (n2, n3, n6),
shiftIndex INTEGER(0..maxNrofPhysicalResourceBlocks-1) OPTIONAL -- Need S
},
nonInterleaved NULL
},
precodeGranularity ENUMERATED (sameAsREG-bundle, allContigousRBs),
tci-StatesPDCCH-ToAddList SEQUENCE(SIZE (1..maxNrofTCI-StatesPDCCH)) of TCI-StateId
OPTIONAL, -- Cond NotSIB1-initialBWP
tci-StatesPDCCH-ToReleaseList SEQUENCE(SIZE (1..maxNrofTCI-StatesPDCCH)) OF TCI-StateId
OPTIONAL, -- Cond NotSIB1-initialBWP
tci-PresentInDCI ENUMERATED {enabled} OPTIONAL, --Need S
pdcch-DMRS-ScramblingID INTEGER(0..65535) OPTIONAL, --Need S
...
}

The parameters defined in the table above may be the same as those defined in the 3GPP TS 38.331 standard.

In addition, configuration information for CORESET 0 (e.g., common CORESET) may be configured by a higher layer parameter ControlResourceSetZero IE.

4.8. Antenna Port Quasi Co-Location

One UE may be configured with a list of up to M transmission configuration indicator (TCI) state configurations. The M TCI-state configurations may be configured by a higher layer parameter PDSCH-Config to decode a PDSCH (by the UE) according to a detected PDCCH with DCI intended for the UE and the given serving cell. Herein, M may be determined depending on the capability of the UE.

Each TCI state contains parameters for configuring a quasi co-location (QCL) relationship between one or two DL reference signals and the DMRS ports of the PDSCH. The QCL relationship is configured by the higher layer parameter qcl-Type1 for a first DL RS and a higher layer parameter qcl-Type2 for a second DL RS (if configured). For the case of two DL RSs, the QCL types should not be the same, regardless of whether the RSs are the same DL RS or different DL RSs. The QCL type corresponding to each DL RS is given by a higher layer parameter qcl-Type within a higher layer parameter QCL-Info and may have one of the following values:

'QCL-TypeA': {Doppler shift, Doppler spread, average delay, delay spread}

'QCL-TypeB': {Doppler shift, Doppler spread}
'QCL-TypeC': {Doppler shift, average delay}
'QCL-TypeD': {Spatial Rx parameter}

The UE receives an activation command used to map up to 8 TCI states to codepoints of a TCI field in the DCI. When a HARQ-ACK signal corresponding to the PDSCH carrying the activation command is transmitted in slot #n, mapping between the TCI states and codepoints of the TCI field in the DCI may be applied starting from slot $\#(n+3*N^{subframe, \mu}_{slot}+1)$. Here, $N^{subframe, \mu}_{slot}$ is determined based on Table 1 or Table 2 described above. After the UE receives initial higher layer configuration of TCI states and before the UE receives the activation command, the UE assumes that DM-RS port(s) of a PDSCH of a serving cell are quasi co-located with an SS/PBCH block determined in the initial access procedure with respect to 'QCL-TypeA'. Additionally, the UE may assume that the DM-RS port(s) of the PDSCH of the serving cell are quasi co-located with the SS/PBCH block determined in the initial access procedure also with respect to 'QCL-TypeD' at the above timing.

If a higher layer parameter tci-PresentInDCI is set as 'enabled' for a CORESET scheduling the PDSCH, the UE assumes that the TCI field is present in a PDCCH of DCI format 1_1 transmitted on the CORESET. If the higher layer parameter tci-PresentInDCI is not configured for the CORESET scheduling the PDSCH or the PDSCH is scheduled by DCI format 1_0 and if a time offset between the reception of the DL DCI and the reception of the corresponding PDSCH is equal to or greater than a threshold Threshold-SchedOffset (where the threshold is based on UE capability), for determining PDSCH antenna port QCL, the UE assumes that a TCI state or QCL assumption for the PDSCH is identical to a TCI state or QCL assumption applied to a CORESET used for PDCCH transmission.

If the higher layer parameter tci-PresentInDCI is set as 'enabled', the TCI field in the DCI scheduling a component carrier (CC) points to activated TCI states in the scheduled CC or a DL BW, and the PDSCH is scheduled by DCI format 1_1, the UE uses a TCI-state according to the TCI field in the DCI in a detected PDCCH to determine PDSCH antenna port QCL. The UE may assume that DMRS ports of the PDSCH of a serving cell are quasi co-located with RS(s) in the TCI state with respect to QCL type parameter(s) given by an indicated TCI state if the time offset between the reception of the DL DCI and the reception of the corresponding PDSCH is equal to or greater than the threshold Threshold-Sched-Offset (where the threshold is determined based on reported UE capability). When the UE is configured with a single slot PDSCH, the indicated TCI state should be based on the activated TCI states in a slot with the scheduled PDSCH. When the UE is configured with CORE-SET associated with a search space set for cross-carrier scheduling, the UE expects that the higher layer parameter tci-PresentInDci is set as 'enabled' for the CORESET. If one or more of the TCI states configured for the serving cell scheduled by the search space set contains 'QCL-TypeD', the UE expects the time offset between the reception of the detected PDCCH in the search space set and the reception of the corresponding PDSCH is greater than or equal to the threshold Threshold-Sched-Offset.

For both the cases when higher layer parameter tci-PresentInDCl is configured with 'enabled' and the higher layer parameter tci-PresentInDCl is not configured in RRC connected mode, if the offset between the reception of the DL DCI and the reception of the corresponding PDSCH is less than the threshold Threshold-Sched-Offset, the UE makes the following assumptions. (i) DM-RS ports of a PDSCH of a serving cell are quasi co-located with the RS(s) in a TCI state with respect to QCL parameter(s). (ii) In this case, the QCL parameter(s) are used for PDCCH QCL indication of the CORESET associated with a monitored search space with the lowest CORESET-ID in the latest slot in which one or more CORESETs within an active BWP of the serving cell are monitored by the UE.

In this case, if the 'QCL-TypeD' of a PDSCH DM-RS is different from 'QCL-TypeD' of a PDCCH DM-RS with which overlapping occurs in at least one symbol, the UE is expected to prioritize the reception of the ePDCCH associated with the corresponding CORESET. This operation may also be applied to an intra-band CA case (when the PDSCH and the CORESET are in different CCs). If none of configured TCI states contains 'QCL-TypeD', the UE obtains the other QCL assumptions from the indicated TCI states for a scheduled PDSCH irrespective of the time offset between the reception of the DL DCI and the reception of the corresponding PDSCH.

For a periodic CSI-RS resource in an NZP-CSI-RS-ResourceSet configured with a higher layer parameter trs-Info, the UE should assume that that a TCI state indicates one of the following QCL type(s):
  'QCL-TypeC' with an SS/PBCH block and, when (QCL-TypeD) is applicable, 'QCL-TypeD' with the same SS/PBCH block; or
  'QCL-TypeC' with an SS/PBCH block and, when (QCL-TypeD) is applicable, 'QCL-TypeD' with a periodic CSI-RS resource in a higher layer parameter NZPCSI-RS-ResourceSet configured with higher layer parameter repetition.

For a CSI-RS resource in the higher layer parameter NZP-CSI-RS-ResourceSet configured with the higher layer parameter trs-Info and without the higher layer parameter repetition, the UE should assume that a TCI state indicates one of the following QCL type(s):
  'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with the same CSI-RS resource; or
  'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with an SS/PBCH; or
  'QCL-TypeA' with a CSI-RS resource in the higher layer parameter NZP-CSI-RS-ResourceSet configured with the higher layer parameter trs-Info and, when (QCL-TyepD is) applicable, 'QCL-TypeD' with a periodic CSI-RS resource in the higher layer parameter NZP-CSI-RS-ResourceSet configured with the higher layer parameter repetition; or
  'QCL-TypeB' with a CSI-RS resource in the higher layer parameter NZP-CSI-RS-ResourceSet configured with the higher layer parameter trs-Info when 'QCL-TypeD' is not applicable.

For a CSI-RS resource in the higher layer parameter NZP-CSI-RS-ResourceSet configured with the higher layer parameter repetition, the UE should assume that a TCI state indicates one of the following QCL type(s):
  'QCL-TypeA' with a CSI-RS resource in the higher layer parameter NZP-CSI-RS-ResourceSet configured with the higher layer parameter trs-Info and, when ('QCL-TypeD) is applicable, 'QCL-TypeD' with the same CSI-RS resource; or
  'QCL-TypeA' with a CSI-RS resource in the higher layer parameter NZP-CSI-RS-ResourceSet configured with the higher layer parameter trs-Info and, when ('QCL-TypeD' is) applicable, 'QCL-TypeD' with a CSI-RS resource in the higher layer parameter NZP-CSI-RS-ResourceSet configured with higher layer parameter repetition; or
  'QCL-TypeC' with an SS/PBCH block and, when (QCL-TypeD) is applicable, 'QCL-TypeD' with the same SS/PBCH block.

For the DM-RS of PDCCH, the UE should assume that a TCI state indicates one of the following QCL type(s):
  'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource; or
  'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition; or
  'QCL-TypeA' with a CSI-RS resource in the higher layer parameter NZP-CSI-RS-ResourceSet configured without higher layer parameter trs-Info and without the higher layer parameter repetition and, when (QCL-TypeD) is applicable, 'QCL-TypeD' with the same CSI-RS resource.

For the DM-RS of the PDSCH, the UE should assume that a TCI state indicates one of the following QCL type(s):
  'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource; or
  'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition; or QCL-TypeA' with a CSI-RS resource in the higher layer parameter NZP-CSI-RS-ResourceSet configured without the higher layer parameter trs-Info and without the higher layer parameter repetition and, when (QCL-TypeD) is applicable, 'QCL-TypeD' with the same CSI-RS resource.

In this document, QCL signaling may include all signaling configurations listed in the table below.

TABLE 8

| QCL linkage for FR2 after RRC | signalling |
| --- | --- |
| SSB → TRS w.r.t average delay, Doppler shift, spatial RX parameters | QCL type C + D |
| TRS → CSI-RS for BM w.r.t. average delay, Dopper shift, delay spread, Doppler spread estimation | QCL type: A + D |
| TRS → CSI-RS for CSI w.r.t. average delay, Doppler shift, delay spread, Doppler spread estimation | QCL type: A |
| TRS → DMRS for PDCCH w.r.t. average delay, Dopper shift, delay spread, Doppler spread estimation | QCL type: A + D |
| TRS → DMRS for PDSCH w.r.t. average delay, Doppler shift, delay spread, Doppler spread estimation | QCL type: A + D |
| SSB → CSI-RS for BM w.r.t. average delay, Doppler shift, spatial RX parameters | QCL type: C + D |
| SSB → CSI-RS for CSI w.r.t, spatial RX parameters | QCL type: D |
| SSB → DMRS for PDCCH (before TRS is configured) w.r.t. average delay, Doppler shift, delay spread, Doppler spread, spatial RX parameters | QCL type: A + D |
| SSB → DMRS for PDSCH (before TRS is configured) w.r.t. average delay, Doppler shift, delay spread, Doppler spread, spatial RX parameters | QCL type: A + D |
| CSI-RS for BM → DMRS for PDCCH w.r.t. spatial RX parameters | QCL type: D |
| CSI-RS for BM → DMRS for PDSCH w.r.t., spatial RX parameters | QCL type: D |
| CSI-RS for CSI → DMRS for PDSCH w.r.t. average delay, Doppler shift, delay spread, Doppler spread, spatial RX parameters; Note: QCL parameters may not be derived directly from CSI-RS for CSI | QCL type A + D |
| CSI-RS for BM → CSI-RS for TRS/BM/CSI w.r.t. spatial RX parameters | QCL type: D |

In the following tables, if one row in the tables below has the same RS type, the same RS ID may be assumed for the row.

In the present disclosure, when a CSI-RS resource is included in the higher layer parameter NZP-CSI-RS-ResourceSet in which the higher layer parameter trs-Info is configured, the UE may expect the following two possible configurations for a higher layer parameter TCI-state.

TABLE 9

| Valid TCI state Configuration | DL RS 1 | qcl-Type1 | DL RS 2 (if configured) | qcl-Type2 (if configured) |
| --- | --- | --- | --- | --- |
| 1* | SS/PBCH Block | QCL-TypeC | SS/PBCH Block | QCL-TypeD |
| 2* | SS/PBCH Block | QCL-TypeC | CSI-RS (BM) | QCL-TypeD |

In Table 9, * represents a case in which QCL type-D is applicable. When QCL type-D is applicable, DL RS 2 and QCL type-2 need to be configured for the UE.

In the present disclosure, when a CSI-RS resource is included in the higher layer parameter NZP-CSI-RS-ResourceSet in which the higher layer parameter trs-Info and the higher layer parameter repetition are not configured, the UE expects the following three possible configurations for the higher layer parameter TCI-state.

TABLE 10

| Valid TCI state Configuration | DL RS 1 | qcl-Type1 | DL RS 2 (if configured) | qcl-Type2 (if configured) |
| --- | --- | --- | --- | --- |
| 1** | TRS | QCL-TypeA | TRS | QCL-TypeD |
| 2** | TRS | QCL-TypeA | SS/PBCH Block | QCL-TypeD |
| 3** | TRS | QCL-TypeA | CSI-RS (BM) | QCL-TypeD |
| 4* | TRS | QCL-TypeB | | |

In Table 10, * represents a case in which QCL type-D is not applicable.
In Table 10, ** represents a case in which QCL type-D is applicable. When QCL type-D is applicable, DL RS 2 and QCL type-2 need to be configured for the UE.

In the present disclosure, when a CSI-RS resource is included in the higher layer parameter NZP-CSI-RS-ResourceSet in which the higher layer parameter repetition is configured, the UE expects the following three possible configurations for the higher layer parameter TCI-state.

TABLE 11

| Valid TCI state configuration | DL RS 1 | qcl-Type1 | DL RS 2 (if configured) | qcl-Type2 (if configured) |
| --- | --- | --- | --- | --- |
| 1 | TRS | QCL-TypeA | TRS | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

In Tables 12 and 13 below, if QCL type-D is applicable, DL RS 2 and QLC type-2 need to be configured for the UE except a default case (e.g., the fourth row in Tables 12 and 13). When a TRS for DL is used for QCL type-D, the TRS is a source RS for QCL type-D and thus needs to have an SS/PBCH block or CSI-RS.

For a PDCCH DMRS, the UE expects the following three possible configurations for the higher layer parameter TCI-state. The fourth configuration is a default configuration and valid before the TRS is configured.

TABLE 12

| Valid TCI state Configuration | DL RS 1 | qcl-Type1 | DL RS 2 (if configured) | qcl-Type2 (if configured) |
| --- | --- | --- | --- | --- |
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In Table 12, * represents that the TRS is not configured yet. In this case, the configuration may be a valid QCL assumption rather than a TCI state.
In Table 12, ** represents that QCL parameters may not be directly derived from CSI-RS(s) (CSI).

For the DMRS of the PDCCH, the UE may expect only the following three possible configurations of the higher layer parameter TCI-State while the fourth configuration (the fourth row in the two tables below) is valid by default before the TRS is configured.

TABLE 13

| Valid TCI state Configuration | DL RS 1 | qcl-Type1 | DL RS 2 (if configured) | qcl-Type2 (if configured) |
| --- | --- | --- | --- | --- |
| 1 | TRS | QCL-TypeA | TRS | QCL-TypeD |
| 2 | TRS | QCL-TypeA | CSI-RS (BM) | QCL-TypeD |

TABLE 13-continued

| Valid TCI state Configuration | DL RS 1 | qcl-Type1 | DL RS 2 (if configured) | qcl-Type2 (if configured) |
|---|---|---|---|---|
| 3** | CSI-RS (CSI) | QCL-TypeA | CSI-RS (CSI) | QCL-TypeD |
| 4* | SS/PCH Block* | QCL-TypeA | SS/PBCH Block* | QCL-TypeD |

In Table 13, * represents that the TRS is not configured yet. In this case, the configuration may correspond to a valid QCL assumption rather than a TCI state.
In Table 13, ** represents that QCL parameters may not be directly derived from CSI-RS(s) (CSI).

For the DMRS of the PDCCH, the UE may expect only the following three possible configurations of the higher layer parameter TCI-State while the fourth configuration (the fourth row in the two tables below) is valid by default before the TRS is configured.

TABLE 14

| Valid TCI state Configuration | DL RS 1 | qcl-Type1 | DL RS 2 (if configured) | qci-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PSCH Block* | QCL-TypeD |

In the table above, * represents that the TRS is not configured yet. In this case, the configuration may correspond to a valid QCL assumption rather than a TCI state.
In the table above, ** represents that QCL parameters may not be directly derived from CSI-RS(s) (CSI).

In the present disclosure, the BS may configure a TCI state for the CORESET for the UE through the MAC-CE as shown below. The UE may determine, based on the TCI state, an Rx beam through which the UE is to receive the corresponding CORESET.

TABLE 15

| Serving Cell ID | | CORESET ID | Oct 1 |
|---|---|---|---|
| CORESET ID | TCI State ID | | Oct 2 |

For example, the BS may provide TCI state indication information to the UE through the UE-specific PDCCH MAC-CE configured as shown in the table above. The TCI state indication may be identified by a MAC subheader together with a logical channel ID (LCID). The TCI state indication may have affixed size of 16 bits including the following fields.
  Serving Cell ID: This field indicates the identity of a serving cell to which the MAC CE is applied. The length of the field is 5 bits.
  CORESET ID: This field indicates CORESET which is identified by the higher layer parameter ControlResourceSetd, and for which the corresponding TCI state is indicated. When the value of the field is 0, the field may indicate a CORESET configured by the higher layer parameter controlResourceSetZero. The length of the field is 4 bits.
  TCI State ID: This field indicates a TCI state identified by the higher layer parameter TCI-StateId and applicable to a CORESET identified by the CORESET ID field. When the CORESET ID field is set to 0, the field indicates TCI-StateId for a TCI state of the first 64 TCI states configured by the higher layer parameters tci-States-ToAddModList and tci-States-ToReleaseList included in the PDSCH-Config in the active BWP. Alternatively, when the CORESET ID field is set to a non-zero value, the field indicates TCI-StateId configured by the higher layer parameters tci-StatesPDCCH-ToAddList and tci-StatesPDCCH-ToReleaseList included in controlResourceSet identified by the indicated CORESET ID. The length of the field is 7 bits.

4.9. Channel State Information Reference Signal (CSI-RS)

In a mobile communication system according to the present disclosure, a method of improving transmit/receive data efficiency by adopting multiple transmit antennas and multiple receive antennas is used for packet transmission. In transmitting and receiving data using multiple input/output antennas, a channel state between a transmit antenna and a receive antenna should be detected in order to receive a signal accurately. Thus, each transmit antenna may have a separate reference signal. In this case, a reference signal for feedback of channel state information (CSI) may be defined as a CSI-RS.

The CSI-RS includes a Zero Power (ZP) CSI-RS and a Non-Zero-Power (NZP) CSI-RS. Here, the ZP CSI-RS and the NZP CSI-RS may be defined as follows.
  The NZP CSI-RS may be configured by the CSI-RS-Resource-Mobility field in the NZP-CSI-RS-Resource Information Element (IE) or CSI-RS-ResourceConfig-Mobility IE. The NZP CSI-RS may be defined based on a sequence generation and resource mapping method defined in the 3GPP TS 38.211 standard specification.
  The ZP CSI-RS may be configured by the ZP-CSI-RS-Resource IE. The UE may assume that resources configured for the ZP CSI-RS are not used for PDSCH transmission. The UE may perform the same measurement/reception on channels/signals except PDSCH regardless of whether they collide with ZP CSI-RS or not.

The position to which the CSI-RS is mapped in one slot may be dynamically determined by the number of CSI-RS ports, the CSI-RS density, Code Division Multiplexing (CDM)-Type, and higher layer parameters (e.g., firstOFDM-SymbolInTimeDomain, firstOFDMSymbolInTimeDomain2, etc.).

4.10. Search Space

FIG. 13 is a diagram illustrating a configuration of a higher layer parameter SearchSpace IE applicable to the present disclosure.

The BS may configure one or more search spaces associated with a CORESET for the UE by transmitting the SearchSpace IE shown in FIG. 13 to the UE through RRC signaling. Here, based on controlResourceSetID being defined in the SearchSpace IE, one search space may be associated with one CORESET.

The SearchSpace IE defines how/where the UE is to search for PDCCH candidate(s). Each search space is associated with one ControlResourceSet. In case of cross-carrier scheduling, all optional fields except nrofCandidates may be omitted (or absent) for a scheduled cell.

In the SearchSpace IE, each field may be defined as shown in the tables below.

TABLE 16 common
Configures this search space as common search space (CSS) and DCI formats to monitor.
controlResourceSetId
The CORESET applicable for the SearchSpace. Value 0 identifies the common CORESET#0 configured in MIB
and in ServingCellConfigCommon. Values
1 . . . maxNrofControlResourceSets-1 identify CORESETs configured in System Information or by dedicated signalling.
The CORESETs with non-zero controResourceSetId
locate in the same BWP as this SearchSpace.
dummy1, dummy2
This field is not used in the specification if received it shall be ignored by the UE.
dci-Fomat0-0-AndFormat1-0
If configured, the UE monitors the DCI formats 0_0 and 1_0 according to TS 38.213, clause 10.1.
dci-Format2-0
If configured, UE monitors the DCI format 2_0 according to TS 38.213, clause 10.1, 11.1.1.
dci-Format2-1
If configured, UE monitors the DCI format 2_1 according to TS 38.213, clause 10.1, 11.2.
dci-Format2-2
If configured, UE monitors the DCI format 2_2 according to TS 38.213, clause 10.1, 11.3.
dci-Format2-3
If configured, UE monitors the DCI format 2_3 according to T8 38.213, clause 10.1, 11.4
dci-Formats
Indicates whether the UE monitors in this USS for DCI formats 0-0 and 1-0 or for formats 0-1 and 1-1.

TABLE 17 duration
Number of consecutive slots that a SearchSpace lasts in every occasion, i.e., upon every period as given
in the periodicityAndOffset. If the field is absent, the UE applies the
value 1 slot, except for DCI format 2_0. The UE ignores this field for DCI format 2_0.
The maximum valid duration is periodicity-1 (periodicity as given in the
monitoringSlotPeriodicityAndOffset).
monitoringSlotPeriodicityAndOffset
Slots for PDCCH Monitoring configured as periodicity are offset. If the UE is configured to monitor DCI format
2_1.
only the values 'sl1', 'sl2' or 'sl4' are applicable. If the UE is
configured to monitor DCI format 2_0, only the values 'sl1', 'sl2', 'sl4', 'sl5', 'sl8', 'sl10', 'sl16',
and 'sl20' are applicable (see TS 38.213, clause 10).
monitoringSymbolsWithinSlot
The first symbol(s) for PDCCH monitoring in the slots configured for PDCCH monitoring
(see monitoringSlotPeriodicityAndOffset and duration). The most significant (left) bit
represents the first OFDM in a slot, and the second most significant (left) bit represents the second
OFDM symbol in a slot and so on. The bit(s) set to one identify the first
OFDM symbol(s) of the control resource set within a slot. If the cyclic prefix of the BWP is set to
extended CP, the last two bits within the bit string shall be ignored by the UE.
For DCI format 2_0, the first one symbol applies if the duration of CORESET (in the IE ControlResourceSet)
identified by controlResourceSetId indicates 3 symbols, the first
two symbols apply if the duration of CORESET identified by controlResourceSetId indicates 2 symbols,
and the first three symbols apply if the duration of CORESET identified
by controlResourceSetId indicates 1 symbol.
See TS 38.213, clause 10.
nrofCandidates-SFI
The number of PDCCH candidates specifically for format 2-0 for the configured aggregation level.
If an aggregation level is absent, the UE does not search for any candidates
with that aggregation level. The network configures only one aggregationLevel and the corresponding
number of candidates (see TS 38.213, clause 11.1.1).

TABLE 18 nrofCandidates
Number of PDCCH candidates per aggregation level. The number of candidates and aggregation levels
configured here applies to all formats unless a particular value is
specified or a format-specific value is provided (see inside searchSpaceType). If configured in the SearchSpace
of a cross carrier scheduled cell, this field determines the
number of candidates and aggregation levels to be used on the linked scheduling cell (see TS 38.213, clause 10).
searchSpaceId
Identity of the search space. SearchSpaceId = 0 identifies the searchSpaceZero configured via PBCH (MIB) or
ServingCellConfigCommon and may hence not be used in the
SearchSpace IE. The searchSpaceId is unique among the BWPs of a Serving Cell. In case of cross carrier scheduling,
search spaces with the same searchSpaceId in
scheduled cell and scheduling cell are linked to each other. The UE applies the search space for the scheduled
cell only if true DL BWPs in which the linked search spaces are
configured in scheduling cell and scheduled cell are both active.

TABLE 18-continued searchSpaceType
Indicates whether this is a common search space (present) or a UE specific search space as well as DCI formats to monitor for.
ue-Specific
Configures this search space as UE specific search space (USS). The UE monitors the DCI format with CRC scrambled by C-RNTI, CS-RNTI (if configured), and SP-CSI-RNTI (if configured)

In addition, the conditional phrase disclosed in the SearchSpace IE may be interpreted as follows.

TABLE 19

| Conditional Presence | Explanation |
|---|---|
| Setup | This field is mandatory present upon creation of a new SearchSpace. It is optionally present. Need M, otherwise. |
| SetupOnly | This field is mandatory present upon creation of a new SearchSpace. It is absent. Need M. otherwise. |

In the present disclosure, the UE may utilize a hashing function to calculate a control channel element (CCE) index in a search space set. Here, the hashing function may be configured based on the table below. In other words, the UE may calculate the CCE index from the search space set based on the following hashing function.

TABLE 20

Hashing function

For a search space set s associated with control resource set p, the CCE indexes for aggregation level L corresponding to PDCCH candidate $m_{s,n_{CI}}$ of the search space set in slot $n_{s,f}^{\mu}$ for a serving cell corresponding to carrier indicator field value $n_{CI}$ are given by $$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \mod \left\lfloor \frac{N_{CCE,p}}{L} \right\rfloor \right\} + i$$

where
For any common search space, $Y_{p,n_{s,f}^{\mu}} = 0$
For a UE-specific search space, $Y_{p,n_{s,f}^{\mu}} = (A_p \cdot Y_{p,n_{s,f}^{\mu}-1}) \mod D$, $Y_{p,-1} = n_{RNTI} \neq 0$, $A_0 = 39827$ for pmod3 = 0, $A_1 = 32829$ for pmod3 = 1, $A_2 = 39839$ for pmod3 = 2, and D = 65537; i = 0, . . . , L-1;
$m_{s,n_{CI}} = 0, \ldots, M_{p,s,n_{CI}}^{(L)} - 1$, where $M_{p,s,n_{CI}}^{(L)}$ is the number of PDCCH candidates the UE is configured to monitor for aggregation level L for a serving cell corresponding to $n_{CI}$ and a search space set s;
For any common search space, $M_{p,s,max}^{(L)} = M_{p,s,CI}^{(L)}$
For a UE-specific search space, $M_{p,s,max}^{(L)}$ is the maximum of $M_{p,s,n_{CI}}^{(L)}$ over all configured $n_{CI}$ values for a CCE aggregation level L of search space set s in control resource set p;

In the present disclosure, the Type 1 PDCCH common search space may represent a subset of a dedicated PDCCH search region for transmitting a PDCCH masked (or scrambled) with an RA-RNTI, a temporary cell RNTI (TC-RNTI), or a cell RNTI (C-RNTI) in the primary cell. During the entire period of the RACH procedure, the UE may monitor the search space. In the RACH procedure, the UE may detect DCI for Msg2 (e.g., PDSCH) and DCI for Msg4 (e.g., PDSCH) through monitoring of the search space.

The search space may be configured by ra-ControlResourceSet in the higher layer parameter PDCCH-Config-Common. An RRC message or IE carrying the higher layer parameter PDCCH-ConfigCommon may include SIB1, BWP-DownlinkCommon, BWP-DownlinkDedicated, or the like. When there is no explicit configuration for the search space, the UE may search for the type 1 PDCCH in the type 0 PDCCH common search space.

4.11. Configuration parameter for CSI report (e.g. CSI-ReportConfig IE)

For a CSI report applicable to the present disclosure, a configuration parameter for a CSI report (e.g., CSI-ReportConfig) may be configured for the UE.

FIG. 14 is a diagram illustrating a configuration of a higher layer parameter CSI-ReportConfig IE applicable to the present disclosure.

In the CSI-ReportConfig IE, resourceForChannelMeasurement, csi-IM-ResourceForInterference, and nzp-CSI-RS-ResourceForInterference may have a relationship as disclosed below.

For aperiodic CSI, each trigger state configured using the higher layer parameter CSI-AperiodicTriggerState is associated with one or multiple CSI-ReportConfig where each CSI-ReportConfig is linked to periodic, or semi-persistent, or aperiodic resource setting(s):

When one Resource Setting is configured, the Resource Setting (given by higher layer parameter resourcesForChannelMeasurement is for channel measurement for L1-RSRP computation.

When two Resource Settings are configured, the first one Resource Setting (given by higher layer parameter resourcesForChannelMeasurement) is for channel measurement and the second one (given by either higher layer parameter csi-IM-ResourcesForInterference or higher layer parameter nzp-CSI-RS-ResourcesForInterference) is for interference measurement performed on CSI-IM or on NZP CSI-RS.

When three Resource Settings are configured, the first Resource Setting (higher layer parameter resourcesForChannelMeasurement) is for channel measurement, the second one (given by higher layer parameter csi-IM-ResourcesForInterference) is for CSI-IM based interference measurement and the third one (given by higher layer parameter nzp-CSI-RS-ResourcesForInterference) is for NZP CSI-RS based interference measurement.

For semi-persistent or periodic CSI, each CSI-ReportConfig is linked to periodic or semi-persistent Resource Setting(s):

When one Resource Setting (given by higher layer parameter resourcesForChannelMeasurement) is configured, the Resource Setting is for channel measurement for L1-RSRP computation.

When two Resource Settings are configured, the first Resource Setting (given by higher layer parameter resourcesForChannelMeasurement) is for channel measurement and the second Resource Setting (given by higher layer parameter csi-IM-ResourcesForInterference) is used for interference measurement performed on CSI-IM.

A UE is not expected to be configured with more than one CSI-RS resource in resource set for channel measurement for a CSI-ReportConfig with the higher layer parameter codebookType set to 'typeII' or to 'typeII-PortSelection'. A UE is not expected to be configured with more than 64 NZP CSI-RS resources in resource setting for channel measurement for a CSI-ReportConfig with the higher layer parameter reportQuanity set to 'none'. cri-RI-CQI 'cri-RSRP' or 'ssb-Index-RSRP'. If interference measurement is performed on CSI-IM, each CSI-RS resource for channel measurement is resource-wise associated with a CSI-IMI resource by the ordering of the CSI-RS resource and CSI-IM resource in the corresponding resource sets. The number of CSI-RS, resources for channel measurement equals to the number of CSI-IM resources.

If interference measurement is performed on NZP CSI-RS, a UE does not expect to be configured with more than one NZP CSI-RS resource in the associated resource set within the resource setting for channel measurement. The UE configured with the higher layer parameter nzp-CSI-RS-ResourcesForInterference may expect no more than 18 NZP CSI-RS ports configured in a NZP CSI-RS resource set.

For CSI measurement(s), a UE assumes:
each NZP CSI-RS port configured for interference measurement corresponds to an interference transmission layer.
all interference transmission layers on NZP CSI-RS ports for interference measurement take into account the associated EPRE ratios configured in 5.2.2.3.1:
other interference signal on REs of NZP CSI-RS resource for channel measurement, NZP CSI-RS resource for interference measurement, or CSI-IM resource for interference measurement.

Based on the above relationship, CSI calculation may be performed as follows.

If the UE is configured with a CSI-ReportConfig with the higher layer parameter reportQuanity set to 'cri-RSRP', 'cri-RI-PMI-CQI', 'cri-RI-il'. 'cri-RI-il-CQI', 'cri-RI-CQI' or 'cri-RI-LI-PMI-CQI', and $K_s>1$ resources are configured in the corresponding resource set for channel measurement, then the UE shall derive the CSI parameters other than CRI conditioned on the reported CRI, where CRI k (k≥0) corresponds to the configured (k+1)-th entry of associated nzp-CSI-RSResource in The corresponding nzp-CSI-RS-ResourceSet for channel measurement, and (k+1)-th entry of associated csi-IM-Resource in the corresponding csi-IM-ResourceSet (if configured) If $K_s=2$ CSI-RS resources are configured, each resource shall contain at most 16 CSI-RS ports. If $2<K_s\leq 8$ CSI-RS resources are configured, each resource shall contain at most 8 CSI-RS ports.

According to whether the parameter groupBasedBeamReporting in the CSI-ReportConfig IE is 'enabled' or 'disabled', the report for reportQuantity={cri-RSRP or ssb-Index-RSRP} may be classified as follows.

If the UE is configured with a CSI-ReportConfig with the higher layer parameter reportQuanity set to 'cri-RSRP' or 'ssb-Index-RSRP'.
if the UE is configured with the higher layer parameter groupBasedBeamReporting set to 'disabled', the UE is not required to update measurements for more than 64 CSI-RS and/or SSB resources, and the UE shall report in a single report nrofReportedRS (higher layer configured) different CRI or SSBRI for each report setting.
if the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters.

If the UE is configured with a CSI-ReportConfig with higher layer parameter reportQuanity set to 'cri-RSRP' or 'none' and the CSI-ReportConfig is linked to a resource setting configured with the higher layer parameter resourceType set to 'aperiodic', then the UE is not expected to be configured with more than 16 CSI-RS resources in a CSI-RS resource set contained within the resource setting.

For L1-RSRP calculation, the UE may be configured as follows. The UE may perform reporting according to nrofReportedRS or groupBasedBeamReporting as follows.

For L1-RSRP computation
the UE may be configured with CSI-RS resources. SS/PBCH Block resources or both CSI-RS and SS/PBCH block resources, when resource-wise quasi co-located with 'QCL-Type C' and 'QCL-TypeD' when applicable.
the UE may be configured with CSI-RS resource setting up to 16 CSI-RS resource sets having up to 64 resources within each set. The total number of different CSI-RS resources over all resource sets is no more than 128.

For L1-RSRP reporting, if the higher layer parameter nrofReportedRS in CSI-ReportConfig is configured to be one, the reported L1-RSRP value is defined by a 7-bit value in the range [−140, −44] dBm with 1 dB step size, if the higher layer parameter nrofReportedRS is configured to be larger than one, or if the higher layer parameter groupBasedBeamReporting is configured as 'enabled', the UE shall use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is described in [11, TS 38.133].

Additionally, to report a channel quality indicator (CQI) of CSI according to the present disclosure, the UE may refer to the following tables, which are defined in section 5.2.2.1 in 3GPP TS 38.214. More specifically, the UE may report CQI information (e.g., index) closest to the measured CQI to the BS based on the tables below.

TABLE 21

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0 3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 23

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

TABLE 22

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1157 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

4.12. Reference Signal Received Power (RSRP) Reporting

The UE may refer to the table below for RSRP reporting. More specifically, based on the table below, the UE may report RSRP information (e.g., index) closest to the measured RSRP to the BS.

TABLE 24

| BRSRP index | Measured quantity value [dBm] |
|---|---|
| 0 | BRSRP < −140 |
| 1 | −140 ≤ BRSRP < −139 |
| 2 | −139 ≤ BRSRP < −138 |
| ... | ... |
| 95 | −46 ≤ BRSRP < −45 |
| 96 | −45 ≤ BRSRP < −44 |
| 97 | −44 ≤ BRSRP |

4.13. Beam Management

The BS may make a request to the UE for periodic Channel State Information (CSI)/beam reporting, semi-persistent CSI/beam reporting (e.g., periodic reporting is activated only during a specific time period or the UE performs reporting a plurality of times consecutively), or aperiodic CSI/beam reporting.

Here, the CSI report information may include one or more of the following pieces of information.

Rank indicator (RI). Example: Information on the number of layers/streams the UE wants to receive simultaneously;

Precoder matrix indication (PMI). Example: Information on multiple input multiple output (MIMO) precoding the BS prefers to apply from the UE perspective;

Channel quality information (CQI). Example: Channel quality information in consideration of the strength of the signal desired by the UE and the strength of the interference signal;

CSI-RS resource indicator (CRI). Example: A CSI-RS resource index preferred by the UE among a plurality of CSI-RS resources (to which different beamforming is applied);

Layer indicator (LI). Index of the layer with the best quality from the UE perspective.

The beam report information may be composed of a specific combination of a CRI indicating a preferred beam index when the RS for beam quality measurement is CSI-RS, an SSBID indicating a preferred beam index when the beam quality measurement RS is SSB, RS received power (RSRP) information indicating a beam quality, and the like.

For periodic and semi-persistent (SP) CSI/beam reporting by the UE, the BS may allocate, to the UE, an uplink (UL) physical channel (e.g., PUCCH, PUSCH) for CSI/beam reporting during a time period in which the reporting is activated with a specific periodicity. In addition, for the CSI measurement of the UE, the BS may transmit a downlink reference signal (DL RS) to the UE.

In a beamformed system to which (analog) beamforming is applied, it is necessary to determine a DL transmission (Tx)/reception (Rx) beam pair for transmission/reception of the DL RS and a UL Tx/Rx beam pair for transmission/reception of uplink control information (UCI) (e.g., CSI, ACK/NACK).

The DL beam pair determination procedure may be composed of a combination of (i) a TRP Tx beam selection procedure in which the BS transmits DL RSs corresponding to a plurality of TRP Tx beams to the UE, and the UE selects and/or reports one of the beams, and (ii) a procedure in which the BS repeatedly transmits the same RS signal corresponding to each TRP Tx beam, and the UE measures the repeatedly transmitted signals with different UE Rx beams in response to select a UE Rx beam.

The UL beam pair determination procedure may be composed of a combination of (i) a UE Tx beam selection procedure in which the UE transmits UL RSs corresponding to a plurality of UE Tx beams to the BS, and the BS selects and/or signals one of beams, and (ii) a procedure in which the UE repeatedly transmits the same RS corresponding to the UE Tx beams, and the BS measures the repeatedly transmitted signals with different TRP Rx beams in response to select a TRP Rx beam.

When beam reciprocity (or beam correspondence) of DL/UL is established (for example, when it is possible to assume in communication between the BS and the UE that the BS DL Tx beam coincides with the BS UL Rx beam, and the UE UL Tx beam coincides with the UE DL Rx beam), and one of the DL beam pair and the UL beam pair is determined, the procedure for determining the other pair may be omitted.

The procedure for determining the DL and/or UL beam pair may be performed periodically or aperiodically. For example, when the number of candidate beams is large, a required RS overhead may be increased. In this case, the procedure for determining the DL and/or UL beam pair may be performed with a predetermined periodicity in consideration of the RS overhead.

After the DL/UL beam pair determination procedure is completed, the UE may perform periodic or SP CSI reporting. The CSI-RS including a single or multiple antenna ports for CSI measurement of the UE may be beamformed and transmitted through a TRP Tx beam determined as a DL beam. In this case, the CSI-RS transmission period may be set equal to the CSI reporting period of the UE or shorter than the CSI reporting period of the UE.

Alternatively, the BS may transmit the aperiodic CSI-RS in accordance with the CSI reporting period of the UE or more frequently than the CSI reporting period of the UE.

The UE may transmit the measured CSI information using a UL Tx beam determined in the periodic UL beam pair determination procedure.

4.14. Beam Recovery Procedure

When the UE and the BS perform the DL/UL beam management procedure, a beam mismatch issue may occur depending on the period of the configured beam management.

In particular, when the wireless channel environment is changed due to a change in the location of the UE, rotation of the UE, or movement of a nearby object (for example, the line of sight (LoS) situation is changed to the non-LoS situation by a beam block, etc.), the optimal DL/UL beam pair may be changed. More generally, this change may correspond to a a situation in which tracking according to a beam management procedure performed by a network instruction has failed, and thus a beam failure event occurs.

The UE may determine whether such a beam failure event occurs, based on the reception quality of the DL RS.

Subsequently, the UE may transmit a message for reporting this situation or a message for a beam recovery request (hereinafter, referred to as a beam failure recovery request (BFRQ) message) to the BS (or network).

The BS may receive the message and perform beam recovery through various procedures such as beam RS transmission and beam reporting request for beam recovery. This series of beam recovery procedures may be referred to as beam failure recovery (BFR).

According to standard documents such as 3GPP TS 38.213 and 3GPP TS 38.321, the BFR procedure may be configured as follows.

(1) Beam Failure Detection (BFD)

When all PDCCH beams fall below a predetermined quality value (Q_out), the physical layer of the UE declares one beam failure instance.

Here, the quality of the beam is measured based on a hypothetical block error rate (BLER). In other words, when it is assumed that the control information is transmitted on the corresponding PDCCH, the characteristics of the beam may be measured based on the probability that the UE fails to demodulate the information.

For implicit configuration for the BFD RS, a plurality of search spaces for monitoring the PDCCH may be configured for a specific UE. In this case, a beam (or resource) may be configured differently among the search spaces. Accordingly, if all PDCCH beams fall below a predetermined quality value, this may mean that the quality of all beams that may be configured differently among the search spaces falls below the BLER threshold.

In this regard, various configuration methods may be applied/configured for the BFD reference signal (or BFD RS).

As an example, an implicit configuration method may be used for the BFD RS. As a specific example, an ID of a control resource set (CORESET) (refer to TS 38.213, TS 38.214, and TS 38.331), which is a resource region in which the PDCCH may be transmitted, may be configured for each search space. In addition, the BS may indicate/configure, to/or to the UE, RS information (e.g., CSI-RS resource ID, SSB ID) that is QCLed in terms of spatial RX parameters for each CORESET ID. For example, the BS may indicate/configure a QCLed RS to/for the UE through an indication of a transmit configuration information (TCI).

Here, the operation of indicating/configuring, by the BS, the QCLed RS (i.e., QCL Type D in TS 38.214) to/for the UE in terms of spatial RX parameters may include indicating/configuring that the UE should (or may) use the beam used to receive the spatially QCLed RS when the UE receives the corresponding PDCCH DMRS. In other words, the operation of indicating/configuring, by the BS, the QCLed RS (i.e., QCL Type D in TS 38.214) to/for the UE in terms of spatial RX parameters may include informing the UE that the BS will transmit the spatially QCLed antenna ports by applying the same Tx beam or a similar Tx beam (e.g., a beam having the same/similar beam direction but having a different beam width) from the BS perspective.

For explicit configuration for the BFD RS, the BS may explicitly configure a specific RS (e.g., beam RS(s)) for use in BFD for the UE. Here, the specific RS may correspond to the 'all PDCCH beams'.

For simplicity, a plurality of BFD RSs is defined as a BFD RS set.

Next, when a beam failure instance occurs (continuously) a preset number of times, the media access control (MAC) layer of the UE may declare the beam failure.

(2) New beam identification & selection (2-1) Step 1

The UE may find a beam whose quality is greater than or equal to a predetermined quality value (Q_in) among RSs configured as a candidate beam RS set by the BS.

- If a beam RS exceeds the predetermined quality value (threshold), the UE may select the beam RS.
- If multiple beam RSs exceed the predetermined quality value, the UE may select one beam RS from among the beam RSs.

If there is no beam RS exceeding the predetermined quality value, the UE may perform Step 2 described below.

In the above-described operation, the beam quality may be determined based on RSRP.

In the present disclosure, the RS beam set configured by the BS may be configured as in one of the following three cases:

All the beam RSs in the RS beam set are composed of SSBs;

All the beam RSs in the RS beam set are composed of CSI-RS resources;

Beam RSs in the RS beam set are composed of SSBs and CSI-RS resources.

(2-2) Step 2

The UE may find a beam whose quality is greater than or equal to a predetermined quality value (Q_in) among the SSBs (connected to a contention based PRACH resource).

If an SSB exceeds the predetermined quality value, the UE may select the SSB.

If multiple SSBs exceed the predetermined quality value, the UE may select one SSB from among the SSBs.

If there is no SSB exceeding the predetermined quality value, the UE may perform Step 3 described below.

(2-3) Step 3

The UE may select any SSB from among the SSBs (connected to the contention based PRACH resource).

(3) CFRA Based BFRQ & Monitoring gNB's Response

In the present disclosure, a beam failure recovery request (BFRQ) may include transmitting, to the BS, a PRACH resource and a PRACH preamble configured to be directly or indirectly connected to the beam RS (e.g., CSI-RS or SSB) that the UE select in the above-described steps. In other words, the BFRQ may include transmitting a PRACH preamble related to the beam RS selected by the UE in the above-described steps through a PRACH resource related to the beam RS selected by the UE.

In the present disclosure, the PRACH resource and the PRACH preamble that are directly connected may be used in the following cases:

A contention-free PRACH resource and PRACH preamble are configured for a specific RS in the candidate beam RS set separately configured for BFR; or a (contention based) PRACH resource and PRACH preamble mapped to SSBs configured for a general purpose, such as random access, in a one-to-one correspondence manner are configured.

Alternatively, the indirectly connected PRACH resource and PRACH preamble may be used in the following cases:

The contention-free PRACH resource and PRACH preamble are not configured for a specific CSI-RS in the candidate beam RS set separately configured for BFR:

In this case, the UE may select a (contention-free) PRACH resource and PRACH preamble connected to an SSB designated as being receivable through the same reception beam as the CSI-RS (e.g., an SSB quasi-co-located (QCLed) with respect to the spatial Rx parameter).

For simplicity, in the following description, the RSRQ based on a contention-free PRACH resource and PRACH preamble is referred to as a contention free random access (CFRA) based RSRQ.

Based on the above-described configuration, the UE may transmit the PRACH preamble to the BS, and may monitor a response to the PRACH transmission from the BS (e.g., gNB).

In this case, the response signal to the contention-free PRACH resource and the PRACH preamble may be transmitted on a PDCCH masked with a cell random network temporary identifier (C-RNTI). The PDCCH may be received on a search space configured separately (by RRC signaling) for the purpose of BFR.

The search space may be configured in a specific CORESET (for the BFR).

In the present disclosure, the response signal to the contention based PRACH for BFR may reuse the CORESET (e.g., CORESET 0 or CORESET 1) and search space configured for the random access procedure that is based on the contention based PRACH.

In the above-described configuration, if the UE fails to receive the response signal for a certain period of time, the UE may repeat the above-described new beam identification & selection operation and the BFRQ & monitoring gNB's response operation.

In the present disclosure, the UE may perform the above operation (i) until the number of times of PRACH transmission reaches a preset maximum number (e.g., N_max) or (ii) until a separately set timer expires. In this case, when the timer expires, the UE may stop contention free PRACH transmission. However, in the case of the contention based PRACH transmission by SSB selection, the UE may perform the PRACH transmission (regardless of whether the timer expires) until N_max is reached.

(4) CBRA Based BFRQ & Monitoring gNB's Response

The UE may carry out contention based random access (CBRA)-based BFRQ in the following cases:

The UE fails CFRA-based BFRQ. In this case, the UE may perform CBRA-based BFRQ as a subsequent operation;

CFRA is not defined in the active BWP;

A CORESET associated with the higher layer parameter SearchSpace-BFR is not configured or the higher layer parameter SearchSpace-BFR is not configured.

However, since the UE uses the PRACH resource used for UL initial access for CBRA unlike in the case of CFRA, collision with other UEs may occur.

The above-described beam failure detection and beam recovery procedures may be summarized as follows.

The MAC entity may be configured by RRC with a beam failure recovery procedure which is used for indicating to the serving gNB of a new SSB or CSI-RS when beam failure is detected on the serving SSB(s)/CSI-RS(s). The beam failure may be detected by counting the indications of beam failure instance from the lower layer to the MAC entity. For the beam failure detection and recovery procedures, the BS may configure the following parameters in the higher layer parameter BeamFailureRecoveryConfig for the UE through RRC signaling:

beamFailureinstanceMaxCount (for beam failure detection);

beamFailureDetectionTimer (for beam failure detection);

beamFailureRecoveryTimer (for the beam failure recovery procedure);

rsrp-ThresholdSSB, the RSRP threshold for beam failure recovery;

powerRampingStep, a powerRampingStep parameter for beam failure recovery;

preambleReceivedTargetPower, a preambleReceivedTargetPower parameter for beam failure recovery;

preambleTransMax, a preambleTransMax parameter for beam failure recovery;

ra-ResponseWindow, a time window for monitoring response(s) for the beam recovery procedure using the contention-free random access preamble;
prach-ConfigIndex, a prach-ConfigIndex parameter for beam failure recovery;
ra-ssb-OccasionMaskIndex, a ra-ssb-OccasionMaskIndex parameter for beam failure recovery; and
ra-OccasionList, a ra-OccasionList parameter for beam failure recovery.

The UE may use the following parameter for the beam failure detection procedure:
BFI COUNTER, a counter for beam failure instance indication. The initial value is set to 0.

The MAC entity of the UE may operate as follows.
1> When a beam failure instance indication is received from the lower layer(s):
  2> Start or restart beamFailureDetectionTimer;
  2> Increment BFI COUNTER by 1.
  2> If BFI COUNTER>=beamFailureInstanceMaxCount:
    3> when the higher layer parameter beamFailureRecoveryConfig is configured:
      4> Start beamFailureRecoveryTimer (if configured),
      4> By applying the parameters powerRampingStep, preambleReceivedTargetPower, and preambleTransMax configured in the higher layer parameter beamFailureRecoveryConfig, initiate a random access procedure in a special cell (SpCell) (e.g., the primary cell in the macro cell group (MCG), or the primary secondary cell group (SCG) cell (PSCell) in the SCG, etc.);
    3> Or
      4> Initiate the random access procedure in the SpCell.
1> If beamFailureDetection Timer expires:
  2> Set BTY_COUNTER to 0.
1> If the random access procedure is successfully completed:
  2> Stop beamFailureRecoveryTimer (when configured);
  2> Consider that the beam failure recovery procedure has been successfully completed.

Additionally, the PCell, SCell, and serving cell according to the present disclosure may be defined as follows.

[1] Primary Cell (PCell)

A cell operating at a primary frequency. This is a cell in which the UE performs an initial connection establishment procedure or initiates a connection re-establishment procedure, or a cell indicated as a primary cell in the handover procedure.

[2] Secondary Cell (SCell)

A cell operating at a secondary frequency. This is a cell that may be configured when an RRC connection is established or a cell used to provide additional radio resources, such as an additional carrier for carrier aggregation.

In the present disclosure, configuring CBRA in the SCell may not be allowed. On the other hand, configuring CFRA in the SCell may be allowed.

[3] Serving Cell

For a UE in the RRC_CONNECTED state for which no CA is configured, only one serving cell including a PCell may be present. For a UE in the RRC_CONNECTED state for which CA is configured, the term 'serving cells' means one or more sets including a PCell and all SCell(s).

Additionally, according to the present disclosure, for BFRQ for DL only SCell, CBRA of the PCell may be utilized, or CFRA for SCell BFR may be additionally utilized (when SCell UL is present).

As an example, as a multi-beam-based operation, an operation based on a PCell configured in FR1 and an SCell configured in FR2 may be considered.

In this case, even when a beam failure occurs for the SCell, the link quality of the PCell UL may be assumed to be good. Since the SCell includes only DL component carriers (CCs), the MAC-CE in the PCell may be utilized as a simple solution for SCell BFR. In this case, the UE may transmit a cell ID, a new beam RS ID, etc. on the PCell PUSCH. For the MAC-CE-based solution, the UE may need to transmit a scheduling request (SR) on the PUCCH. In order to allow the BS to promptly recognize the situation of the UE (e.g., whether the UE requests a PUSCH for general data transmission or a PUSCH for BFR report, etc.), allocating a dedicated SR resource to the UE as an SR resource used only for BFRQ may be considered. This is transmission initiated by the UE. In this case, the SR PUCCH format may be reused.

As another example, as a multi-beam-based operation, the following items may be considered for beam failure recovery for an SCell configured as a DL only or DL/UL cell in FR2. In this case, the PCell may operate in FR2 as well as FR1.

For SCell BFR, it may be assumed that the link quality of PCell DL/UL is sufficiently good. If the PCell is in a beam failure state, recovery of the PCell beam may be performed through an existing BFR mechanism before recovering the SCell beam. To this end, a scheme in which only PCell UL is used for request/information related to SCell beam failure may be considered.

Regarding information delivered on the PCell UL, various options as follows may be considered:
Option 1: Occurrence of SCell beam failure;
Option 2: Occurrence of SCell beam failure and beam information about the failed and/or survived beam(s).

Compared to option 1, the additional effect/benefit of option 2 may not be significant. Because the PCell is still alive, the BS may trigger regular beam reporting in the PCell based on the existing beam reporting mechanism to acquire information for the SCell.

Accordingly, the UE may report only the occurrence of SCell beam failure through the PCell UL.

For the delivery of the information, the following three options may be considered:
Option 1: PRACH in PCell;
Option 2: PUCCH in PCell; and
Option 3: PUSCH in PCell.

Alternatively, when the SCell beam fails, the UE may report related information through a dedicated PUCCH resource of PUCCH format 0/1 in the PCell. Accordingly, a separate signal/message/procedure may not be defined for the SCell BFR.

4.15. Random Access Channel (RACH)

Hereinafter, a random access procedure and RACH applicable to the present disclosure will be described in detail.

Figure 15:
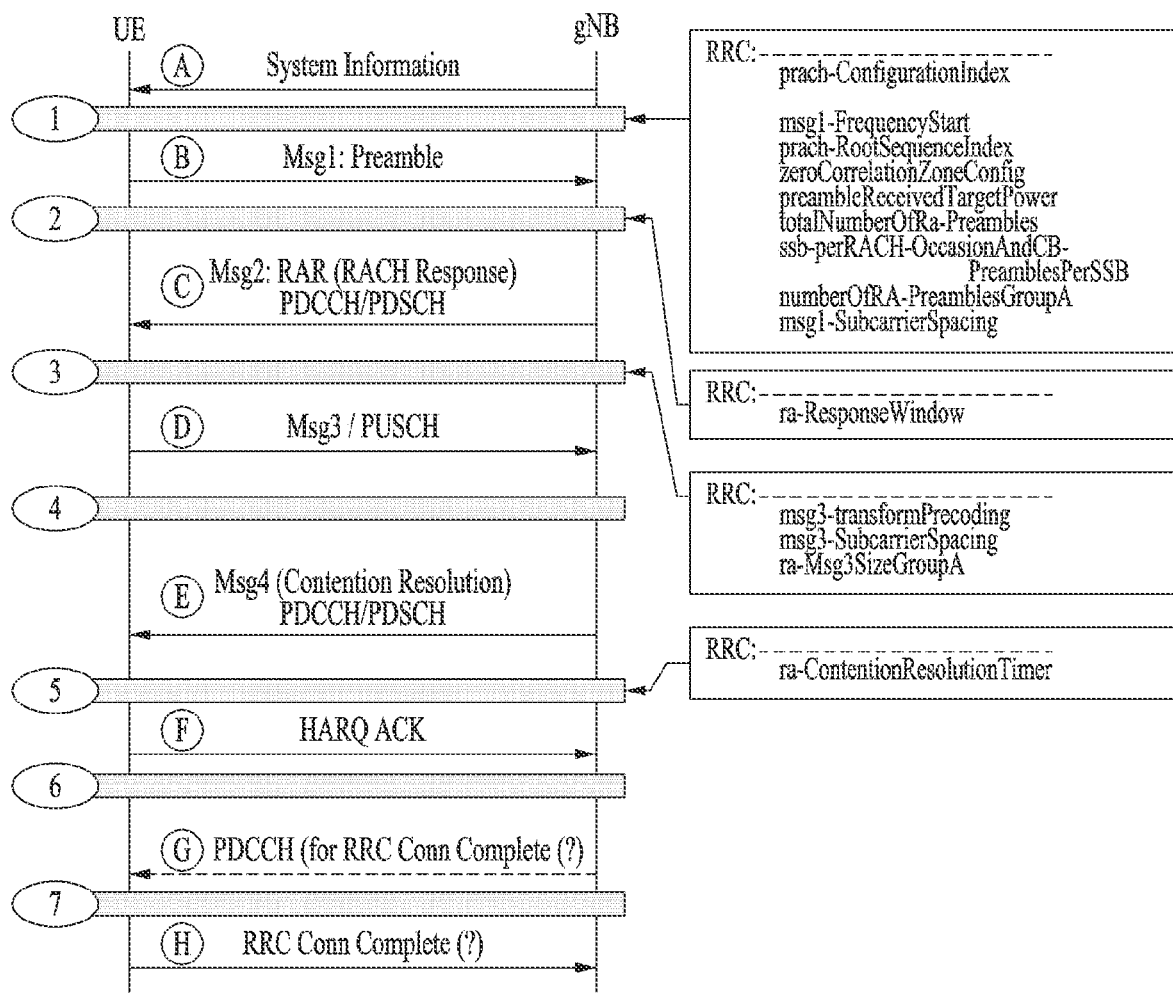
FIG. 15 is a schematic diagram illustrating a random access procedure applicable to the present disclosure.

FIG. 15 is a schematic diagram illustrating a random access procedure applicable to the present disclosure.

According to steps A and 1 in FIG. 15, the UE may receive system information (for initial attach) or RRC connection re-establishment information (for LTE interplay) from the BS.

According to step B in FIG. 15, the UE may transmit Msg1 (PRACH preamble) to the BS. In this step, when all conditions for PRACH transmission are satisfied, the UE may transmit the PRACH preamble masked (or scrambled) with the RA-RNTI to the BS.

According to steps 2 and C in FIG. 15, the UE may receive Msg 2 (e.g., random access response (RAR)) (on the PDCCH/PDSCH). In these steps (namely, after the PRACH transmission), the following procedures may be performed.

The BS transmits DCI scrambled with the (previously calculated) RA-RNTI value to the BS.

The UE may attempt to detect the PDCCH (e.g. DCI) masked (or scrambled) with the corresponding RA-RNTI within the RAR-window period. As an example, within the ra-ResponseWindow, the UE may look for DCI in a search space (e.g., Type 1 PDCCH common search space).

DCI format 1_0 masked (or scrambled) with the RA-RNTI may be used as a DCI format for scheduling the RAR PDSCH.

According to steps 3 and D in FIG. 15, the UE may transmit Msg3 to the BS (on the PUSCH). In these steps (namely, immediately before transmitting Msg3), the following procedures may be performed.

Based on a higher layer parameter (msg3-transformPrecoding) called msg3-tp, the UE should determine whether to apply transform precoding for the Msg3 PUSCH.

From a higher layer parameter (Subcarrier Spacing) called msg3-scs, the UE should determine the subcarrier spacing for the Msg3 PUSCH.

The UE transmits the Msg3 PUSCH in the same serving cell in which the PRACH has been transmitted.

According to steps 4 and E in FIG. 15, the UE may receive Msg4 (e.g., contention resolution) from the BS (on the PDCCH/PDSCH). In these steps (namely, immediately after transmitting Msg3), the following procedures may be performed. For simplicity, only the successful case will be described as follows.

The ra-ContentionResolutionTimer is started.

Monitoring for decoding the PDCCH masked (or scrambled) with a temporary C-RNTI (TC-RNTI) is performed. In other words, while the ra-ContentionResolutionTimer is running, the UE looks for DCI in the search space (e.g., Type 1 PDCCH common search space).

When the PDCCH is successfully decoded, the following operation is performed.
the UE decodes a PDSCH carrying a MAC CE.
Set C-RNTI=TC-RNTI.
The ra-ContentionResolutionTimer is discarded.
It is considered that the random access procedure has been successfully completed.

According to steps 5 and F in FIG. 15, the UE may transmit a HARQ ACK signal for Msg4 to the BS. Once the UE successfully decodes Msg4 (contention resolution), the UE may transmit a HARQ ACK for data (e.g., PDSCH carrying Msg4).

5. Operation Example of a Terminal and a BS Applicable to the Present Disclosure Regarding the present disclosure described in detail below, the Type 1 PDCCH common search space of the present disclosure may be defined as follows.

The Type 1 PDCCH common search space may represent a subset of the dedicated NR PDCCH search space for transmitting a PDCCH scrambled with an RA-RNTI, TC-RNTI, or C-RNTI in a primary cell (PCell). Accordingly, the terminal may monitor the search space during the entire period of the RACH process. In other words, the terminal may search the search space to find DCI(s) for Msg2 (PDSCH) and/or Msg4 (PDSCH) within the RACH process.

The Type 1 common search space may be explicitly configured by ra-ControlResourceSet in the higher layer parameter PDCCH-ConfigCommon. The higher layer parameter PDCCH-ConfigCommon may be transmitted through system information block 1 (SIB1), the higher layer parameter BWP-DownlinkCommon, the higher layer parameter BWP-DownlinkDedicated, and the like. If the configuration for the search space is not explicitly established by an RRC message (e.g., ra-ContorlResourceSet and/or ra-SearchSpace), the terminal may search for a Type 1 PDCCH in the Type 0 PDCCH common search space.

In addition, regarding the present disclosure described in detail below, terms used to describe the present disclosure are defined as follows.
BFR: Beam Failure Recovery
BFD: Beam Failure Detection
BFRQ: Beam Failure Recovery ReQuest
CFRA: Contention Free Random Access
CBRA: Contention Based Random Access
CARCI: CSI-AssociatedReportConfigInfo In the present disclosure, a CSI report may be configured/indicated by the CSI-ReportConfig IE, which is shown in FIG. 9.

In FIG. 14, reportQuantity may indicate CSI-related information or quantity to be reported by the terminal. More specifically, the terminal may perform CSI reporting based on the following.

The time and frequency resources that can be used by the UE to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI) and/or L1-RSRP.

For CQI, PMI, CRI, SSBRI, LI, RI, L1-RSRP, a UE is configured by higher layers with N≥1 CSI-ReportConfig Reporting Settings, M≥1 CSI-ResourceConfig Resource Settings, and one or two list(s) of trigger states (given by the higher layer parameters CSI-AperiodicTriggerStateList and CSI-SemiPersistentOnPUSCH-TriggerStateList). Each trigger state in CSI-AperiodicTriggerStateList contains a list of associated CSI-ReportConfigs indicating the Resource Set IDs for channel and optionally for interference. Each trigger state in CSI-SemiPersistentOnPUSCH-TriggerStateList contains one associated CSI-ReportConfig.

Each Reporting Setting CSI-ReportConfig is associated with a single downlink BWP (indicated by higher layer parameter BWP-Id) given in the associated CSI-ResourceConfig for channel measurement and contains the parameter(s) for one CSI reporting band:codebook configuration including codebook subset restriction time-domain behavior, frequency granularity for CQI and PMI, measurement restriction configurations, and the CSI-related quantities to be reported by the UE such as the layer indicator (LI), L1-RSRP, CRI, and SSBRI (SSB Resource Indicator).

The time domain behavior of the CSI-ReportConfig is indicated by the higher layer parameter reportConfigType and can be set to 'aperiodic', 'semiPersistentOnPUCCH', 'semiPersistentOnPUSCH' or 'periodic' For periodic and semiPersistentOnPUCCH/semiPersistentOnPUSCH CSI reporting, the configured periodicity and slot offset applies in the numerology of the UL BWP in which the CSI report is configured to be transmitted on. The higher layer parameter reportQuantity indicates the CSI-related or L1-RSRPrelated quantities to report. The reportFreqConfiguration indicates the reporting granularity in the frequency domain, including the CSI reporting band and if PMI/CQI reporting is wideband or sub-band. The timeRestrictionForChannelMeasurements parameter in CSI-ReportConfig can be configured to enable time domain restriction for channel measurements and timeRestrictionForInterferenceMeasurements can be configured to enable time domain restriction for interference measurements. The CSI-ReportConfig can also contain CodebookConfig, which contains configuration parameters for Type-I or Type II CSI including codebook subset restriction, and configurations of group based reporting.

In the present disclosure, when the terminal reports preferred beam information, the BS may assume that "cri-RSRP" or "ssb-Index-RSRP" is set as the reportQuantity for the UE. However, this is merely a limitation for simplicity. According to an embodiment, the BS may assume that "cri-SINR", "ssb-Index-SINR", "cri-RI-PMI-CQI", or the like can be set as the reportQuantity for the preferred beam information of the UE.

In the present disclosure, the term terminal may be replaced with user equipment (UE).

In the present disclosure, higher layer signaling may include radio resource control (RRC) signaling and MAC CE.

In the present disclosure, a transmission reception point (TRP) may be applied even to a beam.

In the present disclosure, a beam may be replaced with a resource.

According to the present disclosure, unlike in the LTE system, the UE may transmit a scheduling request (SR) to the BS both when there is no UL data to transmit (e.g., Case 1) and when there is UL data to transmit (e.g., Case 2). To this end, the UE may transmit different SR information according to Case 1 and Case 2. For example, in Case 1, the SR may have a value of '−1'. In Case 2, the SR may have a value of '+1'.

In the present disclosure, based on the SR transmission method, stating that "the UE does not transmit an SR for BFRQ" may not mean that the UE does not transmit the SR (or UL signal for BFRQ) because beam failure has not occurred, but may mean that the UE transmits, to the BS, an SR (or UL signal for BFRQ) indicating that beam failure has not occurred.

5.1. First Beam Failure Reporting Method

In the present disclosure, the method for beam failure reporting may include a method for encoding identification information of failed SCell and reporting information of new beam reporting for SCell BFR independently.

Figure 16:
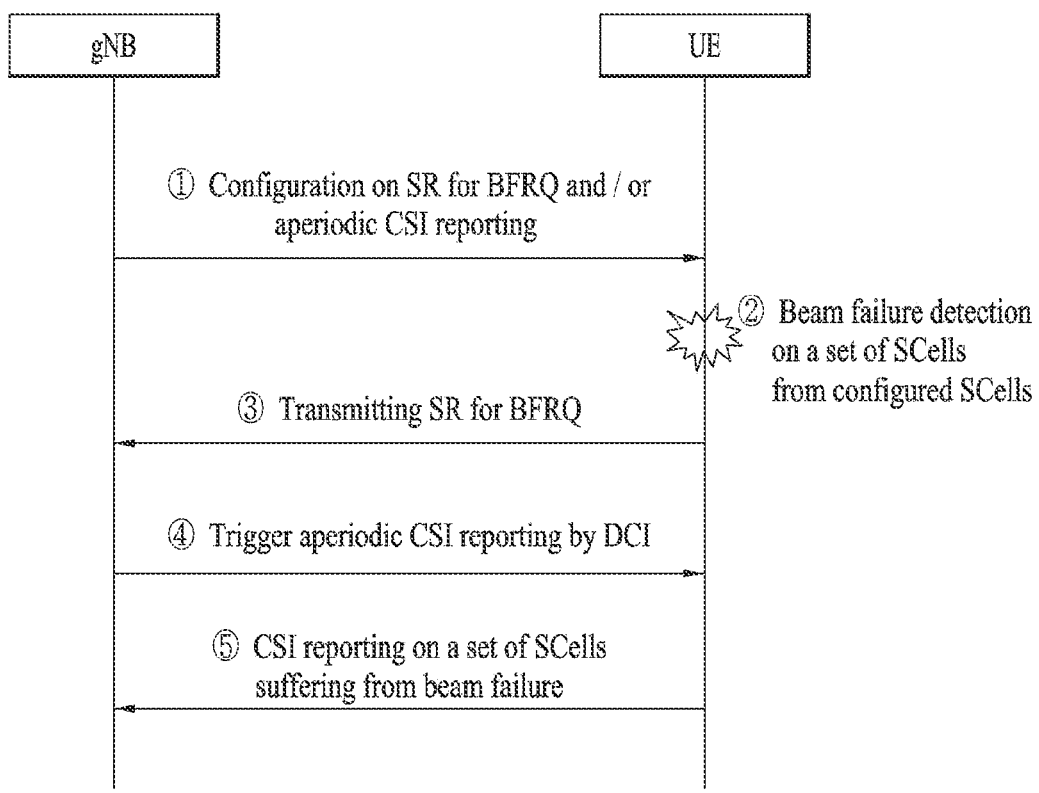
FIGS. 16 to 26 illustrate various examples of a method for reporting a beam failure by a terminal according to the present disclosure.

FIG. 16 schematically illustrates a method for reporting a beam failure by a UE according to an example of the present disclosure.

The BS (e.g., gNB) may configure, for the UE, at least one of a BFRQ dedicated SR, and/or a report on an index of the SCell in which the beam failure occurs, and/or preferred beam information (e.g., beam index, RSRP, etc.) about the UE in the SCell.

In response, the UE may detect that beam failure occurs in specific SCells among the configured SCells.

Based on the beam failure detection, the UE may transmit a BFRQ dedicated SR to the BS.

In response to the SR, the BS may trigger aperiodic CSI reporting to the UE through DCI including a 'CSI request' field.

The UE may report, to the BS, the SCell index in which the beam failure occurs (in this disclosure, the information is called, for example, primary information) and/or beam information preferred by the UE in the SCell (e.g., a beam index, RSRP, etc.) (in this disclosure, this information is called secondary information).

5.1.1. First Operation Example of the First Beam Failure Reporting Method

The UE may report whether beam failure occurs in one or more SCell(s) to the BS based on a bitmap (e.g., bit=0: no beam failure; bit=1: beam failure occurs). In addition, the UE may report, to the BS, beam information (e.g., beam index and/or RSRP) preferred by the UE for the SCell for which the bit value is activated (or the SCell in which beam failure has occurred). In this case, the first information (e.g., the bitmap information) and the second information (e.g., the preferred beam information) may be separately encoded. The size of the second information may be determined based on the first information.

More specifically, in an NR system to which the present disclosure is applicable, the BS may configure a maximum of 31 SCells for the UE. In this case, multiple SCells among up to 31 SCells may be physically located/configured at the same position (e.g., the multiple SCells may have the same center frequency or may be configured with different component carriers in the same band). In this case, the multiple SCells may be defined in different frequency bands so as to be distinguished from each other. When blockage occurs for multiple SCells physically located/configured at the same position, beam failure may occur for the multiple SCells at the same time.

Considering such an issue, the UE needs to report simultaneously whether beam failure occurs in one or more SCell(s) to the BS. If the UE reports sequentially whether the beam failure occurs in the respective SCells, beam recovery of the SCell reported last by the UE may be very late.

Therefore, in the first operation example, the UE may report not only whether beam failure occurs in one or more SCells, but also beam information preferred by the UE (e.g., a preferred beam index, RSRP, SINR, etc.) to the BS. In response, the BS may perform a beam recovery operation for the SCell based on the beam information. For example, the BS may change the beam of the CORESET of the SCell to beam information (e.g., a beam preferred by the UE) reported from the UEs.

In the present disclosure, the size of the second information may be determined based on (i) the number of SCells in which beam failure has occurred, and/or (ii) the number of non-zero power (NZP) CSI-RSs and/or SSBs configured in the SCell (in which beam failure has occurred), and/or (iii) the number of NZP CSI-RSs and/or SSBs configured for the purpose of new beam identification (NBI) (i.e., configured as candidates for new beam RSs) in the SCell (in which beam failure has occurred), and/or (iv) whether RSRP is transmitted.

When the UE may report to the BS SCells in which beam failure has occurred, the BS may predict the size of the second information.

In brief, in the first operation example, the first information may have a fixed size, but the size of the second information may be determined based on the first information. Accordingly, when the two different pieces of information are each (individually) encoded, the UE may minimize the size of UL feedback information required to report the information.

Alternatively, when the BS cannot predict the size of the second information, the BS may allocate/configure a PUSCH resource having any size to/for the UE for beam failure reporting. In this case, when the size of the allocated/configured PUSCH resource is larger than the size actually required by the UE, the UL resource may be wasted. On the other hand, when the size of the allocated/configured PUSCH resource is smaller than the size actually required by the UE, the UE may need to make a request for an additional PUSCH resource to the BS, which may increase latency. In this case, the UE may efficiently operate the UL resources by transmitting the first information and the second information in different resources.

Figure 17:
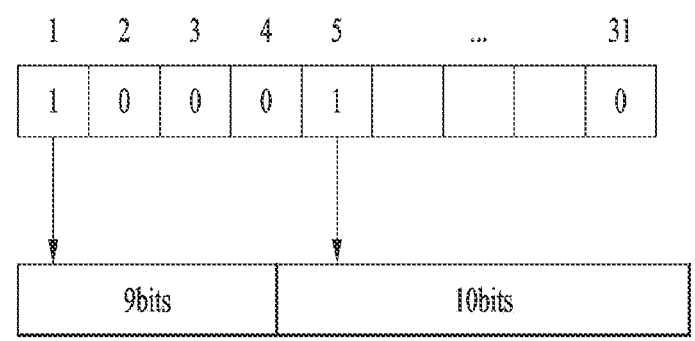

FIG. 17 schematically illustrates an example of the method for reporting a beam failure by a UE according to the present disclosure.

In FIG. 17, it is assumed that the BS configures 31 SCells for the UE. In FIG. 17, it is also assumed that a beam failure has occurred in SCells #1/#5 among the 31 SCells. In this case, as shown in FIG. 17, the UE may set the first and fifth bits in the bitmap of 31 bits to 1 and the remaining bits to 0 and report the setting to the BS.

Hereinafter, for simplicity, it is assumed that 4 NZP CSI-RS resources and 8 NZP CSI-RS resources are configured in SCells #1 and #5, respectively, as candidates for new beam RSs, the number of beams reported for each SCell is 1, and the bit size for RSRP for each SCell is 7 bits. In this case, as shown in FIG. 17, the bit sizes required for the UE to report the preferred beam information for SCell #1 and SCell #5 may be 9 (=2+7, for SCell #1), 10 (=3, +7, for SCell #5), respectively. Accordingly, the size of the second information according to FIG. 17 may be determined to be 19 bits.

Therefore, based on the report information shown in FIG. 17, the UE may (i) report, to the BS, whether beam failure has occurred in one or more SCells using a bitmap, and (ii) report, to the BS, preferred beam information related to the SCells in which beam failure has occurred at the same time (e.g., preferred beam index and RSRP/SINR, etc.). Thereby, UL feedback information overhead may be minimized.

In the case where the UE reports beam #3 and beam #7 to the BS as preferred beam information related to SCell #1 and SCell #5, respectively, the BS may indicate/configure, to/for the UE, respective beam information to be indicated/configured by the TCI of the CORESETs of SCell #1 and SCell #5, based on the reported beams (e.g., beam #3 for SCell #1 and beam #7 for SCell #5). For example, in the case of SCell #1, the BS may configure, for the UE, a CORESET transmitted based on beam #3. In the case of SCell #5, the BS may configure, for the UE, a CORESET transmitted based on beam #7.

In the present disclosure, the size of the bitmap (e.g., the size of the first information) may be determined based on the number of SCells configured (with BFD/BFR) for the UE.

Alternatively, the size of the bitmap (e.g., the size of the first information) may be determined based on higher layer signaling. In this case, each bit included in the bitmap may be configured to be connected to a specific SCell.

Alternatively, the BS may configure/define a bitmap having a size of up to 31 bits for the UE through RRC signaling. Subsequently, the BS may configure/indicate an activated bit in the size of up to 31 bits through the MAC-CE. Based on this, the UE may re-index only the activated bit to configure/determine a new bitmap, and may report, to the BS, whether the beam failure has occurred in the SCell(s) (corresponding to the activated bit) based on the configuration/determination.

Alternatively, the number of beams reported by the UE for each SCell may be set based on higher layer signaling (e.g., RRC and/or MAC-CE).

Alternatively, the number of beams reported by the UE for each SCell may be set as one piece of information/configuration, which may be applied to all SCells. For example, when the BS sets the number of beams reported by the UE for each SCell to 2, the UE may report up to two pieces of preferred beam information for each of the SCells. If the number of beams that the UE can report for a specific SCell is smaller than the number of beams configured (by the BS), the UE may set the number of beams reported for the specific SCell as the number of beams that the UE can report for the SCell and report the same.

In the present disclosure, according to an embodiment, the first information and the second information may be referred to as part 1 for SCell BFR and part 2 for SCell BFR, respectively.

In the present disclosure, the first information may be configured as information directly indicating the SCell index, not taking the form of a bitmap. For example, when SCells #1, #2, #3, and #4 are configured for the UE and SCells #3 and #4 are activated among the SCells, '0' of a specific bit may indicate SCell #3, '1' thereof may indicate SCell #4. Therefore, 1 bit is required, and thus 1 bit or 2 bits may be reduced compared to the bitmap scheme. However, when beam failure occurs in two SCells at the same time, the UE may report additional first information to the BS.

In the present disclosure, it is assumed that "bit=0" means "no beam failure" and that "bit=1" means "beam failure occurs". According to an embodiment, this configuration may be extended to a configuration in which "bit=1" means "no beam failure" and "bit=0" means "beam failure occurs".

5.1.2. Second Operation Example of the First Beam Failure Reporting Method

In the first operation example, the size of the bitmap may be determined based on the number of SCells configured for the UE. Alternatively, the size of the bitmap and/or the relationship between a specific bit and a specific SCell index may be determined/configured based on RRC and/or MAC-CE.

More specifically, although the Rel-15 NR system supports configuring up to 31 SCells for the UE, the number of SCells that the BS actually configures for the UE may be much smaller (it may be, for example, 2, 3, etc.). In view of this, configuring/defining a bitmap consisting of 31 bits may cause signaling overhead.

Accordingly, according to a first embodiment, when the number of SCells configured for the UE (to perform BFD/BFR) is 4, the size of the bitmap may be determined as/set to 4. In this case, the respective bits in the bitmap may be mapped to the configured SCell indexes (configured for the UE) in a one-to-one correspondence manner in order of the indexes. For example, when the SCell indexes are 1, 4, 5, and 8, the SCell indexes 1, 4, 5, and 8 may correspond to the first, second, third, and fourth bits in a one-to-one correspondence manner, respectively. In this case, when beam failure occurs in the fourth SCell, the UE may set the second bit in the bitmap to 1 and report the same to the BS.

Alternatively, according to a second embodiment, the size of the bitmap may be set/determined based on RRC and/or MAC-CE from the BS. In this case, the respective bits in the bitmap may be mapped to the configured SCell indexes (configured for the UE) in a one-to-one correspondence manner in order of the indexes. For example, when the SCell indexes are 1, 4, 5, and 8, the SCell indexes 1, 4, 5, and 8 may correspond to the first, second, third, and fourth bits in a one-to-one correspondence manner, respectively.

Alternatively, according to a third embodiment, the size of the bitmap may be set/determined based on RRC and/or MAC-CE from the BS. In addition, the mapping relationship between the respective bits in the bitmap and the configured SCell indexes may be configured/determined based on the RRC and/or MAC-CE. For example, when the bitmap size is 4 and the SCell indexes (configured for the UE) are 1, 4, 5, 8, and 10, the BS may configure SCell indexes 4, 5, 8, and 10 to correspond to the first, second, third, and fourth bits in the bitmap in a one-to-one correspondence manner based on the RRC and/or MAC-CE. In this case, if some SCells are deactivated or no beam is defined for the some SCells, a separate beam recovery procedure may not be required. In this case, according to the method, the BS may configure the UE to report beam failure information configured only with SCells requiring beam recovery. Accordingly, UL overhead (or UCI overhead) may be reduced.

Alternatively, according to a fourth embodiment, the size of the bitmap may be (i) determined/set based on the number of CSI-AssociatedReportConfigInfo configured in a specific CSI-AperiodicTriggerState, or (ii) set based on RRC and/or MAC-CE.

In various embodiments described above, "the number of SCells configured for the UE" may be applied even to "SCells activated (by the BS)". This is because the UE and the BS do not need to perform beam recovery for a deactivated SCell.

5.1.3. Third Operation Example of the First Beam Failure Reporting Method

When the UE transmits a UL signal (e.g., SR for BFRQ) for beam recovery to the BS, the UE may expect that a dedicated UL resource (e.g., PUSCH) through which a bitmap (hereinafter referred to as first information) explicitly/implicitly indicating whether the beam failure has occurred in each SCell and/or beam information preferred by the UE (e.g., one or more preferred beam indexes and/or RSRP related to the corresponding SCell) (hereinafter referred to as second information) related to one or more SCells in which beam failure has occurred may be transmitted will be configured/allocated. Based on the dedicated UL resource being configured/indicated for/to the UE, the UE may expect that the UL signal for beam recovery is normally received by the BS. The UE may expect that the bits in the bitmap have a connection relationship with different or same CSI-AssociatedReportConfigInfo(=CARCI).

More specifically, for aperiodic CSI reporting in the Rel-15 NR system, the BS may invoke a specific CSI-AperiodicTriggerState through the 'CSI request' field in DCI. In response, the UE may report all CSI-AssociatedReportConfigInfo included in the invoked CSI-AperiodicTriggerState to the BS. Here, when one or more CSI-AssociatedReportConfigInfo included in the same CSI-AperiodicTriggerState are each configured to report beam information about different SCells, the BS may trigger the UE to report preferred beam information related to each SCell configured for the UE (in this example, up to 16 SCells may be configured for the UE), based on the signal. The operation of the BS triggering the UE to report beam information about the SCell in which beam failure has not occurred may be unnecessary in terms of beam recovery. Accordingly, in the third operation example of the first beam failure reporting method, a method for minimizing the unnecessary signal transmission is disclosed.

According to a first embodiment, a new higher layer parameter called 'beamFailure' in the CSI-AperiodicTriggerState IE may be configured/defined as shown in the table below. When the UE receives an indication/configuration of CSI-AperiodicTriggerState in which the higher layer parameter beamFailure is configured, the UE may perform CSI reporting based on CSI-AssociatedReportConfigInfo associated with the SCell in which the beam failure has occurred among maxNrofReportConfigPerAperiodicTrigger CSI-AssociatedReportConfigInfo's.

TABLE 25

| CSI-AperiodicTriggerState ::= SEQUENCE {    associatedReportConfigInfoList SEQUENCE    (SIZE(1..maxNrofReportConfigPerAperiodicTrigger))    OF CSI-AssociatedReportConfigInfo,    beamFailure optional } |
|---|

In this case, based on the higher layer parameter carrier of the CSI-ReportConfig IE in the CSI-AssociatedReportConfigInfo IE, the UE may recognize which CSI-AssociatedReportConfigInfo has a connection relationship with an SCell.

The BS may configure up to maxNrOfCSI-AperiodicTriggers AperiodicTriggerStates for the UE using the CSI-AperiodicTriggerStateList. Then, the BS may select/indicate one AperiodicTriggerState among the configured AperiodicTriggerStates through the 'CSI request' field in the DCI. Therefore, according to the first embodiment, the CSI-AperiodicTriggerState in which the beamFailure parameter is configured may be configured/indicated for/to the UE based on the 'CSI request'. That is, when a UL resource for beam recovery is allocated (for example, CSI-AperiodicTriggerState in which the parameter beamFailure is configured is indicated by the CSI request field) after the UE transmits a UL signal (e.g., SR for BFRQ) for beam recovery to the BS, the UE may expect/consider that the BS normally receives the UL signal (e.g., SR for BFRQ) and performs beam recovery.

Figure 18:
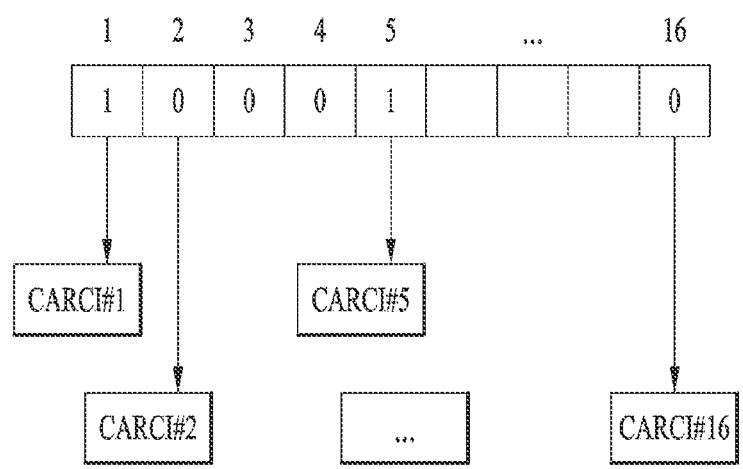

FIG. 18 schematically illustrates another example of the method for reporting a beam failure by a UE according to the present disclosure.

In FIG. 18, it is assumed that 16 SCells are configured for the UE. It is also assumed that beam failure has occurred in SCells #1/#5 among the 16 SCells. According to a second embodiment, as shown in FIG. 18, the UE may set the first and fifth bits in the bitmap of 31 bits to '1' and the remaining bits to '0' and report the setting to the BS. In this case, each bit in the bitmap may have a connection relationship with different CSI-AssociatedReportConfigInfo in order (e.g., the fifth bit in the bitmap is mapped to the fifth CSI-AssociatedReportConfigInfo in associatedReportConfigInfoList).

When the first and fifth bits are activated as shown in FIG. 18, the UE may perform only CSI reporting based on CARCI #1 and CARCI #5. As a more specific example, the UE may report preferred beam information (e.g., preferred beam indexes and/or RSRP) related to SCells #1 and #5 to the BS. When the BS receives the preferred beam information, the BS may check/detect the SCell(s) in which beam failure has occurred through the bitmap, and recognize which CSI-AssociatedReportConfigInfo has been carried out by the UE based on the checking/detection. As a result, the BS may predict the size of the second information (e.g., UE preferred beam indexes and/or RSRP) received from the UE.

Alternatively, when the BFR RS of SCell #4 is related even to SCell #5, beam failure may occur in SCell #4 and SCell #5 simultaneously. In this case, when a value of a common bit is defined/set for SCell #4 and SCell #5, 1 bit may be saved as a whole. However, in this case, the UE must use the same CARCI for CSI reporting for both SCells.

On the other hand, according to a third embodiment, even when the two SCells are related to the same BFR RS, the BS may invoke different CARCIs for the two SCells or invoke the same CARCI. In this case, one more bit is required, and CARCI may need to be repeatedly defined/configured in order to map the respective bits to the CARCIs in a one-to-one correspondence manner. As a method to avoid such repetitive definition/configuration, the BS may explicitly signal the relationship between the respective bits in the bitmap and the CARCIs.

Figure 19:
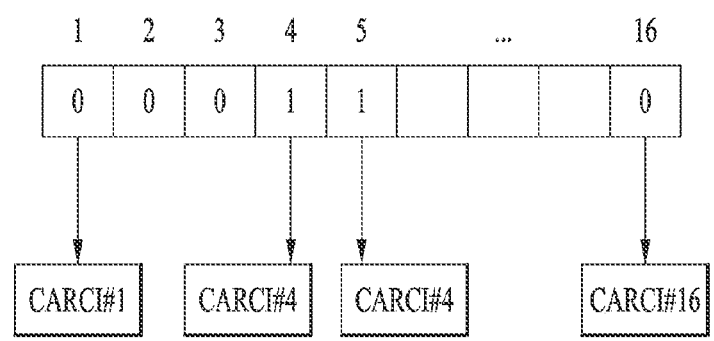

FIG. 19 schematically illustrates another example of the method for reporting a beam failure of a UE according to the present disclosure.

In FIG. 19, it may be assumed that beam failure has occurred in SCells #4/#5. In this case, both the fourth and fifth bits in the bitmap may be mapped to the same CARCI, CARCI #4. In this case, the NZP CSI-RS of SCell #4 may be used for determination of a beam of a CORESET in SCell #5. The above setting may be applied when the frequency bands of SCell #4 and SCell #5 are similar (e.g., mmWave bands). In this case, even when the UE monitors only the NZP CSI-RS of SCell #4, the UE may infer a preferred beam from SCell #5, thereby reducing UE complexity.

When both the fourth and fifth bits are mapped to CARCI #4 as described above, the UE may perform only CSI reporting corresponding to CARCI #4, even when it detects that beam failure has occurred in the two SCells. More specifically, the UE may report only the UE preferred beam information belonging to SCell #4 to the BS. Accordingly, the UE only needs to find a preferred beam among the beams belonging to SCell #4. Thereby, UE complexity and UCI overhead may be reduced.

In this case, in determining the size of the second information, the UE may determine/assume that the second information for the two SCells is configured as only one piece based on the two SCells being connected to the same CARCI #4, even when a beam failure occurs in the two SCells. This operation may be generalized as follows. When a plurality of SCells (or a plurality of activated bitmap bits) in which beam failure has occurred is connected to the same CARCI, the UE may determine the size of the second information, assuming the plurality of SCells as one SCell. Accordingly, when the BS receives the first information related to beam failure occurring in the plurality of SCells connected to the same CARCI (or the plurality of activated bitmap bits connected to the same CARCI), the BS may assume the plurality of SCells to be one SCell in order to determine the size of the second information, and may expect that the second information for the plurality of SCells is configured as one piece based on the assumption.

Figure 20:
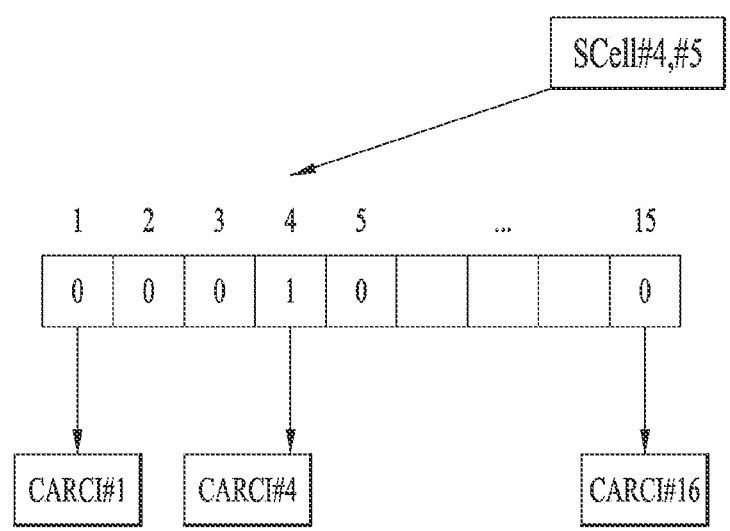

FIG. 20 schematically illustrates another example of the method for reporting a beam failure by a UE according to the present disclosure.

As shown in FIG. 20, the fourth bit in the bitmap may be related to SCells #4 and #5. In this case, the UE reports the same content as in the third embodiment to the BS, but the size of the bitmap reported by the UE may be reduced from 16 to 15. In other words, according to a fourth embodiment, the size of the bitmap may be reduced by allowing one or more SCell indexes to be connected to each bit indicating whether beam failure has occurred in the SCell. The connection establishment may be performed based on RRC and/or MAC-CE.

In a fifth embodiment, the BS may explicitly connect each bit of the bitmap to an SCell and/or a CARCI.

The table below shows an example in which the BS explicitly signals, to the UE, the connection relationship between each bit of the bitmap and the SCell using the higher layer parameter SCells. In the table below, it may be seen that SCells #4/5/12/20/25 are configured/defined for the UE based on the higher layer parameter SCells. In this case, configuration/reconfiguration of the SCells may be performed based on RRC and/or MAC-CE.

TABLE 26

CSI-AperiodicTriggerState := SEQUENCE {
   associatedReportConfigInfoList SEQUENCE
   (SIZE(1..maxNrofReportConfigPerAperiodicTrigger)) OF ...
CSI-AssociatedReportConfigInfo,
   beamFailure Optional
   SCells = [ #4 #5 #12 #20 #25 ]
   Default-mode = [ 1 1 0 0 .... 0 ]
}

Figure 21:
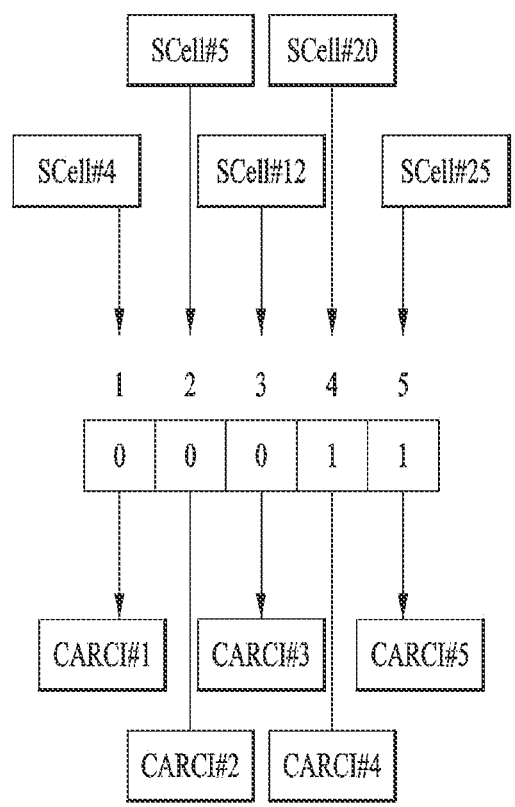

FIG. 21 schematically illustrates another example of the method for reporting a beam failure by a UE according to the present disclosure.

As shown in FIG. 21, the respective bits in the bitmap may be mapped to (different) SCells in a one-to-one correspondence manner. In this case, the respective bits may be mapped to CARCIs in order.

According to the table below, the higher layer parameter CARCIs may be newly configured/defined in addition to the higher layer parameter SCells. Based on the table below, the BS may explicitly signal the connection relationship between the respective bits in the bitmap, the SCells and the CARCIs. In this case, configuration/reconfiguration of the SCells and/or CARCIs and/or default-mode may be performed based on RRC and/or MAC-CE.

TABLE 27

CSI-AperiodicTriggerState := SEQUENCE {
   associatedReportConfigInfoList SEQUENCE
   (SIZE(1..maxNrofReportConfigPerAperiodicTrigger)) OF ...
CSI-AssociatedReportConfigInfo,
   beamFailure Optional
   SCells = [ #4 #5 #12 #20 #25 ]
   CARCIs = [ 1 3 3 4 4 ]
   Default-mode = [ 1 2 3 4 ]
}

Figure 22:
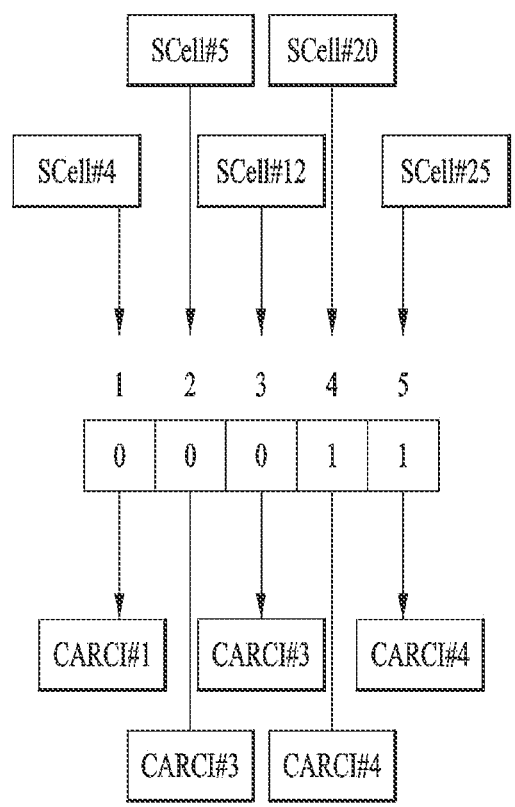

FIG. 22 schematically illustrates another example of the method for reporting a beam failure by a UE according to the present disclosure.

Based on the signaling shown in Table 27, as shown in FIG. 22, the respective bits in the bitmap may have a 1:1 mapping relationship with SCells and CARCIs. In this case, different bits may be associated with the same CARCI. For example, even when beam failure occurs in SCells #4/#5, the BS may invoke one CARCI (e.g., CARCI #4) instead of different CARCIs for the two SCells.

The above operation may be usefully utilized in the following scenario.

As an example, when SCells #4/#5 are configured/defined in the same frequency band (e.g., mmWave), beam characteristics of the two SCells may be similar. Accordingly, the BS and the UE may use a candidate RS of SCell #4 for beam management of SCell #5, and thus may support the above-described configuration. In other words, in this case, even when the RS used in CARCI #4 is configured/defined for SCell #4, the RS may also be used for beam management (or beam recovery) of SCell #5.

The CARCI indexes may be mapped even in the default mode. As an example, in a state in which the UE has not transmitted an SR for BFRQ, the BS may make a request for the state to the UE through a CSI request. In this case, the UE may invoke CARCIs #1/#2/#3/#4 even though beam failure has not occurred in any SCell.

According to the above-described embodiments, the connection relationship between the respective bits in the bitmap and the SCells may be established based on explicit signaling. On the other hand, according to a sixth embodiment, each CARCI may implicitly contain an SCell ID (e.g., the first embodiment described above).

Figure 23:
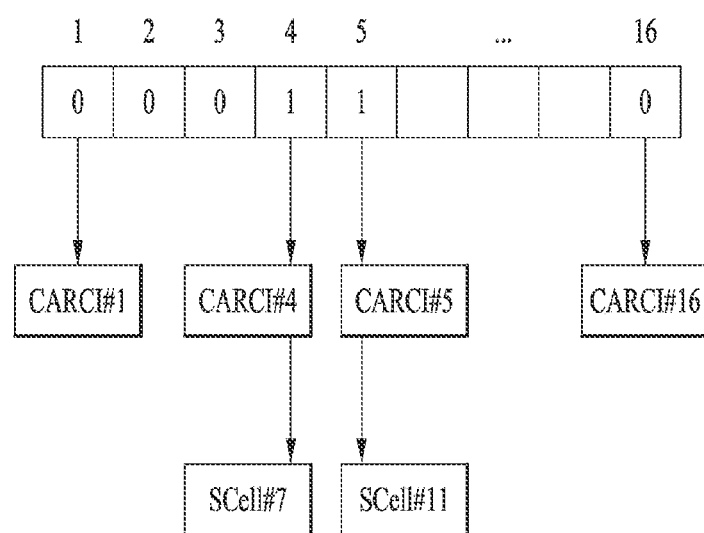

FIG. 23 schematically illustrates another example of THE method for reporting a beam failure by a UE according to the present disclosure.

As shown in FIG. 23, the UE may expect that the respective bits in the bitmap has a 1:1 correspondence relationship with CARCIs.

More specifically, it is assumed that 16 CARCIs are configured for the UE as shown in FIG. 23.

When beam failure occurs in SCell #7 and SCell #11, the UE may carry out CARCIs #4 and #5 associated with the SCells, respectively, and report related information (e.g., second information) to the BS. In this operation, the UE may also report a bitmap (e.g., [0 0 0 1 1 0 . . . 0], called first information) to the BS. In response, the BS may recognize that CARCIs #4 and #5 are carried out, and accordingly recognize that beam failure occurs in SCell #7 and SCell #11.

Therefore, according to this embodiment, the BS and the UE may transmit and receive related information even when the bitmap of the first information is not directly connected to the SCell indexes.

5.1.4. Fourth Operation Example of the First Beam Failure Reporting Method

Even if the UE does not report the occurrence of beam failure in an SCell to the BS (e.g., the UE does not transmit a UL signal for BFRQ to the BS), the UE may carry out CSI-AssociatedReportConfigInfo configured by default when a dedicated CSI report for BFR is indicated/configured for the UE by the BS.

According to the first embodiment of the third operation example described above, a specific CSI-AperiodicTriggerState may be defined exclusively for beam failure. Accordingly, one state may be unnecessarily consumed.

On the other hand, according to the fourth operation example, when instruction/configuration of dedicated CSI reporting for BFR is provided by the BS. (e.g., CSI-AssociatedTriggerState in which beamFailure is configured is indicated) while the UE has not transmitted a UL signal for BFRQ (or beam failure has not occurred in any SCell), the UE may carry out only a CARCI configured by default.

The table below shows CSI-AssociatedTriggerState configured for the UE. In the table below, Default-mode may represent a CARCI configured by default.

TABLE 28

CSI-AperiodicTriggerState := SEQUENCE {
   associatedReportConfigInfoList SEQUENCE
   (SIZE(1..maxNrofReportConfigPerAperiodicTrigger)) OF ...
CSI-AssociatedReportConfigInfo,
   beamFailure Optional
   Default-mode = [ 1 1 0 0 .... 0 ]
}

For example, when Default-mode=[1 1 0 0 . . . 0] is configured for the UE, and the UE receives an indication of CSI-AssociatedTriggerState from the BS without transmitting a UL signal for BFRQ, the UE may carry out CARCIs #1 and #2.

Accordingly, the state for reporting CARCIs #1 and #2 and the state for CSI reporting for beam recovery may be the same. Accordingly, the total number of required states may be reduced from two to one. In addition, the specific operation of the UE (e.g., CARCI #1/#2 reporting or CSI reporting for beam recovery) may vary depending on whether the UE has reported the UL signal for BFRQ.

In the above-described example, it is assumed that each value of Default-mode corresponds to CSI-AssociatedReportConfigInfo in a one-to-one correspondence manner. Alternatively, as another example, each value of Default-mode may correspond to each bit in a bitmap indicating whether beam failure has occurred in a one-to-one correspondence manner.

Figure 24:
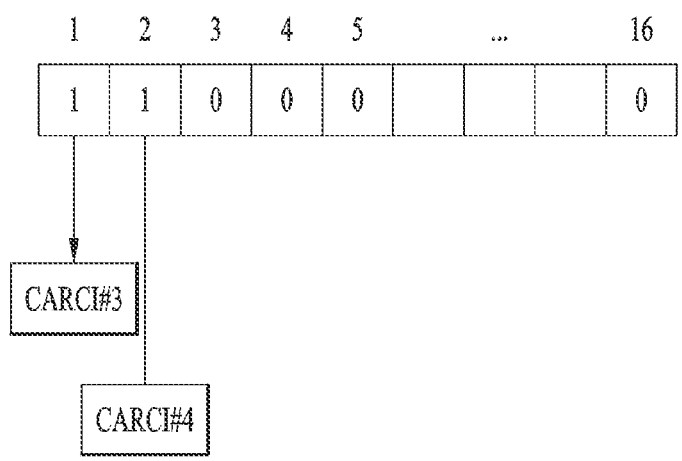

FIG. 24 schematically illustrates another example of the method for reporting a beam failure by a UE according to the present disclosure.

As shown in the table above, when Default-mode=[1 1 0 0 . . . . 0], the UE may carry out the CARCIs connected to the first and second bits in the bitmap, respectively. When the first and second bits in the bitmap are connected to CARCI #3 and CARCI #4, respectively as shown in FIG. 24, the UE may carry out CARCI #3 and CARCI #4.

Alternatively, when each bit of the bitmap connected to an SCell index, the UE may carry out only the CARCI associated with the SCell for which the bit is activated as 1.

In the present disclosure, the specific operation of the UE may vary depending on whether the UE transmits a UL signal for BFRQ. In this case, the following details may be considered.

First, when the UE transmits a UL signal for BFRQ, the BS may transmit a BFR-only CSI request to the UE without receiving the signal (without knowing that the UE has transmitted the UL signal for BFRQ). In this case, the UE may perform CSI reporting for the SCell in which the beam failure has occurred, while the BS may expect CSI reporting configured in the Default-mode.

In order to resolve such mismatch between the UE and the BS, the UE may report first information (e.g., a bitmap) together with second information to the BS. In this case, based on the received first information, the BS may distinguish whether the CSI report is a CSI report transmitted by the UE in the default mode or is a CSI report for beam recovery according to a beam failure occurring in the SCell. Accordingly, the mismatch may be resolved. In addition, when beam failure occurs in an SCell and the UE receives an indication/configuration of CSI-AperiodicTriggerState for beam recovery from the BS while the UE has not yet transmitted a UL signal for BFRQ, the UE may immediately report, to the BS, the SCell index in which the beam failure has occurred and the UE preferred beam information in the SCell, in contrast to the intention of the BS.

5.1.5. Fifth Operation Example of the First Beam Failure Reporting Method

In the first operation example and/or third operation example described above, the UE may report the first information and the second information to the BS through different PUCCH and/or PUSCH resources.

More specifically, since the size of the first information is smaller than the size of the second information and is predetermined, the UE may periodically/semi-periodically transmit the first information to the BS. Accordingly, the first information may be suitable for periodic PUCCH, and/or semi-persistent PUCCH, and/or semi-persistent PUSCH transmission.

When the UE transmits the first information (separately from the second information), the BS may recognize that a beam failure has occurred in a certain SCell based on the first information. Therefore, the UE may not need to separately transmit a UL signal for BFRQ (e.g., SR for BFRQ) to the BS.

On the other hand, the size of the second information may vary according to the number of SCells in which beam failure has occurred, and may have a relatively large size based on the size of the beam information included therein. In addition, since the second information is unnecessary information in a situation in which beam failure does not occur, it may be appropriate to transmit the second information to the BS through aperiodic transmission. As an example, the second information may be transmitted to the BS through aperiodic PUSCH transmission.

Figure 25:
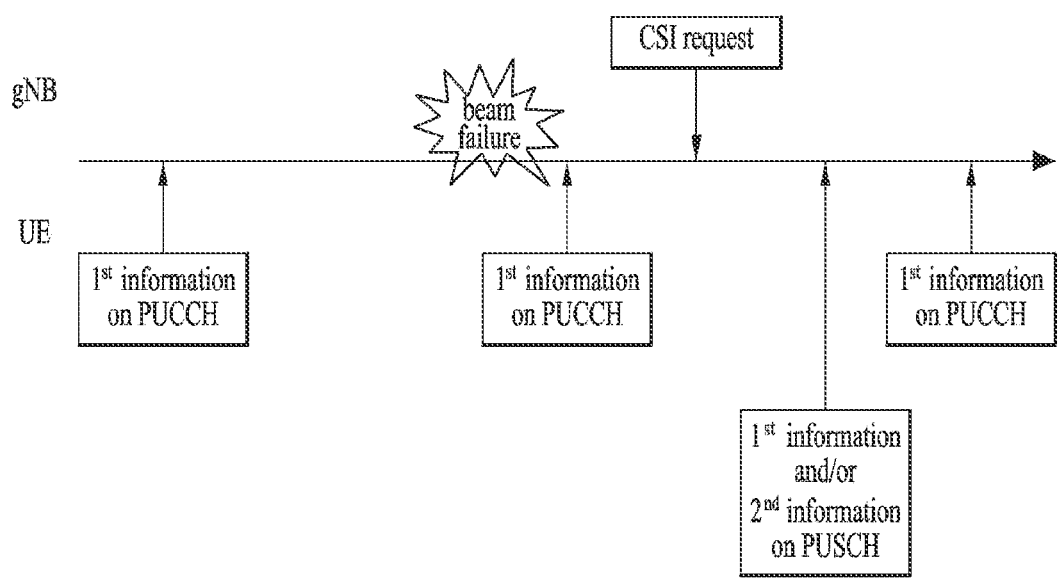

FIG. 25 schematically illustrates another example of the method for reporting a beam failure by a UE according to the present disclosure.

According to a first embodiment, as shown in FIG. 25, the UE may report the first information to the BS on a periodic PUCCH. And, based on beam failure occurring in a specific SCell before reporting the second first information, the UE may report the beam failure in the specific SCell to the BS through the second first information. In this case, the BS may perform beam recovery for the specific SCell.

As a specific example, as shown in FIG. 25, through a CSI request, the BS may instruct the UE to report, to the BS, UE preferred beam information (e.g., preferred beam index and/or RSRP, etc.) in the SCell in which beam failure has occurred. In this case, since the BS may know through the second first information whether the beam failure has occurred in an SCell, it may predict the size of the second information subsequently received, and may indicate/configure/allocate a suitable PUSCH resource to the UE.

Assuming a case where the BS cannot predict the size of the second information, the BS has no choice but to indicate/configure/allocate a PUSCH resource having an arbitrary size to the UE. When the size of the PUSCH resource is larger than the size actually requested by the UE, the UL resource may be wasted. On the other hand, when the size of the PUSCH resource is smaller than the size requested by the UE, a request for an additional PUSCH resource from the UE may be needed. That is, latency may increase.

Considering such an issue, the UE may transmit the first information and the second information through different resources. Thereby, the BS may efficiently operate the UL resources.

In the fourth operation example described above, the BS may indicate/send a CSI request for BFR to the UE even when the UE does not transmit a UL signal for the BFRQ. Similarly, according to a second embodiment of the fifth operation example, even when the UE reports to the BS through the first information that beam failure has not occurred in any SCells, the BS may indicate/configure/invoke CSI-AperiodicTriggerState for beam recovery for the UE. In this case, the UE may carry out a CARCI configured in the Default-mode of the CSI-AperiodicTriggerState.

In this embodiment, while the BS fails to decode the first information, the BS may indicate/configure a 'CSI request' to/for the UE. In this case, the BS may not know the SCell in which beam failure has occurred, whereas the UE may expect a CSI report on the SCell in which the beam failure has occurred. As a method for resolving such a mismatch, the UE may report the second information together with the first information to the BS. Since the UE has already reported the first information through the PUCCH or the like, (additional) reporting of the first information through the PUSCH may be unnecessary (redundant). However, the above-described mismatch may be resolved through the above method. In addition, considering that the PUSCH reporting is performed in an event triggering manner, this operation may not be a big issue in terms of UL resource overhead.

Figure 26:
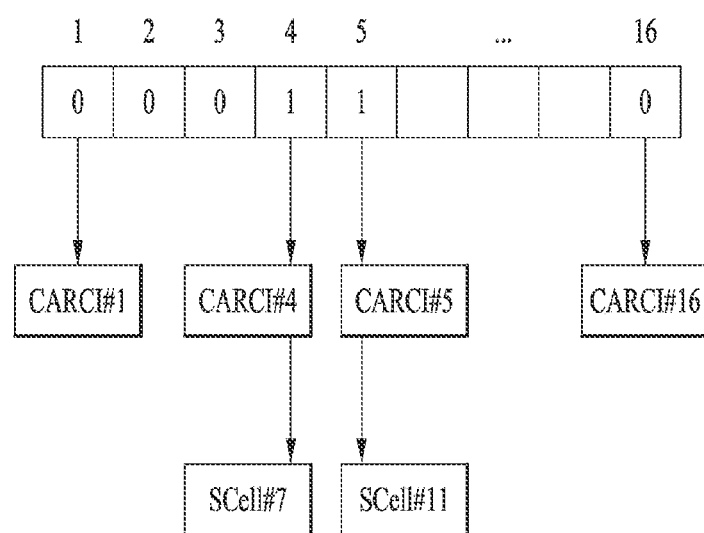

FIG. 26 schematically illustrates another example of the method for reporting a beam failure by a UE according to the present disclosure.

According to a third embodiment, as shown in FIG. 26, the bitmap, which is the first information, may have a 1:1 mapping relationship with CARCIs. Accordingly, the first information may have a size of 16 bits.

When a beam failure occurs in an SCell configured as a monitoring target by the BS, the BS may configure/allocate only some CARCIs (e.g., CARCIs #9 to #16) for/to the UE. In this case, the first information does not need to include CARCIs #1 to #8, and accordingly it may be defined only in 8 bits. Therefore, 8 bits may be saved.

The BS may indicate/configure, through RRC and/or MAC-CE, CARCIs to be configured/defined as the first information among a plurality of CARCIs included in one CSI-AperiodicTriggerState to/for the UE.

Figure 27:
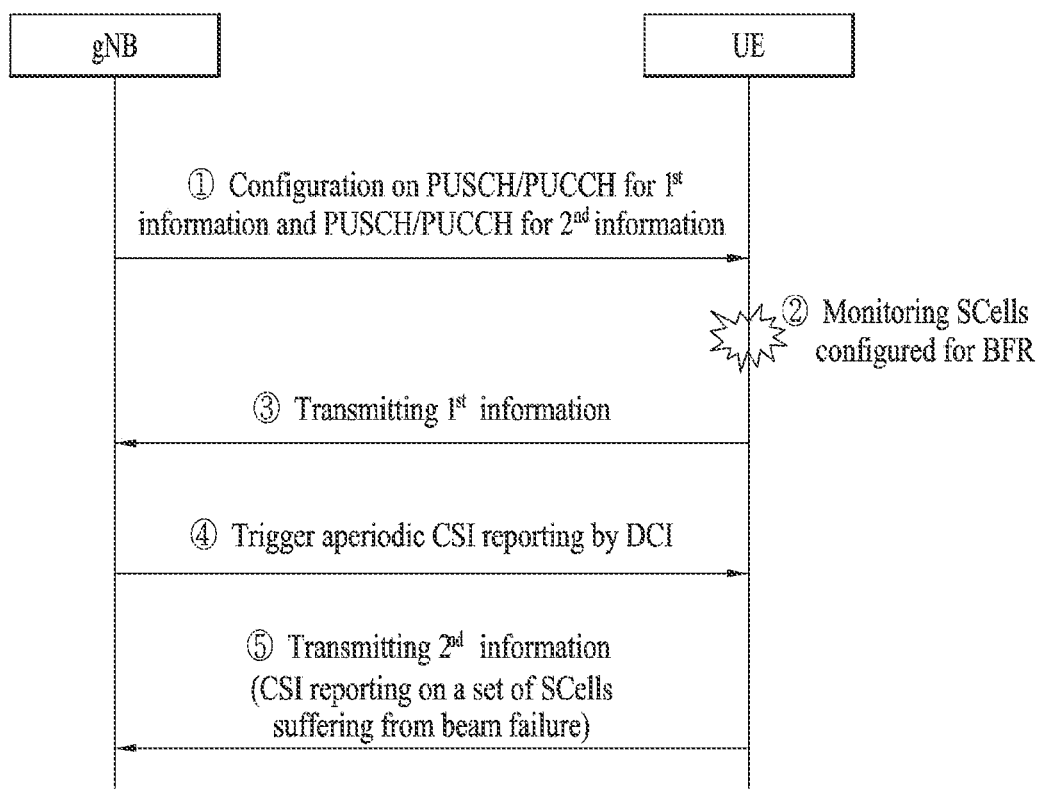
FIG. 27 is a schematic diagram illustrating a first beam failure reporting method according to the present disclosure.

FIG. 27 is a schematic diagram illustrating the first beam failure reporting method according to the present disclosure.

As shown in FIG. 27, a UE and a BS may operate as follows.

[1] The BS may configure/allocate a PUCCH/PUSCH resource for transmission of the first information for/to the UE. In addition, the BS may configure/allocate a PUCCH/PUSCH resource for transmission of the second information for/to the UE.

[2] The UE may detect whether beam failure has occurred in a series of specific SCells among the configured SCells.

[3] The UE may periodically report the first information to the BS regardless of whether beam failure has occurred in any SCells.

[4] If the UE reports, through the first information, (i) an SCell index in which the beam failure has occurred, or (ii) a CARCI index related to the SCell in which the beam failure has occurred, the BS may trigger (aperiodic) CSI reporting to the UE through DCI or the like. In particular, when the UE reports a CARCI index related to the SCell in which the beam failure has occurred to the BS, the BS may indirectly recognize the SCell index in which the beam failure has occurred through the reported information.

[5] The UE may report the SCell index in which the beam failure has occurred and information about a beam (e.g., beam index, RSRP) preferred by the UE in the SCell to the BS. Alternatively, the UE may carry out a CARCI related to the SCell in which the beam failure has occurred, thereby indirectly inform the BS of the SCell index in which the beam failure has occurred. In addition, the UE may report UE preferred beam information (e.g., beam index, RSRP) in the SCell to the BS. In this operation, the UE may report the CARCI index (e.g., first information) related to the SCell in which the beam failure has occurred together with the second information to the BS.

5.2. Second Beam Failure Reporting Method

In the present disclosure, the beam failure reporting method may include a method for encoding identification information of failed SCell and reporting information of anew beam for SCell BFR independently.

Figure 28:
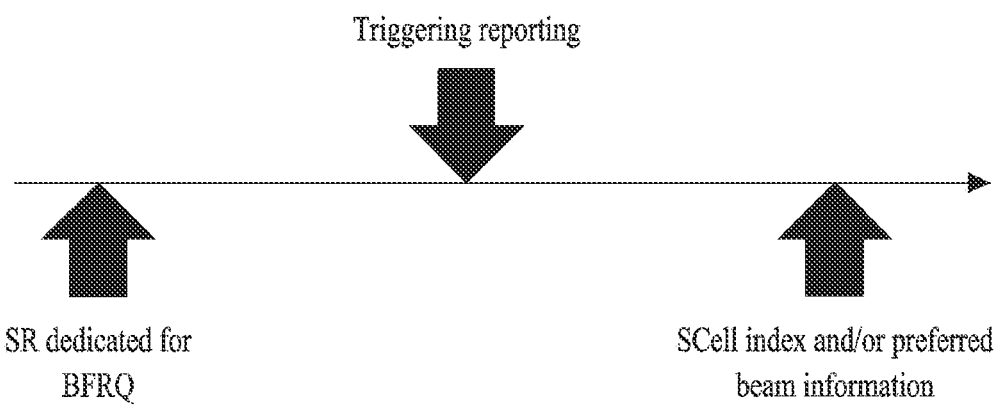
FIGS. 28 to 31 illustrate various other examples of a method for reporting a beam failure by a terminal according to the present disclosure.

FIG. 28 schematically illustrates another example of the method for reporting a beam failure by a UE according to the present disclosure.

A third operation example of the above-described first beam failure reporting method may be described as shown in FIG. 28. As shown in FIG. 28, when beam failure occurs in any SCell, the UE may transmit a UL signal (e.g., SR) for BFRQ to a BS. Subsequently, the BS that received the UL signal may trigger reporting to the UE. The UE that received an indication of the triggering may report an SCell index and preferred beam information to the BS.

At the time when the BS triggers the reporting to the UE, the BS may not know exactly the number of SCells in which a beam failure has occurred (simultaneously). Accordingly, as a specific example, when the beam failure occurs in six SCells simultaneously, the UL resource allocated to the UE by the BS may be insufficient to transmit beam information preferred by the UE in each of the six SCells. In the present disclosure, various methods for address this issue are disclosed in detail.

In the above-described first beam failure reporting method, the UE may report information on the total number of SCells (e.g., K) related to beam information actually delivered through the second information to the BS through the first information. In this case, the UE may transmit, to the BS through the second information, only beam information about SCells related to K bits based on the most significant bit (MSB) (or least significant bit (LSB)) among the bits related to the SCells in which the beam failure has occurred in the bitmap. Then, the BS may determine the size of the second information and the SCells in which the beam information is actually delivered, based on the bitmap included in the first information and the information on the total number (e.g., K).

Alternatively, in the above-described first beam failure reporting method, the UE may report, to the BS through the first information, information on the total number K of CARCIs actually reported through the second information. In this case, the UE may transmit, to the BS through the second information, only CARCIs related to K bits based on the MSB (or LSB) among the bits related to the SCells in which the beam failure has occurred (or the bits mapped to the CARCIs related to the SCells in which the beam failure has occurred) in the bitmap. Then, the BS may determine the size of the second information and the actually reported CARCIs based on the bitmap included in the first information and the information on the total number (e.g., K).

The above characteristics may be generalized as follows.

The UE may report, to the BS, the number of SCells for which the UE actually reports beam information among the SCells in which the beam failure has occurred. For example, the information on the number may be transmitted to the BS through the first information.

The UE may report, to the BS, the number of CARCIs to be actually reported among the CARCIs related to the SCells in which beam failure has occurred. For example, the information on the number may be transmitted to the BS through the first information.

Figure 29:
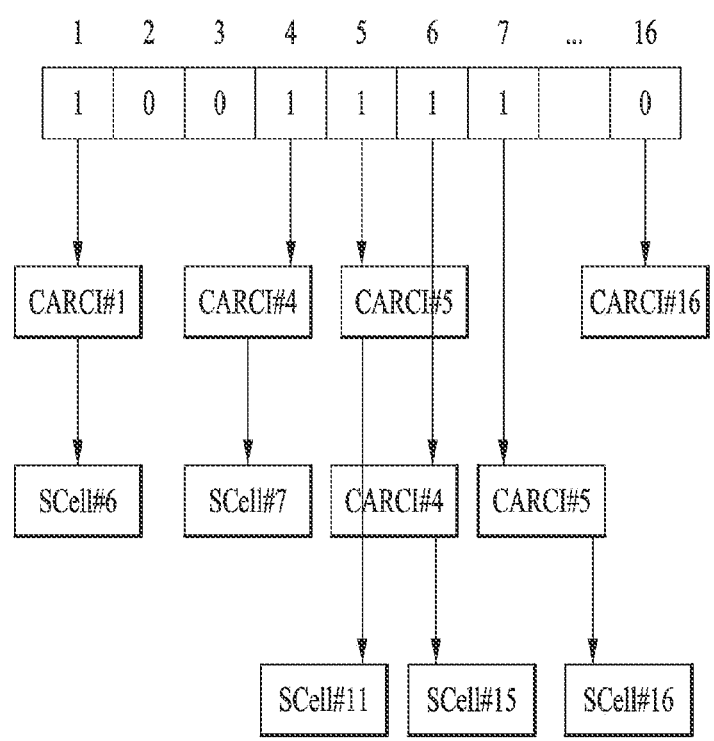

FIG. 29 schematically illustrates another example of the method for reporting a beam failure by a UE according to the present disclosure.

In FIG. 29, it is assumed that the size of the bitmap is 16, and that beam failure occurs in SCells #6/#7/#11/#15/#16 at the same time. In this case, the UE may perform CARCIs #1/#4/#5/#6/#7, which are related to the SCells. Accordingly, the UE may define the bitmap and CARCIs #1/#4/#5/#6/#7 as first information and second information, respectively, encode the information individually and transmit the encoded information to the BS.

Figure 30:
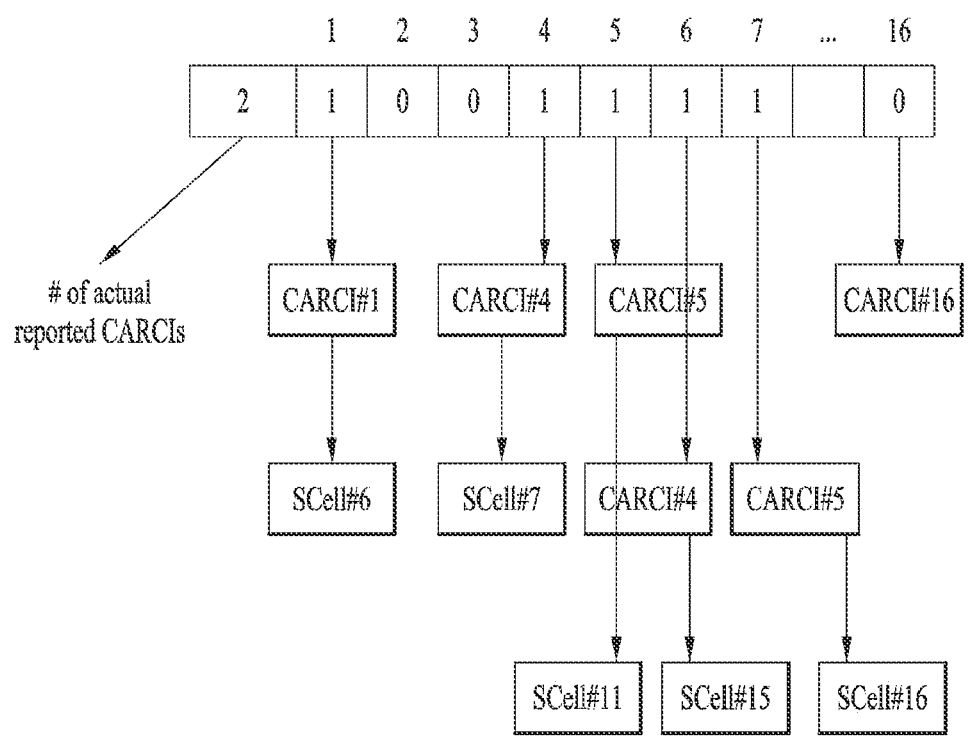
Figure 31:
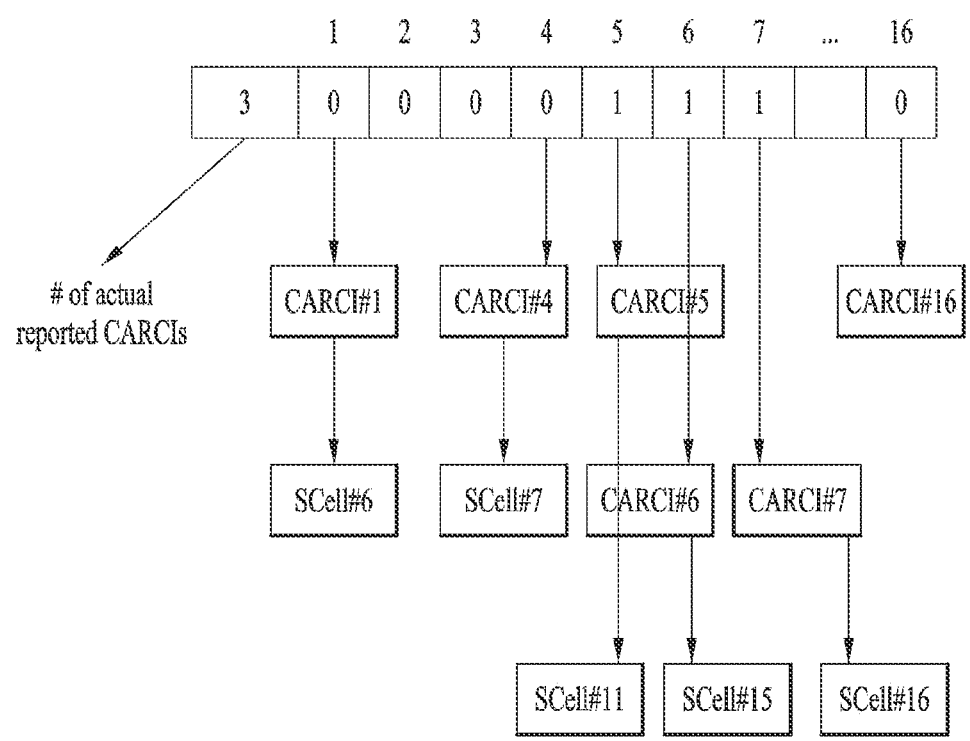

FIGS. 30 and 31 schematically illustrate another example of the method for reporting a beam failure by a UE according to the present disclosure.

When a UL resource allocated by the BS has a size capable of accommodating only CARCI #1 and CARCI #4, the UE may add, to the first information, (i) the existing bitmap and (ii) the number of CARCIs actually transmitted through the second information, and report the first information to the BS, as shown in FIG. 31. Then, the UE may add only CARCI #1 and CARCI #4 to the second information and transmit the second information to the BS.

In response, the BS may recognize that only CARCI #1 and CARCI #4 are included in the second information, based on the "# of actual reported CARCIs" and the bitmap included in the first information. Then, the BS may determine that CARCIs #5/#6/#7 have not been reported. Accordingly, the BS may allocate an additional UL resource for reporting of CARCIs #5/#6/#7 to the UE. That is, the BS may allocate the additional UL resource even when there is no additional UL resource request (e.g., SR) from the UE. Further, since the BS can accurately determine the CARCIs to be additionally reported by the UE, it may allocate a correct UL resource to the UE.

Accordingly, as shown in FIG. 31, the UE may report CARCIs #5/#6/#7 through the allocated additional UL resource. As shown in FIG. 31, the first and fourth bits may be set to 0. This is because CARCIs #1/#4 have already been reported to the BS. In addition, since the number of bits set to 1 in the bitmap is equal to "# of actual reported CARCIs", the BS may determine that there is no CARCI for the UE to (additionally) transmit.

Figure 32:
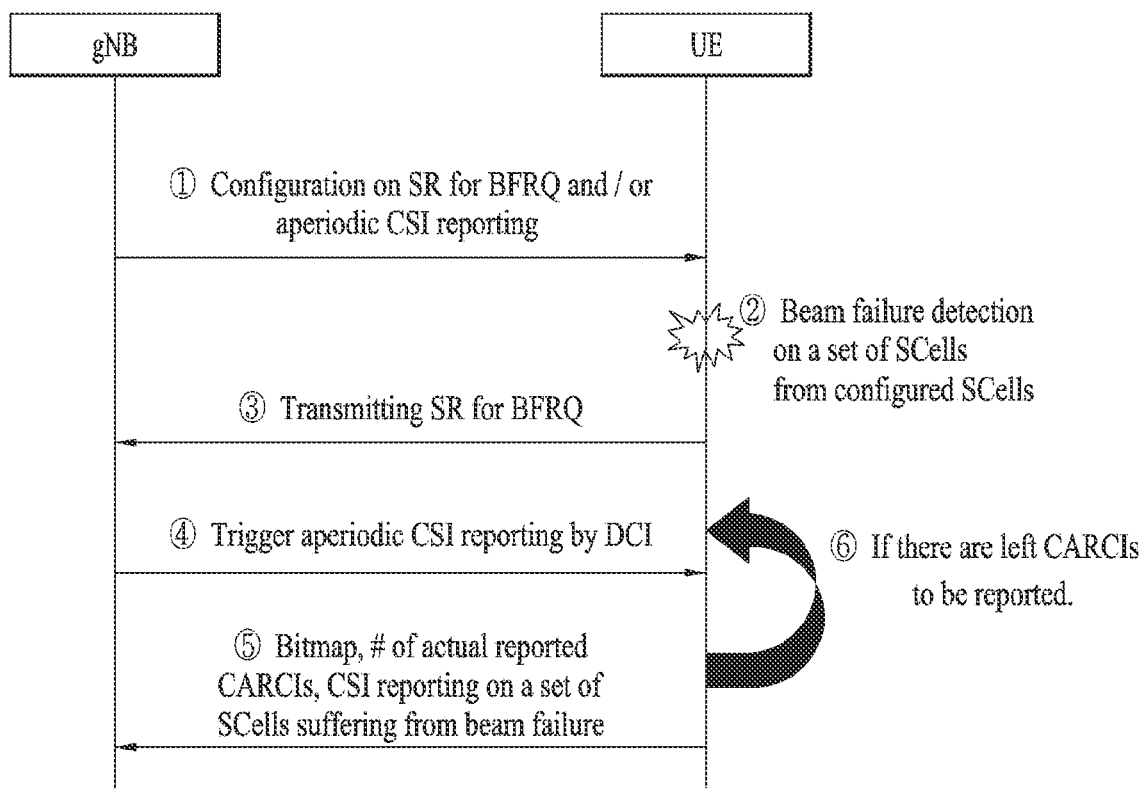
FIG. 32 is a schematic diagram illustrating a second beam failure reporting method according to the present disclosure.

FIG. 32 is a schematic diagram illustrating a second beam failure reporting method according to the present disclosure.

As shown in FIG. 32, a UE and a BS may operate as follows.

[1] The BS may configure, for the UE, (i) a BFRQ dedicated Scheduling Request (SR), and/or (ii) reporting of an SCell index in which beam failure has occurred (e.g., first information), and/or (iii) reporting of preferred beam information of the UE (e.g., beam index, RSRP, second information) in the SCell, and the like.

[2] The UE may detect occurrence of beam failure in specific SCells among the configured SCells.

[3] The UE may transmit a BFRQ dedicated SR to the BS.

[4] The BS that received the SR may trigger aperiodic CSI reporting to the UE through a CSI request in DCI.

[5] The UE may report, to the BS, (i) one or more CARCI indexes related to the SCells in which the beam failure has occurred (or SCell indexes in which beam failure has occurred), and/or (ii) the number of CARCIs actually reported (or SCells for which beam information is actually reported), and/or (iii) selected CARCIs (or preferred beam information in each of the SCells in which the beam failure has occurred), and the like.

Here, the CARCI indexes or the SCell indexes may also be defined through a bitmap (e.g., first information).

Here, the number of actually reported SCells and/or the number of actually reported CARCIs among the SCells in which the beam failure has occurred may be reported to the BS through the first information.

Here, the selected CARCIs may be reported to the BS through the second information.

[6] When the number of CARCIs actually included in the second information is less than the number of CARCIs related to the SCells in which the beam failure has occurred (or the total number of bits set to 1 in the bitmap), the BS may assume that there are CARCIs that the UE has not reported. In addition for reporting of CARCIs that have not been reported, the BS may additionally trigger aperiodic CSI reporting to the UE through a CSI request.

Figure 33:
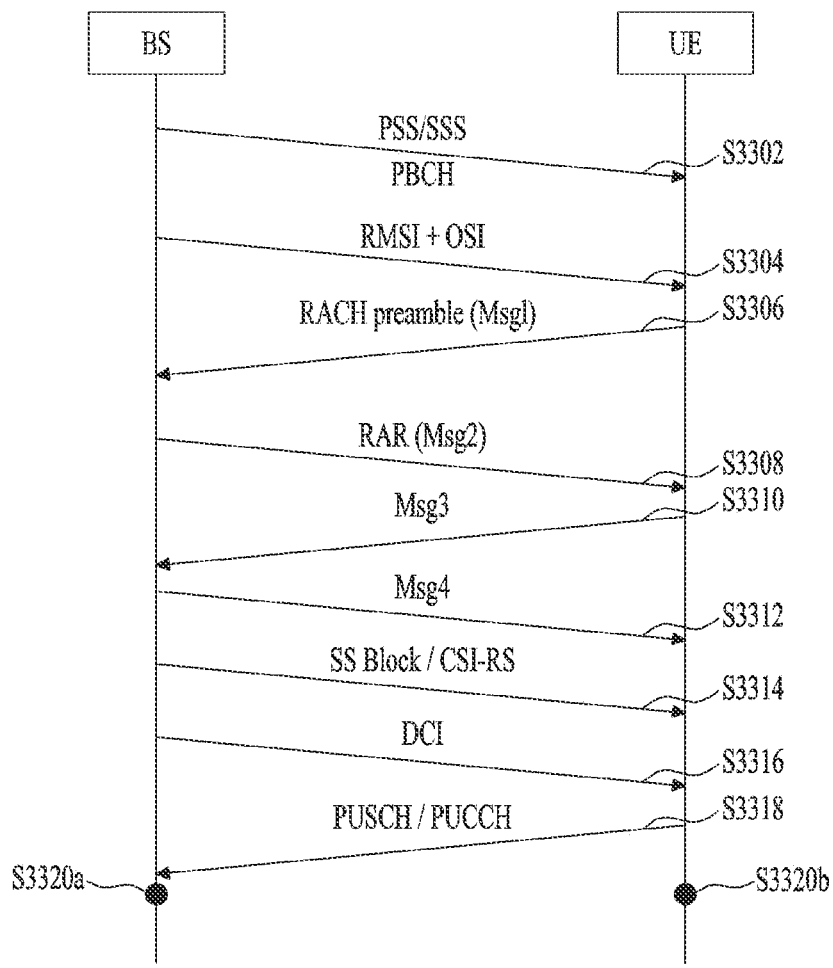
FIG. 33 is a schematic diagram illustrating a procedure of network connection and communication between a terminal and a base station applicable to the present disclosure.

FIG. 33 is a schematic diagram illustrating a procedure of network connection and communication between a UE and a BS applicable to the present disclosure.

The UE may perform a network access procedure to perform the procedures and/or methods described/proposed above. For example, while accessing a network (e.g., a BS), the UE may receive system information and configuration information required to perform the procedures and/or methods described/proposed above and store the same in a memory. The configuration information required for the present disclosure may be received through higher layer (e.g., RRC layer, medium access control (MAC) layer, etc.) signaling.

In the NR system, a physical channel and a reference signal may be transmitted using beamforming. When beamforming-based signal transmission is supported, a beam management procedure may be involved in order to align beams between the BS and the UE. In addition, the signal proposed in the present disclosure may be transmitted/received using beamforming. In the radio resource control (RRC) IDLE mode, beam alignment may be performed based on a sync signal block (SSB). On the other hand, in the RRC CONNECTED mode, beam alignment may be performed based on CSI-RS (in DL) and SRS (in UL). When beamforming-based signal transmission is not supported, operations related to a beam may be skipped in the following description.

Referring to FIG. 33, a base station (BS) may periodically transmit an SSB (S3302). Here, the SSB includes PSS/SSS/PBCH. The SSB may be transmitted using beam sweeping. Thereafter, the BS may transmit remaining minimum system information (RMSI) and other system information (OSI) (S3304). The RMSI may include information (e.g., PRACH configuration information) necessary for the UE to initially access the BS. After performing SSB detection, the UE identifies the best SSB. Thereafter, the UE may transmit a RACH preamble (Message 1 (Msg1)) to the BS using aPRACH resource linked/corresponding to the index (i.e., the beam) of the best SSB (S3306). The beam direction of the RACH preamble is associated with the PRACH resource. The association between the PRACH resource (and/or the RACH preamble) and the SSB (index) may be configured through system information (e.g., RMSI). Thereafter, as part of the RACH procedure, the BS may transmit a random access response (RAR) (Msg2) in response to the RACH preamble (S3308), and the UE may transmit Msg3 (e.g., an RRC connection request) using the UL grant in the RAR (S3310). The BS may transmit a contention resolution message (Msg4) (S3312). Msg4 may include RRC connection setup.

When an RRC connection is established between the BS and the UE through the RACH procedure, subsequent beam alignment may be performed based on the SSB/CSI-RS (in DL) and the SRS (in UL). For example, the UE may receive an SSB/CSI-RS (S3314). The SSB/CSI-RS may be used by the UE in generating a beam/CSI report. The BS may make a request for a beam/CSI report to the UE through DCI (S3316). In this case, the UE may generate a beam/CSI report based on the SSB/CSI-RS, and transmit the generated beam/CSI report to the BS on the PUSCH/PUCCH (S3318). The beam/CSI report may include a beam measurement result and information about a preferred beam. The BS and the UE may perform beam switching based on the beam/CSI report (S3320a, S3320b).

Thereafter, the UE and the BS may perform the procedures and/or methods described/proposed above. For example, the UE and the BS process the information in the memory according to the proposal in the present disclosure based on the configuration information obtained in the network access procedure (e.g., system information acquisition, RRC connection through RACH, etc.), or may process the received radio signal and store the same in the memory. Here, the radio signal may include at least one of a PDCCH, a PDSCH, or an RS in the case of the downlink, and may include at least one of a PUCCH, a PUSCH, or an SRS in the case of the uplink.

Figure 34:
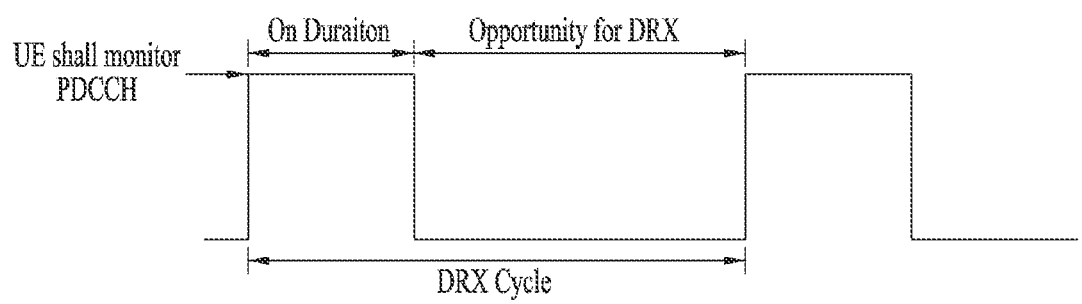
FIG. 34 is a schematic diagram illustrating a discontinuous reception (DRX) cycle of a terminal applicable to the present disclosure.

FIG. 34 is a diagram schematically illustrating a discontinuous reception (DRX) cycle of a UE applicable to the present disclosure. In FIG. 34, the UE may be in the RRC_CONNECTED mode.

In the present disclosure, the UE may perform the DRX operation while performing the procedures and/or methods described/proposed above. A UE for which DRX is configured may discontinuously receive a DL signal. Thereby, power consumption may be reduced. The DRX may be performed in a radio resource control (RRC)_IDLE mode, an RRC_INACTIVE mode, or the RRC_CONNECTED mode. In the RRC_IDLE mode and the RRC_INACTIVE mode, the DRX is used to receive paging signals discontinuously. Hereinafter, DRX performed in the RRC_CONNECTED mode (RRC_CONNECTED DRX) will be described.

Referring to FIG. 34, a DRX cycle consists of an on duration and an opportunity for DRX. The DRX cycle defines a time interval at which the on duration is periodically repeated. The on duration represents a time period during which the UE performs monitoring to receive the PDCCH. When DRX is configured, the UE performs PDCCH monitoring for the on duration. If there is a PDCCH successfully detected during PDCCH monitoring, the UE operates an inactivity timer and maintains the awake state. On the other hand, if there is no PDCCH successfully detected during PDCCH monitoring, the UE enters a sleep mode when the on duration ends. Accordingly, when DRX is configured, PDCCH monitoring/reception may be discontinuously performed in the time domain in performing the procedures and/or methods described/proposed above. For example, according to the present disclosure, when DRX is configured, a PDCCH reception occasion (e.g., a slot having a PDCCH search space) may be configured discontinuously according to the DRX configuration. On the other hand, when DRX is not configured, PDCCH monitoring/reception may be continuously performed in the time domain in performing the above-described/proposed procedures and/or methods. For example, according to the present disclosure, when DRX is not configured, a PDCCH reception occasion (e.g., a slot having a PDCCH search space) may be continuously configured. Regardless of whether DRX is configured, PDCCH monitoring may be restricted in a time duration configured as a measurement gap.

TABLE 29

|  | Type of signals | UE procedure |
| --- | --- | --- |
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

Table 29 shows a UE procedure related to the DRX (RRC_CONNECTED mode). Referring to Table 29, DRX configuration information is received through higher layer (e.g., RRC) signaling, and whether the DRX is ON/OFF is controlled by a DRX command of the MAC layer. When DRX is configured, the UE may perform PDCCH monitoring discontinuously in performing the procedures and/or methods described/proposed in the present disclosure, as illustrated in FIG. 34.

Here, MAC-CellGroupConfig includes configuration information required to configure a medium access control (MAC) parameter for a cell group. MAC-CellGroupConfig may also include configuration information about DRX. For example, MAC-CellGroupConfig may include the following information for defining DRX:

- Value of drx-OnDurationTimer: Defines the length of a start section of the DRX cycle;
- Value of drx-InactivityTimer: Defines the length of the time duration for which the UE remains awake after the PDCCH occasion in which the PDCCH indicating initial UL or DL data is detected;
- Value of drx-HARQ-RTT-TimerDL: Defines the length of the maximum time duration from reception of initial DL transmission to reception of DL retransmission;
- Value of drx-HARQ-RTT-TimerDL: Defines the length of the maximum time duration from reception of a grant for the initial UL transmission to a grant for UL retransmission;
- drx-LongCycleStartOffset: Defines the time length and start point of the DRX cycle; and
- drx-ShortCycle (optional): Defines the time length of a short DRX cycle.

Here, if any one of drx-OnDurationTimer, drx-InactivityTimer, drx-HARQ-RTT-TimerDL, and drx-HARQ-RTT-TimerDL is in operation, the UE performs PDCCH monitoring at every PDCCH occasion while maintaining the awake state.

Figure 35:
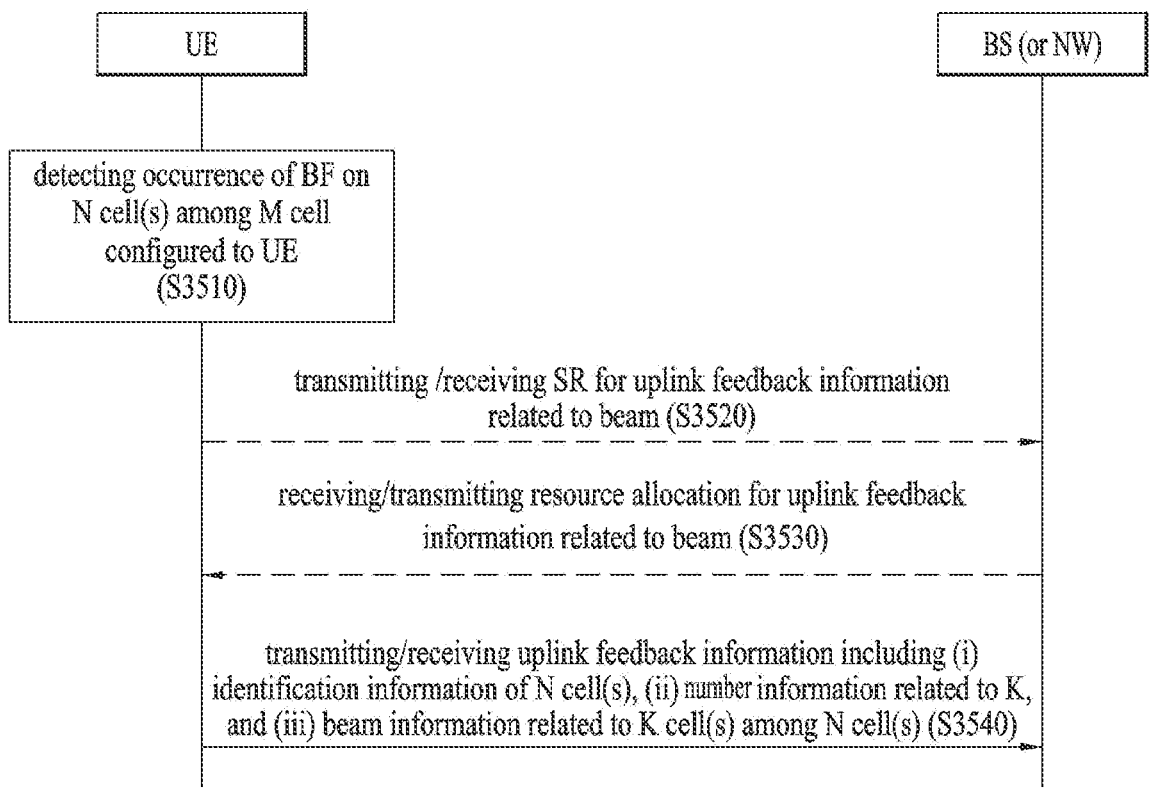
FIG. 35 is a diagram schematically illustrating an example operation of a terminal and a base station according to an example of the present disclosure.
Figure 36:
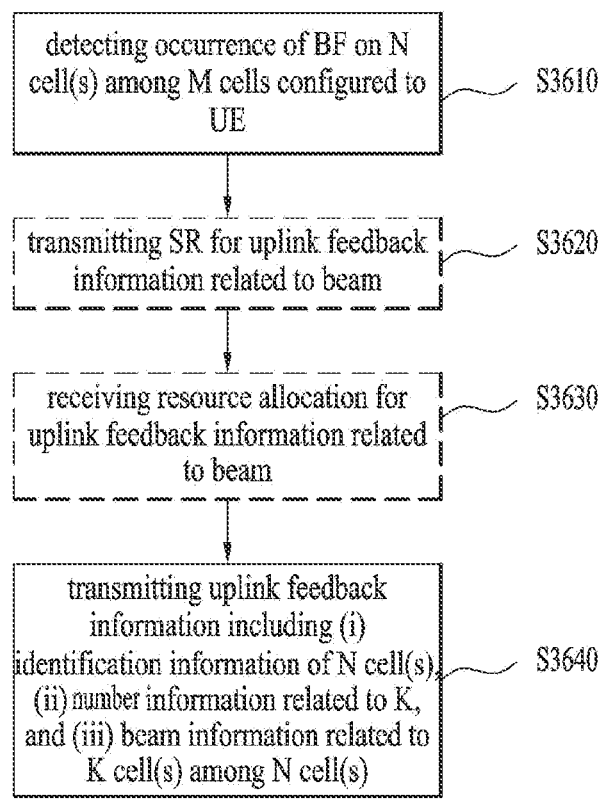
FIG. 36 is a flowchart illustrating an operation of a terminal according to an example of the present disclosure.
Figure 37:
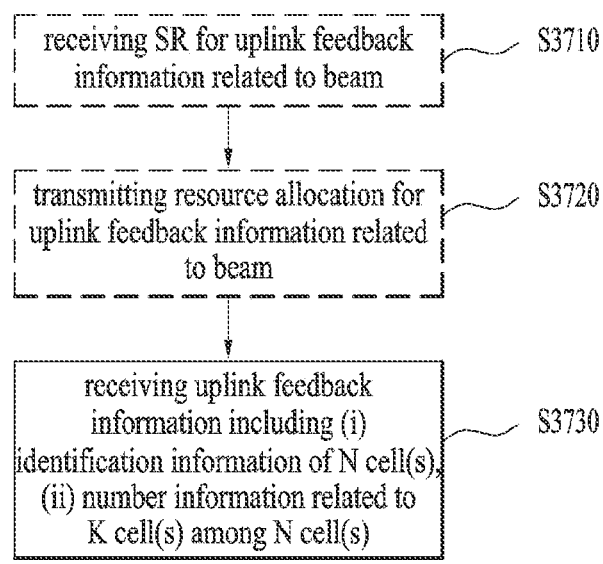
FIG. 37 is a flowchart schematically illustrating an operation of a base station according to an example of the present disclosure.

FIG. 35 is a diagram schematically illustrating an example operation of a UE and a BS according to an example of the present disclosure, FIG. 36 is a flowchart schematically illustrating an example operation of a UE according to an example of the present disclosure, and FIG. 37 is a flowchart schematically illustrating an example operation of a BS according to an example of the present disclosure.

In the present disclosure, the BS (or network) may configure a plurality of cells for the UE. According to an embodiment, the plurality of cells may include a primary cell (PCell), a primary secondary cell (PSCell), and a secondary cell (SCell), which are defined in the 3GPP LTE/NR standards.

Based on this configuration, the UE may detect occurrence of a beam failure (BF) in N cells among M cells configured for the UE (S3510, S3610).

Additionally, based on the detection of the BF for the N cells among the M cells configured for the UE, the UE may transmit, to the BS, a first signal (e.g., SR) for requesting an uplink resource for transmission of beam related uplink feedback information (S3520, S3620). Subsequently, in response to the first signal, the terminal may receive, from the BS, a second signal for allocating the uplink resource for transmission of the beam related uplink feedback information (S3530, S3630). In corresponding operations, the BS may receive the first signal from the UE (S3520, S3710), and may transmit the second signal to the UE in response to the first signal (S3530, S3720).

Next, based on the detection of the BF for the N cells, the UE may transmit, to the BS, beam information including the information disclosed below (S3540 and S3640). Then, the BS may receive the beam information from the UE (S3540, S3730).

- Identification information about the N cells;
- Number information related to K, which is a natural number less than or equal to N;
- Beam information related to K cells among the N cells.

Here, the identification information and the number information may be encoded separately from the beam information.

In the present disclosure, the identification information may include bitmap information related to the N cells, and the beam information may include new beam information related to each of the K cells.

Here, the new beam information related to each of the K cells may include identification information about a new beam related to each of the K cells, and quality information about the new beam related to each of the K cells.

Here, the new beam related to each of the K cells may include a beam preferred by the UE or a beam having the best quality among candidate beams configured in relation to each of the K cells.

The quality information about the new beam related to each of the K cells may include reference signal received power (RSRP) information about the new beam related to each of the K cells.

In the present disclosure, the bitmap information may have a bit size corresponding to M.

In this case, the bitmap information may include (i) N pieces of first bit information with a first value and (ii) remaining second bit information with a second value. In addition, each of the first bit information and the second bit information in the bitmap information may be located based on index order information about a corresponding cell.

In this case, the K cells among the N cells may include K cells corresponding to K pieces of first bit information determined based on a most significant bit (MSB) or least significant bit (LSB) in the bitmap among the N pieces of first bit information.

In the present disclosure, the beam related uplink feedback information may be transmitted through a physical uplink control channel (PUCCH) or a physical uplink shared channel (PUSCH).

In the present disclosure, detecting of the occurrence of the BF in the N cells by the UE may include detecting occurrence of the BF in each of the N cells based on qualities of all control resource sets (CORESET) beams related to each of the N cells or all beams configured for beam failure detection (BFD) being less than or equal to a predetermined threshold.

In the present disclosure, the value of K may be determined based on configuration information received from the BS.

Based on the above characteristics, from the beam-related uplink feedback information, the BS may recognize, from the beam related uplink feedback information, that (i) the BF occurs in the N cells among the M cells, and that (ii) beam information related to the K cells among the N cells is provided through the beam related uplink feedback information.

Additionally, the BS may transmit a first signal for requesting beam information related to the remaining N-K cells to the UE, and receive, from the UE, beam related additional uplink feedback information including beam information related to the remaining N-K cells as a response to the transmitted signal.

In the present disclosure, the UE and the BS may carry out the above-described method for transmitting beam related uplink feedback information or related operation based on the above-described initial access, random access, DRX configuration, and the like.

Since examples of the above-described proposed method may also be included as one of the implementation methods of the present disclosure, it is apparent that the examples may be regarded as a kind of proposed methods. In addition, the above-described proposed methods may be implemented independently, or some of the proposed methods may be combined (or merged) to be implemented. A rule may be defined such that the BS provides the information on whether the proposed methods are applied (or information on the rules of the proposed methods) to the UE through a predefined signal (e.g., a physical layer signal or a higher layer signal).

It will be appreciated by those skilled in the art that the present disclosure may be carried out in other specific forms than those set forth herein without departing from the technical idea and essential features of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is apparent to those skilled in the art that claims that are not explicitly cited by each other in the appended claims may be combined to configure an embodiment of the present disclosure or included in a new claim by a subsequent amendment after the application is filed.

INDUSTRIAL APPLICABILITY

The present disclosure is applicable to various wireless access systems. Examples of the wireless access systems include a 3rd Generation Partnership Project (3GPP) system or a 3GPP2 system. Besides these wireless access systems, the embodiments of the present disclosure are applicable to all technical fields in which the wireless access systems find their applications. Moreover, the proposed method is also applicable to mmWave communication systems using an ultra-high frequency band.

Additionally, the embodiments of the present disclosure are applicable to various applications such as a self-driving vehicle and a drone.

What is claimed is:

1. A method for transmitting beam information by a user equipment (UE) in a wireless communication system, the method comprising:
    detecting occurrence of a beam failure (BF) in one or more secondary cells among a plurality of secondary cells configured for the UE; and
    transmitting, to a base station (BS), the beam information including candidate beam information and a bitmap related to the detection of the occurrence of the BF of the one or more secondary cells,
    wherein the candidate beam information includes first candidate beam information for the one or more secondary cells or second candidate beam information for some secondary cells among the one or more secondary cells, based on a size of uplink resources granted to the UE,
    wherein, based on the size of the uplink resources accommodating the beam information including the first candidate beam information, the candidate beam information includes the first candidate beam information,
    wherein, based on the size of the uplink resources not accommodating the beam information including the first candidate beam information, the candidate beam information includes the second candidate beam information, and
    wherein the some secondary cells are specified based on an index of at least one secondary cell corresponding to at least one bit with a specific bit value in the bitmap.

2. The method of claim 1,
    wherein each bit of the bitmap corresponds to each of the one or more secondary cells, and
    wherein the bitmap is configured with the specific bit value for the secondary cell in which the BF occurrence is detected.

3. The method of claim 2,
    wherein the number of the some secondary cells is K, wherein K is a natural number greater than or equal to 1, and
    wherein the some secondary cells are determined K secondary cells corresponding K bits from the most significant bit (MSB) or the least significant bit (LSB) of the bitmap.

4. The method of claim 1,
    wherein the first candidate beam information includes information regarding a candidate beam of each of the one or more secondary cells, and
    wherein the candidate beam of each of the one or more secondary cells includes a beam preferred by the UE or a beam with the best quality among candidate beams configured for each of the one or more secondary cells.

5. The method of claim 4,
    wherein the first candidate beam information further includes quality information regarding the candidate beam of each of the one or more secondary cells, and
    wherein the quality information includes reference signal received power (RSRP) information regarding the candidate beam.

6. The method of claim 1,
    wherein the bitmap has a bit size corresponding to the number of the plurality of secondary cells configured for the UE.

7. The method of claim 1, further comprising:
    transmitting, to the BS, a first signal for requesting the uplink resources based on detection of the occurrence of the BF in the one or more secondary cells; and in response to the first signal, receiving, from the BS, a second signal for allocating the uplink resources for the beam information.

8. The method of claim 1,
wherein the beam information is transmitted through a physical uplink control channel (PUCCH) or a physical uplink shared channel (PUSCH).

9. The method of claim 1,
wherein the detecting of the occurrence of the BF comprises:
detecting the occurrence of the BF in each of the one or more secondary cells based on qualities of all control resource set (CORESET) beams related to each of the one or more secondary cells or all beams configured for beam failure detection (BFD) being less than or equal to a predetermined threshold.

10. A user equipment (UE) configured to transmit beam information in a wireless communication system, the UE comprising:
at least one transmitter;
at least one receiver;
at least one processor; and
at least one memory operatively coupled to the at least one processor and configured to store instructions causing, when executed, the at least one processor to perform operations comprising:
detecting occurrence of a beam failure (BF) in one or more secondary cells among a plurality of secondary cells configured for the UE; and
transmitting, to a base station (BS), the beam information including candidate beam information and a bitmap related to a detection of the occurrence of the BF of the one or more secondary cells,
wherein the candidate beam information includes first candidate beam information for the one or more secondary cells or second candidate beam information for some secondary cells among the one or more secondary cells, based on a size of uplink resources granted to the UE,
wherein, based on the size of the uplink resources accommodating the beam information including the first candidate beam information, the candidate beam information includes the first candidate beam information,
wherein, based on the size of the uplink resources not accommodating the beam information including the first candidate beam information, the candidate beam information includes the second candidate beam information, and
wherein the some secondary cells are specified based on an index of at least one secondary cell corresponding to at least one bit with a specific bit value in the bitmap.

11. A base station (BS) configured to receive beam information in a wireless communication system, the BS comprising:
at least one transmitter;
at least one receiver;
at least one processor; and
at least one memory operatively coupled to the at least one processor and configured to store instructions causing, when executed, the at least one processor to perform operations comprising:
based on detection of occurrence of a beam failure (BF) in one or more secondary cells among a plurality of secondary cells configured for a user equipment (UE), receiving, from the UE, the beam information including candidate beam information and a bitmap related to the detection of the occurrence of the BF of the one or more secondary cells; and
based on the beam information, performing procedures for beam failure recovery,
wherein the candidate beam information includes first candidate beam information for the one or more secondary cells or second candidate beam information for some secondary cells among the one or more secondary cells, based on a size of uplink resources granted to the UE,
wherein, based on the size of the uplink resources accommodating the beam information including the first candidate beam information, the candidate beam information includes the first candidate beam information,
wherein, based on the size of the uplink resources not accommodating the beam information including the first candidate beam information, the candidate beam information includes the second candidate beam information, and
wherein the some secondary cells are specified based on an index of at least one secondary cell corresponding to at least one bit with a specific bit value in the bitmap.

* * * * *